(12) United States Patent
Choi et al.

(10) Patent No.: US 11,956,457 B2
(45) Date of Patent: *Apr. 9, 2024

(54) TECHNIQUES FOR RANDOM ACCESS POINT INDICATION AND PICTURE OUTPUT IN CODED VIDEO STREAM

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,203

(22) Filed: Oct. 13, 2022

(65) Prior Publication Data

US 2023/0038756 A1    Feb. 9, 2023

Related U.S. Application Data

(63) Continuation of application No. 17/320,764, filed on May 14, 2021, now Pat. No. 11,558,630.

(Continued)

(51) Int. Cl.
*H04N 19/46* (2014.01)
*H04N 19/105* (2014.01)
(Continued)

(52) U.S. Cl.
CPC .......... *H04N 19/46* (2014.11); *H04N 19/105* (2014.11); *H04N 19/159* (2014.11); *H04N 19/172* (2014.11); *H04N 19/188* (2014.11)

(58) Field of Classification Search
CPC .... H04N 19/105; H04N 19/11; H04N 19/159; H04N 19/172; H04N 19/188; H04N 19/46; H04N 19/70
See application file for complete search history.

(56) References Cited

U.S. PATENT DOCUMENTS

2015/0023422 A1   1/2015   Zhang et al.
2021/0168359 A1   6/2021   Wang et al.

FOREIGN PATENT DOCUMENTS

GB          2535453 A       8/2016
WO     2020/037278 A1      2/2020
(Continued)

OTHER PUBLICATIONS

International Search Report dated Aug. 17, 2021 in International Application No. PCT/US21/32924.

(Continued)

*Primary Examiner* — Maria E Vazquez Colon
(74) *Attorney, Agent, or Firm* — Sughrue Mion, PLLC

(57) ABSTRACT

Systems and methods for decoding a coded video stream are provided. A method includes receiving a coded video stream that includes an access unit, including a picture; signaling a first flag that indicates whether the access unit includes either or neither one from among an intra random access point (IRAP) picture and a gradual decoding refresh (GDR) picture; signaling a second flag that indicates whether the picture is the IRAP picture; and decoding the picture, as a current picture, based on the signaling of the first flag and the second flag, wherein a value of the first flag and a value of the second flag are aligned.

20 Claims, 34 Drawing Sheets

Related U.S. Application Data

(60) Provisional application No. 63/037,903, filed on Jun. 11, 2020, provisional application No. 63/036,335, filed on Jun. 8, 2020, provisional application No. 63/035,274, filed on Jun. 5, 2020, provisional application No. 63/027,826, filed on May 20, 2020.

(51) Int. Cl.
*H04N 19/159* (2014.01)
*H04N 19/169* (2014.01)
*H04N 19/172* (2014.01)

(56) References Cited

FOREIGN PATENT DOCUMENTS

| WO | 2020/130910 | A1 | | 6/2020 | |
| WO | WO-2020130910 | A1 | * | 6/2020 | ........... H04N 19/132 |
| WO | 2020/254720 | A1 | | 12/2020 | |
| WO | WO-2020254720 | A1 | * | 12/2020 | ........... H04N 13/194 |
| WO | 2021/153475 | A1 | | 8/2021 | |
| WO | WO-2021153475 | A1 | * | 8/2021 | ........... H04N 19/157 |

OTHER PUBLICATIONS

Written Opinion of the International Searching Authority dated Aug. 17, 2021 in International Application No. PCT/US21/32924.

Gary Sullivan et al., "Meeting Report of the 17th Meeting of the Joint Video Experts Team (JVET)", Joint Video Experts Team (JVET) of ITU-T SG 16 WP 3 and ISO/IEC JTC 1/SC 29/WG 11, JVET-Q_Notes_dE 17th Meeting. Jan. 2020. (44 pages total).

Benjamin Bross et al., "Versatile Video Coding (Draft 9)", Joint Video Experts Team (JVET) of ITU-T SG 16 WP 3 and ISO/IEC JTC 1/SC 29/WG 11 18th Meeting, Apr. 2020, 525 pages, JVET-R2001-vA.

Byeongdoo Choi, et al., "AHG9: On reference picture list with generating unavailable reference picture," Joint Video Experts Team (JVET) of ITU-T SG 16 WP 3 and ISO/IEC JTC 1/SC 29/WG 11, 19th Meeting, Jun. 22-Jul. 1, 2020, Proposal, Document: JVET-S0192, pp. 1-7 (7 pages total).

Byeongdoo Choi, et al., "AHG9: On signaling IRAP and GDR pictures," Joint Video Experts Team (JVET) of ITU-T SG 16 WP 3 and ISO/IEC JTC 1/SC 29/WG 11, 19th Meeting, Jun. 22-Jul. 1, 2020, Proposal, Document JVET-S0055, pp. 1-2 (2 pages total).

Byeongdoo Choi, et al., "AHG9: Bugfix and Cleanup on ph_no_output_of_prior_pics_flag and ph_gdr_or_irap_pic_flag," Joint Video Experts Team (JVET) of ITU-T SG 16 WP 3 and ISO/IEC JTC 1/SC 29/WG 11, 19th Meeting, Jun. 22-Jul. 1, 2020, Proposal, Document: JVET-S0193, pp. 1-4 (4 pages total).

Benjamin Bross, et al., "Versatile Video Coding (Draft 9)," Joint Video Experts Team (JVET) of ITU-T SG 16 WP 3 and ISO/IEC JTC 1/SC 29/WG 11, 18th Meeting, Apr. 15-24, 2020, Draft text of video coding specification, Document: JVET-R2001-vAvB. Pages 1-530 (530 pages total).

* cited by examiner

FIG. 6A
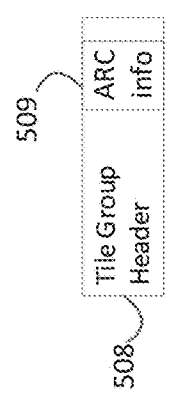
FIG. 6B
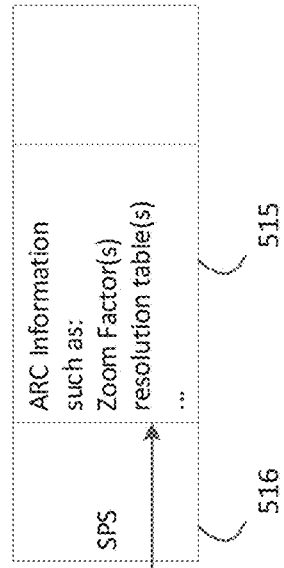
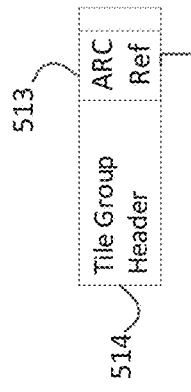
FIG. 6C

FIG. 7A

| tile_group_header( ) { | | | |
|---|---|---|---|
| ... | | | |
| if(adaptive_pic_resolution_change_flag) { | | | |
|   dec_pic_size_idx | | | u(1) |
| } | | | |
| ... | | | |

600 — tile_group_header( ) {
603 — if(adaptive_pic_resolution_change_flag) {
602 — dec_pic_size_idx

FIG. 7B

| | Descriptor |
|---|---|
| seq_parameter_set_rbsp( ) { | |
| ... | |
| adaptive_pic_resolution_change_flag | u(1) |
| if(adaptive_pic_resolution_change_flag) { | |
| output_pic_width_in_luma_samples | ue(v) |
| output_pic_height_in_luma_samples | ue(v) |
| reference_pic_size_present_flag | u(1) |
| if(reference_pic_size_present_flag) { | |
| reference_pic_width_in_luma_samples | ue(v) |
| reference_pic_height_in_luma_samples | ue(v) |
| } | |
| num_dec_pic_size_in_luma_samples_minus1 | ue(v) |
| for( i = 0; i <= num_dec_pic_size_in_luma_samples_minus1; i++ ) { | |
| dec_pic_width_in_luma_samples[ i ] | ue(v) |
| dec_pic_height_in_luma_samples[ i ] | ue(v) |
| } | |
| } | |
| ... | |
| } | |

- 610 seq_parameter_set_rbsp( ) {
- 611 adaptive_pic_resolution_change_flag
- 612 if(adaptive_pic_resolution_change_flag) {
- 613 output_pic_width_in_luma_samples
- 613 output_pic_height_in_luma_samples
- 614 reference_pic_size_present_flag
- 615 reference_pic_width_in_luma_samples
- 615 reference_pic_height_in_luma_samples
- 616 num_dec_pic_size_in_luma_samples_minus1
- 617 dec_pic_width_in_luma_samples[ i ]
- 617 dec_pic_height_in_luma_samples[ i ]

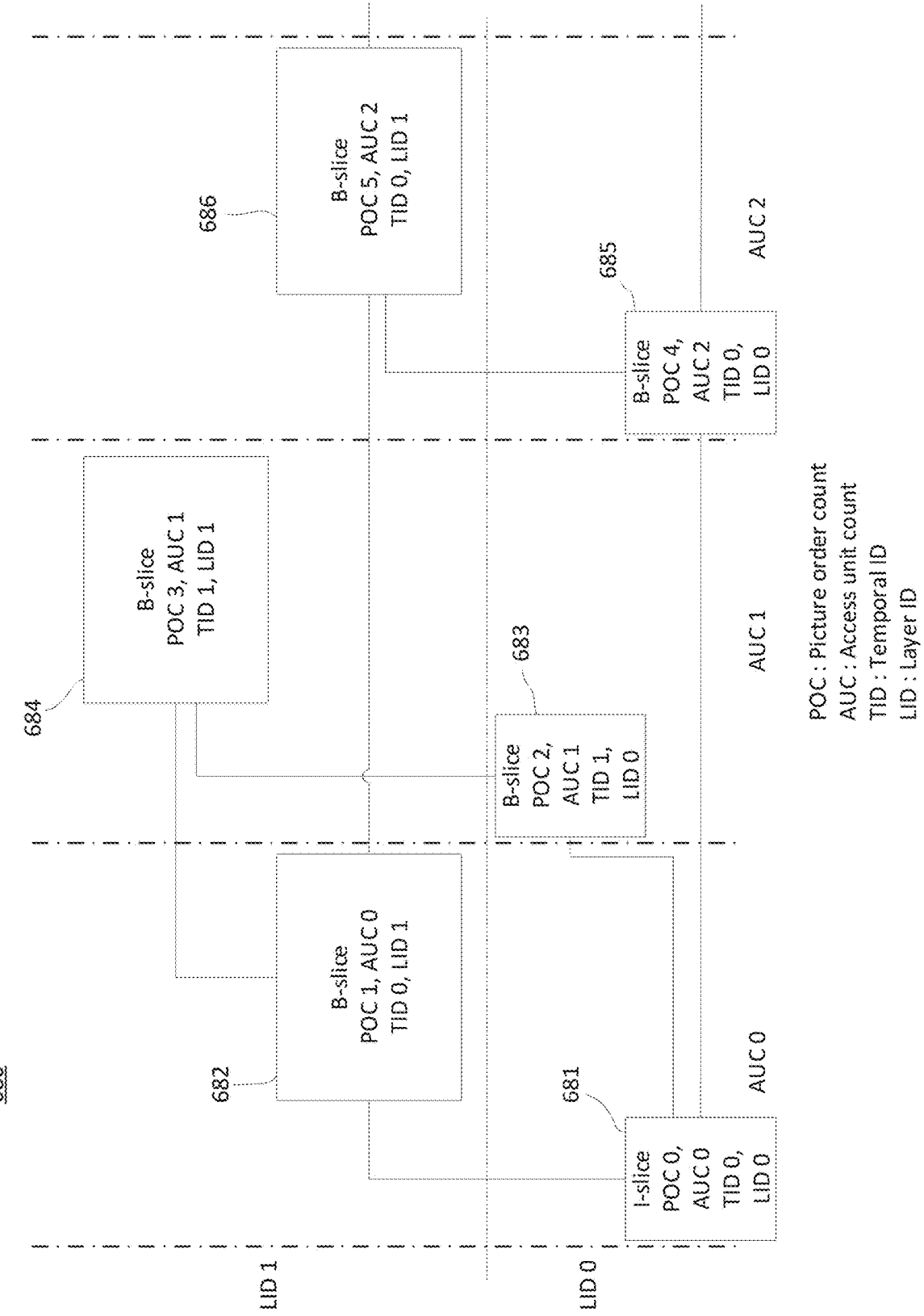

FIG. 9A

| | Descriptor |
|---|---|
| video_parameter_set_rbsp() { | |
| vps_video_parameter_set_id | u(4) |
| vps_max_layers_minus1 | u(8) |
| for( i = 0; i <= vps_max_layers_minus1; i++ ) { | |
| vps_included_layer_id[i] | u(7) |
| vps_reserved_zero_bit | u(1) |
| } | |
| vps_constraint_info_present_flag | u(1) |
| vps_constant_poc_cycle_per_au | u(1) |
| if( vps_constant_poc_cycle_per_au ) | |
| vps_poc_cycle_au | u(8) |
| ... | |
| } | |

630 — vps_video_parameter_set_id row

634 — vps_constant_poc_cycle_per_au row

632 — vps_poc_cycle_au row

FIG. 9B

| | Descriptor |
|---|---|
| slice_header() { | |
| slice_pic_parameter_set_id | ue(v) |
| if( rect_slice_flag \|\| NumBricksInPic > 1 ) | |
| slice_address | u(v) |
| if ( rect_slice_flag && !single_brick_per_slice_flag ) | |
| num_bricks_in_slice_minus1 | ue(v) |
| slice_type | ue(v) |
| if( NalUnitType == GRA_NUT ) | |
| recovery_poc_cnt | se(v) |
| slice_pic_order_cnt_lsb | u(v) |
| ... | |
| if(!vps_constant_poc_cycle_per_au) | |
| slice_poc_cycle_au | u(8) |
| | |
| | |
| | |

| | Descriptor |
|---|---|
| video_parameter_set_rbsp( ) { | |
| vps_video_parameter_set_id | u(4) |
| vps_max_layers_minus1 | u(8) |
| for( i = 0; i <= vps_max_layers_minus1; i++ ) { | |
| vps_included_layer_id[ i ] | u(7) |
| vps_reserved_zero_bit | u(1) |
| } | |
| ... | |
| vps_sub_picture_dividing_flag | u(1) |
| if(vps_sub_picture_dividing_flag){ | |
| vps_full_pic_width_in_luma_samples | ue(v) |
| vps_full_pic_height_in_luma_samples | ue(v) |
| } | |
| ... | |
| } | |

| | Descriptor |
|---|---|
| seq_parameter_set_rbsp() { | |
| sps_decoding_parameter_set_id | u(4) |
| sps_video_parameter_set_id | u(4) |
| sps_max_sub_layers_minus1 | u(3) |
| ... | |
| pic_width_in_luma_samples | ue(v) |
| pic_height_in_luma_samples | ue(v) |
| if(vps_sub_picture_dividing_flag) { | |
| pic_offset_x | ue(v) |
| pic_offset_y | ue(v) |
| } | |
| ... | |
| } | |

FIG. 20

| | Descriptor |
|---|---|
| sub_region_partitioning_info( payloadSize ) { | |
|   num_sub_region | ue(v) |
|   num_layers | ue(v) |
|   for( i = 0; i <= num_layers; i++ ) | |
|     layer_id[ i ] | ue(v) |
|   for( i = 1; i < num_layers; i++ ) { | |
|     for( j = 0; j < i; j++ ) | |
|       direct_dependency_flag[ i ][ j ] | u(1) |
|   for( i = 0; i < num_sub_region; i++ ) { | |
|     num_layers_for_region[ i ] | ue(v) |
|     for( j = 0; j < num_layers_for_region[ i ]; j++ ) | |
|       sub_region_layer_id[ i ][ j ] | ue(v) |
|     sub_region_offset_x[ i ] | ue(v) |
|     sub_region_offset_y[ i ] | ue(v) |
|     sub_region_width[ i ] | ue(v) |
|     sub_region_height[ i ] | ue(v) |
|   } | |
|   ... | |
| } | |

791 num_sub_region
792 num_layers
793 direct_dependency_flag[ i ][ j ]
794 num_layers_for_region[ i ]
795 sub_region_layer_id[ i ][ j ]
796 sub_region_offset_x[ i ]
797 sub_region_offset_y[ i ]
798 sub_region_width[ i ]
799 sub_region_height[ i ]

FIG. 21

| | Descriptor |
|---|---|
| video_parameter_set_rbsp( ) { | |
| ... | |
| vps_max_layers_minus1 | u(6) |
| num_output_layer_sets | ue(v) |
| num_profile_tier_level | ue(v) |
| for( i = 0; i < num_profile_tier_level; i++ ) | |
| profile_tier_level( vps_max_sub_layers_minus1 ) | |
| for( i = 0; i < num_output_layer_sets; i++) | |
| for( j = 0; j < NumLayersInIdList[ i ]; j++ ) { | |
| output_layer_flag[ i ][ j ] | u(1) |
| profile_tier_level_idx[ i ][ j ] | u(v) |
| } | |
| ... | |
| } | |

FIG. 22

| | Descriptor |
|---|---|
| video_parameter_set_rbsp() { | |
| ... | |
| vps_max_layers_minus1 | u(6) |
| if(vps_max_layers_minus1 > 0) { | |
| num_output_layer_sets | ue(v) |
| num_profile_tier_level | ue(v) |
| } | |
| for( i = 0; i < num_profile_tier_level; i++) | |
| profile_tier_level( vps_max_sub_layers_minus1 ) | |
| for( i = 0; i < num_output_layer_sets; i++) { | |
| vps_output_layers_mode[ i ] | u(2) |
| vps_ptl_signal_flag[ i ] | u(1) |
| for( j = 0; j < NumLayersInIdList[ i ]; j++ ) { | |
| if(vps_output_layers_mode[i] == 2) | |
| output_layer_flag[ i ][ j ] | u(1) |
| if( vps_ptl_signal_flag[i] ) | |
| profile_tier_level_idx[ i ][ j ] | u(v) |
| } | |
| ... | |
| } | |

802 — vps_max_layers_minus1
804 — num_output_layer_sets
806 — num_profile_tier_level
808 — profile_tier_level( vps_max_sub_layers_minus1 )
822 — vps_output_layers_mode[ i ]
824 — vps_ptl_signal_flag[ i ]
810 — output_layer_flag[ i ][ j ]
812 — profile_tier_level_idx[ i ][ j ]

FIG. 23

| | Descriptor |
|---|---|
| video_parameter_set_rbsp() { | |
| ... | |
| vps_max_layers_minus1 | u(6) |
| if(vps_max_layers_minus1 > 0) { | |
| num_output_layer_sets | ue(v) |
| num_profile_tier_level | ue(v) |
| } | |
| max_subpics_minus1 | u(8) |
| for( i = 0; i < max_subpics_minus1; i++ ) { | |
| sub_pic_id[i] | u(8) |
| } | |
| for( i = 0; i < num_profile_tier_level; i++ ) | |
| profile_tier_level( vps_max_sub_layers_minus1 ) | |
| for( i = 0; i < num_output_layer_sets;i++ ) { | |
| vps_output_layers_mode[ i ] | u(2) |
| vps_ptl_signal_flag[ i ] | u(1) |
| for( j = 0; k < NumLayersInIdList[ i ]; j++ ) { | |
| num_output_subpic_layer[i][j] | ue(v) |
| for( k = 0; k < num_output_subpic_layer[i][j]; k++ ) | |
| sub_pic_id_layer[i][j]_[k] | |
| } | |
| if(vps_output_layers_mode[ i ] == 2 ) | |
| output_layer_flag[i][j] | u(8) |
| } | |
| if( vps_ptl_signal_flag[i] ) | u(1) |
| profile_tier_level_idx[ i ][ j ] | u(v) |
| } | |
| ... | |
| } | |

802 — vps_max_layers_minus1
804 — num_output_layer_sets
806 — num_profile_tier_level
821 — sub_pic_id[i]
822 — vps_output_layers_mode[ i ]
824 — vps_ptl_signal_flag[ i ]
826 — sub_pic_id_layer[i][j][k]
810 — output_layer_flag[i][j]
812 — profile_tier_level_idx[ i ][ j ]

FIG. 24

| video_parameter_set_rbsp( ) { | Descriptor |
|---|---|
| 842 — vps_video_parameter_set_id | u(4) |
| 802 — vps_max_layers_minus1 | u(6) |
| 846 — vps_max_sublayers_minus1 | u(3) |
| if( vps_max_layers_minus1 > 0 && vps_max_sublayers_minus1 > 0 ) | |
| 848 —    vps_all_layers_same_num_sublayers_flag | u(1) |
| if( vps_max_layers_minus1 > 0 ) | |
| 850 —    vps_all_independent_layers_flag | u(1) |
| for( i = 0; i <= vps_max_layers_minus1; i++ ) { | |
| 852 —    vps_layer_id[ i ] | u(6) |
| if( i > 0 && !vps_all_independent_layers_flag ) { | |
| 854 —      vps_independent_layer_flag[ i ] | u(1) |
| if( !vps_independent_layer_flag[ i ] ) { | |
| for( j = 0; j < i; j++ ) | |
| 856 —        vps_direct_ref_layer_flag[ i ][ j ] | u(1) |
| 858 —      max_tid_ref_present_flag[ i ] | u(1) |
| if( max_tid_ref_present_flag[ i ] ) | |
| 860 —        max_tid_il_ref_pics_plus1[ i ] | u(3) |
| } | |
| } | |
| } | |
| if( vps_max_layers_minus1 > 0 ) { | |
| if( vps_all_independent_layers_flag ) | |
| 862 —    each_layer_is_an_ols_flag | u(1) |
| if( !each_layer_is_an_ols_flag ) { | |
| if( !vps_all_independent_layers_flag ) | |
| 864 —      ols_mode_idc | u(2) |
| if( ols_mode_idc == 2 ) { | |
| 866 —      num_output_layer_sets_minus1 | u(8) |
| for( i = 1; i <= num_output_layer_sets_minus1; i++) | |
| for( j = 0; j <= vps_max_layers_minus1; j++) | |
| 868 —        ols_output_layer_flag[ i ][ j ] | u(1) |
| } | |
| } | |
| } | |
| ... | |
| } | |

FIG. 25

| video_parameter_set_rbsp( ) { | Descriptor |
|---|---|
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         for( j = 0; j < i; j++ ) | |
|           vps_direct_ref_layer_flag[ i ][ j ] | u(1) |
|         max_tid_ref_present_flag[ i ] | u(1) |
|         if( max_tid_ref_present_flag[ i ] ) | |
|           max_tid_il_ref_pics_plus1[ i ] | u(3) |
|       } | |
|     } | |
|   } | |
|   if( vps_max_layers_minus1 > 0 ) { | |
|     if( vps_all_independent_layers_flag ) | |
|       each_layer_is_an_ols_flag | u(1) |
|     if( !each_layer_is_an_ols_flag ) { | |
|       if( !vps_all_independent_layers_flag ) | |
|         ols_mode_idc | u(2) |
|       if( ols_mode_idc == 2 && vps_max_layers_minus1 > 1 ) { | |
|         num_output_layer_sets_minus1 | u(8) |
|         for( i = 1; i <= num_output_layer_sets_minus1; i++) | |
|           for( j = 0; j <= vps_max_layers_minus1; j++ ) | |
|             ols_output_layer_flag[ i ][ j ] | u(1) |
|       } | |
|     } | |
|   } | |
|   ... | |
| } | |

FIG. 26

| | picture_header_structure( ) { | Descriptor |
|---|---|---|
| 1 | | |
| 2 | ph_gdr_or_irap_pic_flag | u(1) |
| | if( ph_gdr_or_irap_pic_flag ) | |
| |   ph_gdr_pic_flag | u(1) |
| | ph_inter_slice_allowed_flag | u(1) |
| | if( ph_inter_slice_allowed_flag ) | |
| |   ph_intra_slice_allowed_flag | u(1) |
| | ph_non_ref_pic_flag | u(1) |
| | ph_pic_parameter_set_id | ue(v) |
| | ph_pic_order_cnt_lsb | u(v) |
| | if( ph_gdr_or_irap_pic_flag ) | |
| 3 |   ph_no_output_of_prior_pics_flag | u(1) |
| | if( ph_gdr_pic_flag ) | |
| |   ph_recovery_poc_cnt | ue(v) |
| | ... | |
| | } | |

FIG. 27

| | access_unit_delimiter_rbsp( ) { | Descriptor |
|---|---|---|
| 10 | | |
| 12 | aud_irap_or_gdr_au_flag | u(1) |
| | aud_pic_type | u(3) |
| | rbsp_trailing_bits( ) | |
| | } | |

FIG. 28

| | | Descriptor |
|---|---|---|
| 1 → | picture_header_structure( ) { | |
| 6 → |    ph_irap_pic_flag | u(1) |
| |    if(!ph_irap_pic_flag ) | |
| 7 → |       ph_gdr_pic_flag | u(1) |
| |    … | |
| | } | |

FIG. 29

| | | Descriptor |
|---|---|---|
| 20 → | slice_header( ) { | |
| |    sh_picture_header_in_slice_header_flag | u(1) |
| |    if( sh_picture_header_in_slice_header_flag ) | |
| |       picture_header_structure( ) | |
| |    … | |
| |    if( nal_unit_type == IDR_W_RADL ‖ nal_unit_type == IDR_N_LP ‖ nal_unit_type == CRA_NUT) | |
| 23 → |       sh_no_output_of_prior_pics_flag | u(1) |
| |    … | |
| | } | |

FIG. 30

| | | Descriptor |
|---|---|---|
| 10 → | access_unit_delimiter_rbsp( ) { | |
| 16 → |    aud_irap_au_flag | u(1) |
| 17 → |    aud_gdr_au_flag | u(1) |
| |    aud_pic_type | u(3) |
| |    rbsp_trailing_bits( ) | |
| | } | |

FIG. 31

| | Descriptor |
|---|---|
| picture_header_structure( ) { | |
|   ph_gdr_or_irap_pic_flag | u(1) |
|   ph_non_ref_pic_flag | u(1) |
|   if( ph_gdr_or_irap_pic_flag ) | |
|     ph_gdr_pic_flag | u(1) |
|   ... | |
|   ph_pic_order_cnt_lsb | u(v) |
|   if( ph_gdr_or_irap_pic_flag ) | |
|     ph_no_output_of_prior_pics_flag | u(1) |
|   for( i = 0; i < NumExtraPhBits; i++ ) | |
|     ph_extra_bit[ i ] | u(1) |
|   if( sps_poc_msb_cycle_flag ) { | |
|     ph_poc_msb_cycle_present_flag | u(1) |
|     if( ph_poc_msb_cycle_present_flag ) | |
|       ph_poc_msb_cycle_val | u(v) |
|   } | |
|   if( ph_gdr_pic_flag ) | |
|     ph_recovery_poc_cnt | ue(v) |
|   ... | |
| } | |

TECHNIQUES FOR RANDOM ACCESS POINT INDICATION AND PICTURE OUTPUT IN CODED VIDEO STREAM

CROSS-REFERENCE TO THE RELATED APPLICATIONS

This application is a continuation of U.S. application Ser. No. 17/320,764, filed on May 14, 2021, which claims priority from U.S. Provisional Application No. 63/037,903, filed on Jun. 11, 2020; U.S. Provisional Application No. 63/036,335, filed on Jun. 8, 2020; U.S. Provisional Application No. 63/035,274, filed on Jun. 5, 2020; and U.S. Provisional Application No. 63/027,826, filed on May 20, 2020, the disclosures of which are incorporated herein by reference in their entireties.

FIELD

Embodiments of the present disclosure relate to video coding and decoding, and more specifically, to random access picture and its output process in a coded video stream with multiple layers.

BACKGROUND

Video coding and decoding using inter-picture prediction with motion compensation has been previously used. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal may be small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Previously, video encoders and decoders tended to operate on a given picture size that was, in most cases, defined and stayed constant for a coded video sequence (CVS), Group of Pictures (GOP), or a similar multi-picture time-frame. For example, in MPEG-2, system designs were used to change the horizontal resolution (and, thereby, the picture size) dependent on factors such as activity of the scene, but only at I pictures, hence typically for a GOP. The resampling of reference pictures for use of different resolutions within a CVS has been used in, for example, ITU-T Rec. H.263 Annex P. However, here the picture size does not change, only the reference pictures are being resampled, resulting potentially in only parts of the picture canvas being used (in case of downsampling), or only parts of the scene being captured (in case of upsampling). Further, H.263 Annex Q allows the resampling of an individual macroblock by a factor of two (in each dimension), upward or downward. Again, the picture size remains the same. The size of a macroblock is fixed in H.263, and therefore does not need to be signaled.

Changes of picture size in predicted pictures became more mainstream in modern video coding. For example, VP9 allows reference picture resampling and change of resolution for a whole picture. Similarly, certain proposals made towards VVC (including, for example, Hendry, et. al, "On adaptive resolution change (ARC) for VVC", Joint Video Team document JVET-M0135-v1, Jan. 9-19, 2019, incorporated herein in its entirety) allow for resampling of whole reference pictures to different-higher or lower-resolutions. In such document, different candidate resolutions are suggested to be coded in the sequence parameter set and referred to by per-picture syntax elements in the picture parameter set.

Bross, et. al, "Versatile Video Coding (Draft 9)", Joint Video Experts Team document JVET-R2001-vA, April 2020, is incorporated herein in its entirety.

SUMMARY

In a coded video stream. it is widely used to indicate the random access point information in high-level syntax structure, such as network abstraction layer (NAL) unit header, parameter set, picture header, or slice header. Based on the random access information, decoded leading pictures associated with the random access picture are managed. In this disclosure, in order to make the decoded picture management associated with the random access process clear, some relevant syntax elements and constraints are explained.

When a video bitstream is randomly accessed by a trick mode play, an intra random access point (IRAP) picture may enable the random access to an intermedia point of the bitstream and successful decoding of the video bitstream at the random access point. One of possible methods is the gradual refresh of the scene with some amount of recovery time. In VVC and other video codecs, the gradual decoding refresh (GDR) picture and access unit (AU) are defined to specify syntax and semantics of the random access operation with gradual decoding refresh. In this disclosure, to correctly specify the signaling and decoding process of GDR, its syntax, semantics, and constraints are described.

When one or more reference picture lists are constructed for inter-prediction in P or B slices, one or more pictures may be unavailable due to random access or unintended picture loss. To avoid any decoder crash or unintended behavior, it is desired to generate unavailable pictures with defaults values of pixels and parameters. After generating unavailable pictures, it may be needed to check the validation of all reference pictures in reference picture list.

Embodiments of the present disclosure relate to random access picture and its output process in a coded video stream with multiple layers. Embodiments of the present disclosure related to random access picture and its leading picture output indication in a coded video stream with multiple layers. Embodiments of the present disclosure relate to signaling random access pictures with gradual decoding refresh and recovery point in a coded video stream with multiple layers. Embodiments of the present disclosure relate to reference picture list construction and unavailable picture generation in a coded video stream with multiple layers. Embodiments of the present disclosure include techniques for signaling of adaptive picture size in a video bitstream.

One or more embodiments of the present disclosure include a method performed by at least one processor. The method includes: receiving a coded video stream that includes an access unit, including a picture; signaling a first flag that indicates whether the access unit includes either or neither one from among an intra random access point (IRAP) picture and a gradual decoding refresh (GDR) picture; signaling a second flag that indicates whether the picture is the IRAP picture; and decoding the picture, as a current picture, based on the signaling of the first flag and the second flag, wherein a value of the first flag and a value of the second flag are aligned.

According to an embodiment, the method further includes: signaling a third flag that indicates whether the picture is the GDR picture, wherein the value of the first flag and a value of the third flag are aligned.

According to an embodiment, the third flag is signaled based on the second flag indicating that the picture is not the IRAP picture.

According to an embodiment, the first flag has a value that indicates that the picture is either one from among the IRAP picture and the GDR picture, the second flag has a value that indicates that the picture is the IRAP picture, and the method further includes signaling a third flag that indicates whether any pictures prior to the IRAP picture are outputted.

According to an embodiment, the method further includes: determining a network abstraction layer (NAL) unit type of the slice, wherein the third flag is signalled based on the NAL unit type that is determined.

According to an embodiment, the third flag is signalled based on the NAL unit type being determined to be equal to IDR_W_RADL, IDR_N_LP, or CRA_NUT.

According to an embodiment, the method further includes: signaling a fourth flag that indicates whether the picture is the GDR picture, wherein the value of the first flag and a value of the fourth flag are aligned.

According to an embodiment, the fourth flag is signaled based on the second flag indicating that the picture is not the IRAP picture.

According to an embodiment, the method further includes: signaling a third flag that has a value that indicates that the picture includes mixed network abstraction layer (NAL) unit types; and ignoring, based on the value of the third flag, a value of a fourth flag that indicates whether no previously decoded pictures in the DPB are to be output.

According to an embodiment, the checking bistream conformance is performed based on determining the current picture is an independent decoder refresh (IDR) picture, a clean random access (CRA) picture, or a gradual decoding refresh (GDR) picture.

According to one or more embodiments, a system is provided. The system includes: at least one processor that is configured to receive a coded video stream that includes an access unit, including a picture; and memory storing computer code, the computer code including: first signaling code configured to cause the at least one processor to signal a first flag that indicates whether the access unit includes either or neither one from among an intra random access point (IRAP) picture and a gradual decoding refresh (GDR) picture; second signaling code configured to cause the at least one processor to signal a second flag that indicates whether the picture is the IRAP picture; and decoding code configured to cause the at least one processor to decode the picture, as a current picture, based on the signaling of the first flag and the second flag, wherein a value of the first flag and a value of the second flag are aligned.

According to an embodiment, the computer code further includes: third signaling code configured to cause the at least one processor to signal a third flag that indicates whether the picture is the GDR picture, wherein the value of the first flag and a value of the third flag are aligned.

According to an embodiment, the third flag is signaled based on the second flag indicating that the picture is not the IRAP picture.

According to an embodiment, the first flag has a value that indicates that the picture is either one from among the IRAP picture and the GDR picture, the second flag has a value that indicates that the picture is the IRAP picture, and the compute code further includes third signaling code configured to cause the at least one processor to signal a third flag that indicates whether any pictures prior to the IRAP picture are outputted.

According to an embodiment, the computer code further includes: determining code configured to cause the at least one processor to determine a network abstraction layer (NAL) unit type of the slice, wherein the third flag is signalled based on the NAL unit type that is determined.

According to an embodiment, the third flag is signalled based on the NAL unit type being determined to be equal to IDR_W_RADL, IDR_N_LP, or CRA_NUT.

According to an embodiment, the computer code further includes: fourth signaling code configured to cause the at least one processor to signal a fourth flag that indicates whether the picture is the GDR picture, wherein the value of the first flag and a value of the fourth flag are aligned.

According to an embodiment, the fourth flag is signaled based on the second flag indicating that the picture is not the IRAP picture.

According to an embodiment, the computer code further includes third signaling code configured to cause the at least one processor to signal a third flag that has a value that indicates that the picture includes mixed network abstraction layer (NAL) unit types; and ignoring code configured to cause the at least one processor to ignore, based on the value of the third flag, a value of a fourth flag that indicates whether no previously decoded pictures in the DPB are to be output.

According to one or more embodiments, a non-transitory computer-readable medium storing computer instructions is provided. The computer instructions, when executed by at least one processor that receives a coded video stream that includes an access unit, including a picture, cause the at least one processor to: signal a first flag that indicates whether the access unit includes either or neither one from among an intra random access point (IRAP) picture and a gradual decoding refresh (GDR) picture; signal a second flag that indicates whether the picture is the IRAP picture; and decode the picture, as a current picture, based on the signaling of the first flag and the second flag, wherein a value of the first flag and a value of the second flag are aligned.

BRIEF DESCRIPTION OF THE DRAWINGS

Further features, the nature, and various advantages of the disclosed subject matter will be more apparent from the following detailed description and the accompanying drawings in which:

FIG. 6A is a schematic illustration of a first configuration for signaling ARC parameters in accordance with an embodiment.

FIG. 6B is a schematic illustration of a second configuration for signaling ARC parameters in accordance with an embodiment.

FIG. 6C is a schematic illustration of a third configuration for signaling ARC parameters in accordance with an embodiment.

FIG. 7A is a schematic illustration of an excerpt of a tile group header in accordance with an embodiment.

FIG. 7B is a schematic illustration of an excerpt of a sequence parameter set in accordance with an embodiment.

FIG. 8 is an example of prediction structure for scalability with adaptive resolution change.

FIG. 9A illustrates an example of a syntax table in accordance with an embodiment.

FIG. 9B illustrates an example of a syntax table in accordance with an embodiment.

FIG. 19A is a schematic illustration of an excerpt of a video parameter set in accordance with an embodiment.

FIG. 19B is a schematic illustration of an excerpt of a sequence parameter set in accordance with an embodiment.

FIG. 20 is an example of a syntax table for sub-picture layout information in accordance with an embodiment.

FIG. 21 is an example of a syntax table to indicate output layers and profile/tier/level information for each output layer set according to an embodiment.

FIG. 22 is an example of a syntax table to indicate output layer mode on for each output layer set according to an embodiment.

FIG. 23 is an example of a syntax table to indicate the present sub-picture of each layer for each output layer set.

FIG. 24 is an example of a syntax table of video parameter set RBSP.

FIG. 25 is an example of a syntax table to indicate the output layer set with output layer set mode.

FIG. 26 is an example of a syntax table to indicate the random access point associated with IRAP or GDR picture in picture header.

FIG. 27 is an example of a syntax table to indicate the random access AU in AU delimiter.

FIG. 28 is an example of a syntax table to indicate IRAP picture presence in picture header.

FIG. 29 is an example of a syntax table to indicate output of leading picture in slice header.

FIG. 30 is an example of a syntax table to indicate IRAP picture and GDR picture presence in AU delimiter.

FIG. 31 is an example of a syntax table to indicate a GDR picture and its recovery point in picture header.

DETAILED DESCRIPTION

Figure 1:
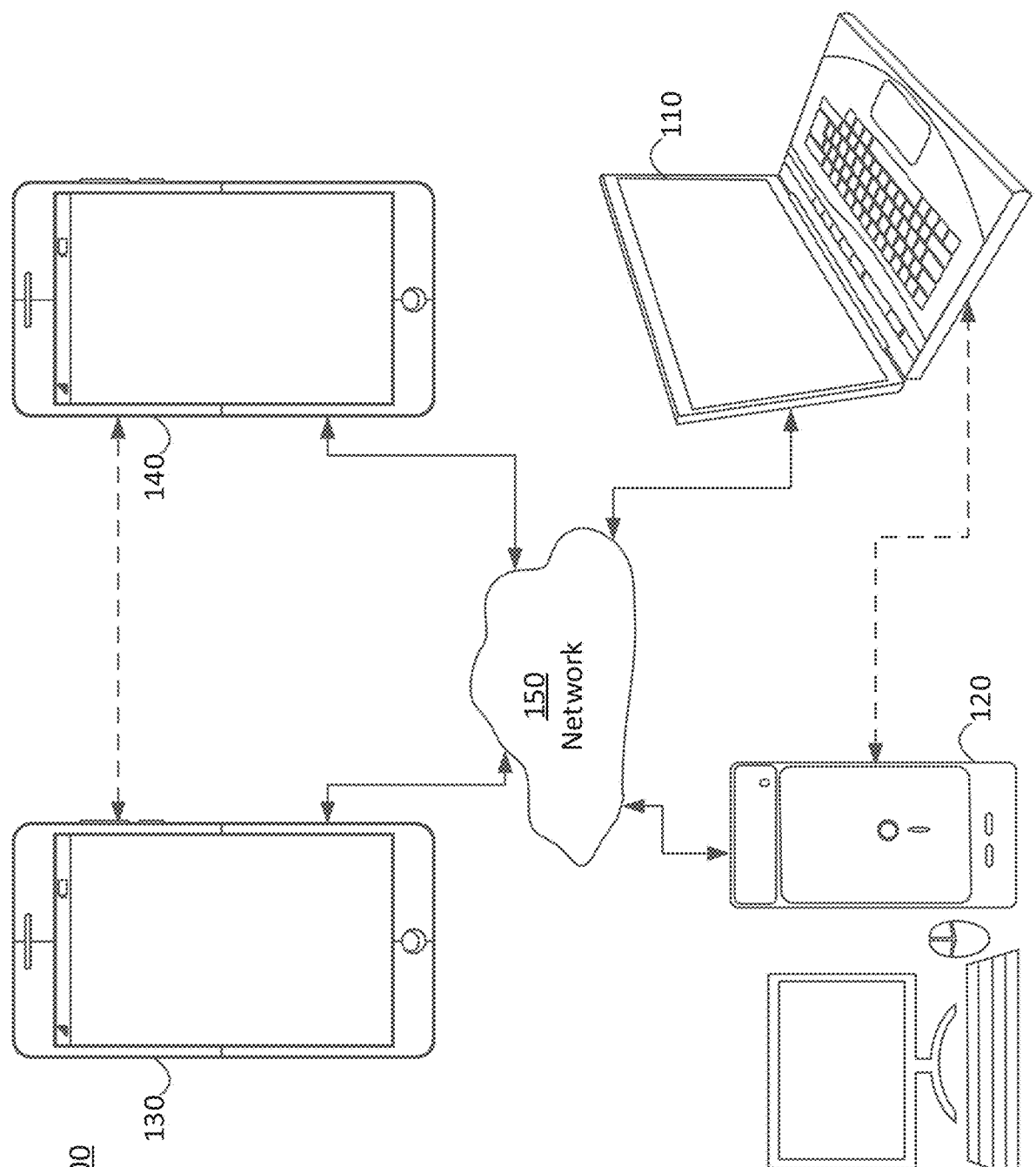
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
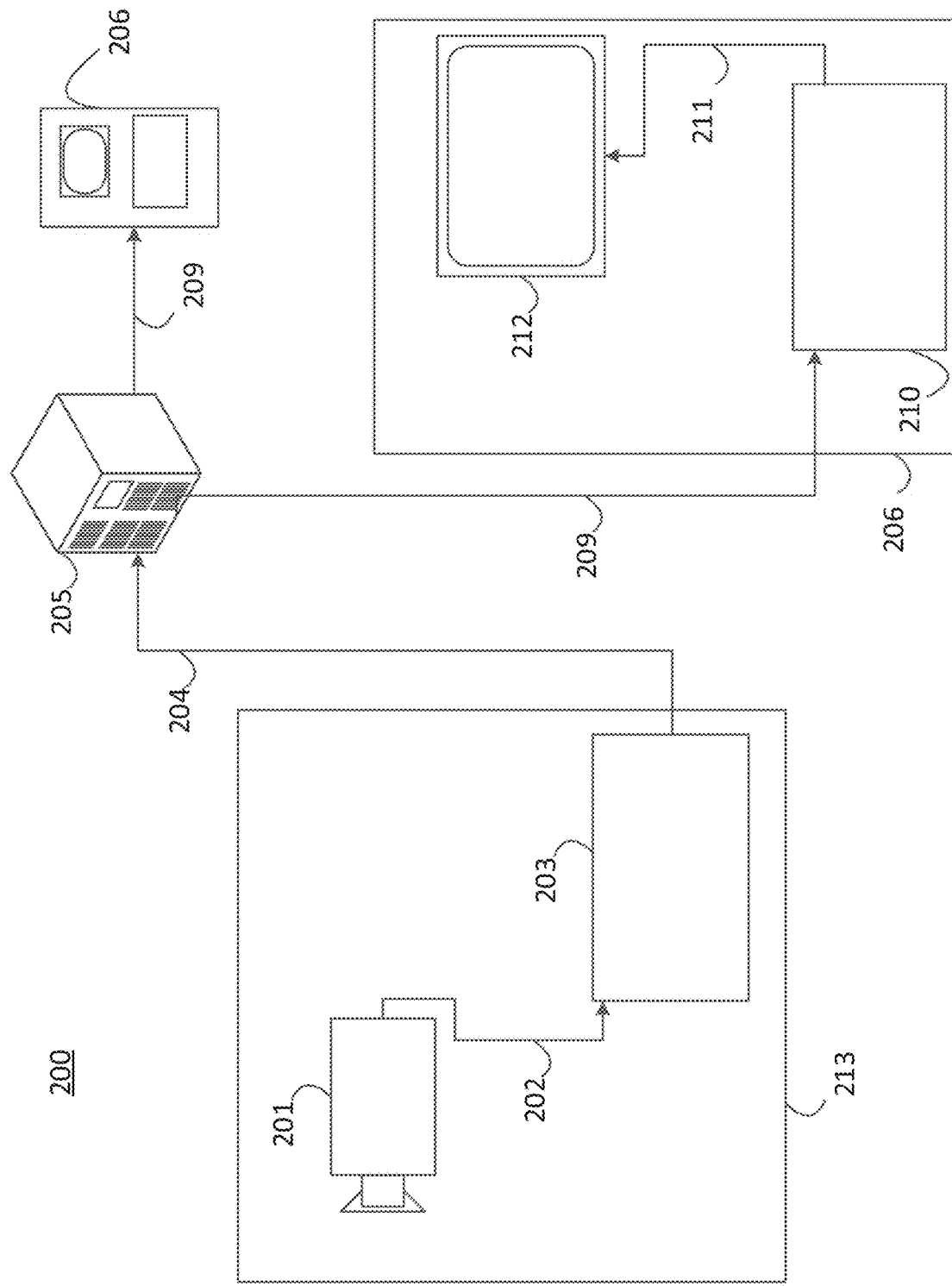
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
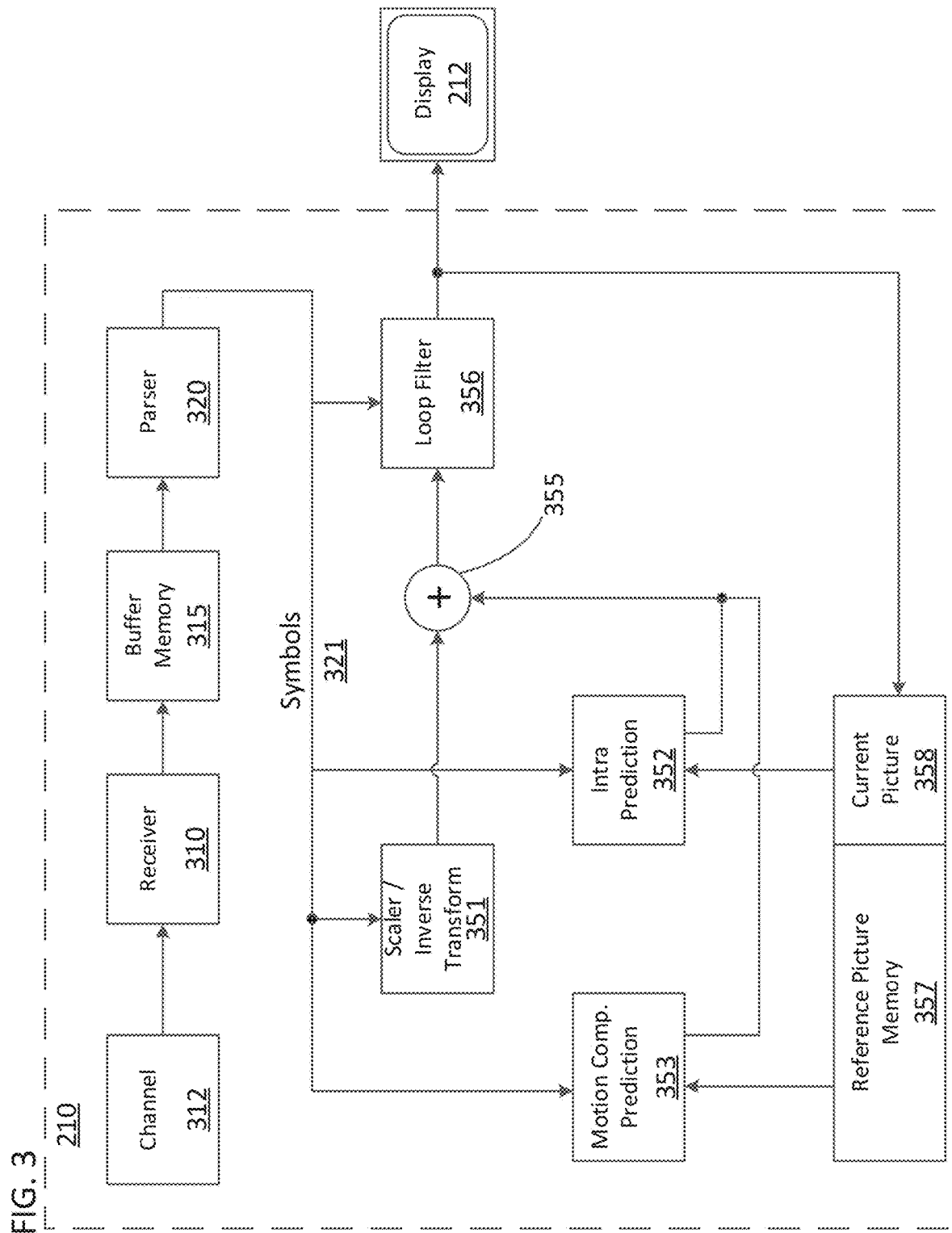
FIG. 3 is a schematic illustration of a simplified block diagram of a decoder in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or can be small. For use on best effort packet networks such as the Internet, the buffer (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks comprising sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
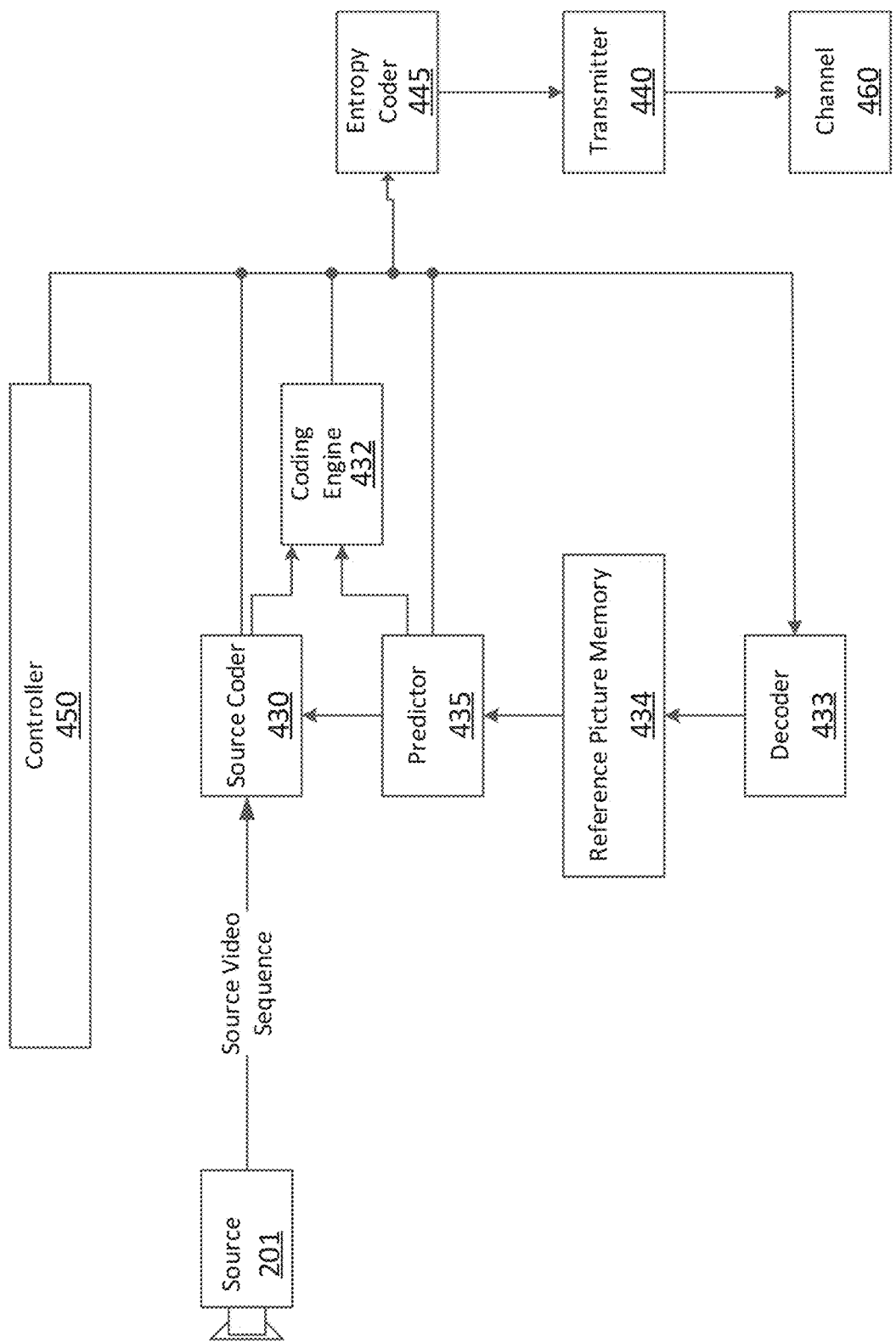
FIG. 4 is a schematic illustration of a simplified block diagram of an encoder in accordance with an embodiment.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an over-simplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Before describing certain aspects of embodiments of the disclosure in more detail, a few terms are introduced below that are referred to in the remainder of this description.

"Sub-Picture" henceforth refers to, in some cases, a rectangular arrangement of samples, blocks, macroblocks, coding units, or similar entities that are semantically grouped, and that may be independently coded in changed resolution. One or more sub-pictures may form a picture. One or more coded sub-pictures may form a coded picture. One or more sub-pictures may be assembled into a picture, and one or more sub pictures may be extracted from a picture. In certain environments, one or more coded sub-pictures may be assembled in the compressed domain without transcoding to the sample level into a coded picture, and in the same or certain other cases, one or more coded sub-pictures may be extracted from a coded picture in the compressed domain.

"Adaptive Resolution Change" (ARC) henceforth refers to mechanisms that allow the change of resolution of a picture or sub-picture within a coded video sequence, by the means of, for example, reference picture resampling. "ARC parameters" henceforth refer to the control information required to perform adaptive resolution change, that may include, for example, filter parameters, scaling factors, resolutions of output and/or reference pictures, various control flags, and so forth.

Above description is focused on coding and decoding a single, semantically independent coded video picture. Before describing the implication of coding/decoding of multiple sub pictures with independent ARC parameters and its implied additional complexity, embodiments for signaling ARC parameters shall be described.

Referring to FIGS. 6A-C, shown are several novel example embodiments for signaling ARC parameters. As noted with each of the embodiments, they have certain advantages from a coding efficiency, complexity, and architecture viewpoint. A video coding standard or technology may implement one or more of these embodiments, and may also include embodiments known from comparative art, for signaling ARC parameters. Comparative art embodiments include the examples illustrated in FIGS. 5A-B. The novel embodiments may not be mutually exclusive, and conceivably may be included in a standard or technology that also includes comparative art embodiments so that either may be used based on application needs, standards technology involved, or encoder's choice.

Classes of ARC parameters may include: (1) up/down-sample factors, separate or combined in X and Y dimension, or (2) up/downsample factors, with an addition of a temporal dimension, indicating constant speed zoom in/out for a given number of pictures. Either of the above two may involve the coding or decoding of one or more syntax elements that may point into a table containing the factor(s). Such syntax elements may be short in length in embodiments.

"Resolution" may refer to resolution in the X or Y dimension, in units of samples, blocks, macroblocks, CUs, or any other suitable granularity, of the input picture, output picture, reference picture, coded picture, combined or separately. If there are more than one resolution (such as, for example, one for input picture, one for reference picture) then, in certain cases, one set of values may be inferred from another set of values. The resolution could be gated, for example, by the use of flags. A more detailed example of resolution is provided further below.

"Warping" coordinates, akin to those used in H.263 Annex P, may be in a suitable granularity as described above. H.263 Annex P defines one efficient way to code such warping coordinates, but other, potentially more efficient ways could conceivably also be used. For example, the variable length reversible, "Huffman"-style coding of warping coordinates of Annex P could be replaced by a suitable length binary coding, where the length of the binary code word could, for example, be derived from a maximum picture size, possibly multiplied by a certain factor and offset by a certain value, so to allow for "warping" outside of the maximum picture size's boundaries.

With reference to up or downsample filter parameters, in the easiest case, there may be only a single filter for up and/or downsampling. However, in certain cases, it can be advantageous to allow more flexibility in filter design, which may be implemented by signaling of filter parameters. Such parameters may be selected through an index in a list of possible filter designs, the filter may be fully specified (e.g. through a list of filter coefficients using suitable entropy coding techniques), and/or the filter may be implicitly selected through up/downsample ratios which are signaled according to any of the mechanisms mentioned above, and so forth.

Henceforth, the description assumes an example case where the coding of a finite set of up/downsample factors (the same factor to be used in both X and Y dimension), that are indicated through a codeword. That codeword can advantageously be variable length coded by, for example, using the Ext-Golomb code common for certain syntax elements in video coding specifications such as H.264 and H.265. One suitable mapping of values to up/downsample factors can, for example, be according to Table 1 below.

TABLE 1

| Codeword | Ext-Golomb Code | Original/Target resolution |
| --- | --- | --- |
| 0 | 1 | 1/1 |
| 1 | 010 | 1/1.5 (upscale by 50%) |
| 2 | 011 | 1.5/1 (downscale by 50%) |
| 3 | 00100 | 1/2 (upscale by 100%) |
| 4 | 00101 | 2/1 (downscale by 100%) |

Many similar mappings could be devised according to the needs of an application and the capabilities of the up and downscale mechanisms available in a video compression technology or standard. The table could be extended to more values. Values may also be represented by entropy coding mechanisms other than Ext-Golomb codes (e.g. using binary coding) that may have certain advantages when the resampling factors were of interest outside the video processing engines (encoder and decoder foremost) themselves, for example by MANEs. It should be noted that, for the (presumably) most common case where no resolution change is required, an Ext-Golomb code can be chosen that is short (e.g. only a single bit as, for example, shown in the second row of TABLE 1) that can have a coding efficiency advantage over using binary codes for the most common case.

The number of entries in the table, as well as their semantics, may be fully or partially configurable. For example, the basic outline of the table may be conveyed in a "high" parameter set such as a sequence or decoder parameter set. Alternatively or in addition, one or more such tables may be defined in a video coding technology or standard, and may be selected through, for example, a decoder or sequence parameter set.

Provided below is a description of how an upsample/downsample factor (ARC information), coded as described above, may be included in a video coding technology or standard syntax. Similar considerations may apply to one or a few codewords controlling up/downsample filters. Provided below is also a description regarding when comparatively large amounts of data may be required for a filter or other data structures.

Figure 5A:
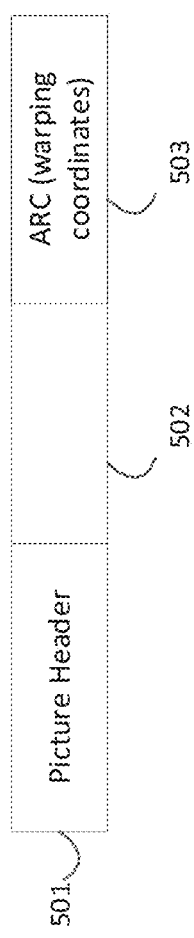
FIG. 5A is a schematic illustration of a first configuration for signaling ARC parameters in accordance with a comparative art embodiment.

With reference to FIG. 5A, H.263 Annex P includes ARC information (502) in the form of four warping coordinates within a picture header (501), specifically in an H.263 PLUSPTYPE (503) header extension. Such a design may be sensible when (a) there is a picture header available, and (b) frequent changes of the ARC information are expected. However, the overhead when using H.263-style signaling can be quite high, and scaling factors may not pertain to picture boundaries because picture header can be of transient nature.

Figure 5B:
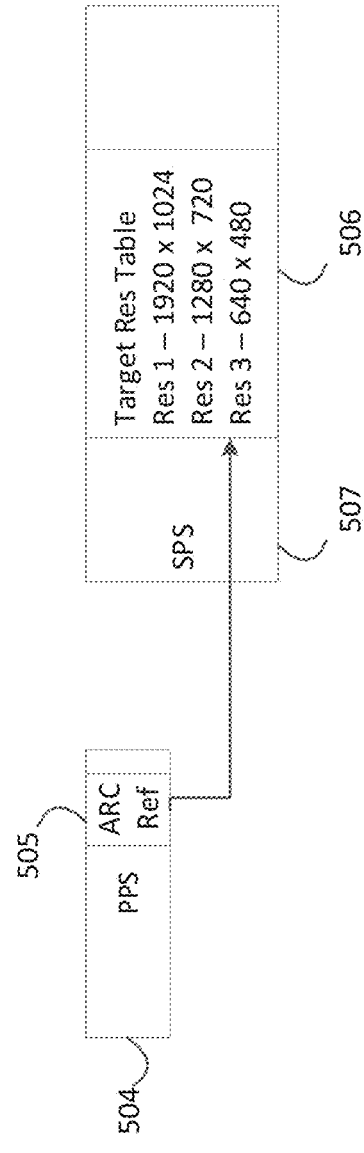
FIG. 5B is a schematic illustration of a second configuration for signaling ARC parameters in accordance with a comparative art embodiment.

With reference to FIG. 5B, JVCET-M135-v1 includes ARC reference information (505), (an index) located in a picture parameter set (504), that indexes a table (506) including target resolutions that is located inside a sequence parameter set (507). The placement of the possible resolution in the table (506) in the sequence parameter set (507) may be justified by using the SPS (507) as an interoperability negotiation point during capability exchange. Resolution can change, within the limits set by the values in the table (506) from picture to picture by referencing the appropriate picture parameter set (504).

With reference to FIGS. 6A-C, the following embodiments of the present disclosure may convey ARC information in a video bitstream to, for example, a decoder of the present disclosure. Each of those embodiments has certain advantages over comparative art described above. The embodiments may be simultaneously present in the same video coding technology or standard.

In an embodiment with reference to FIG. 6A, ARC information (509) such as a resampling (zoom) factor may be present in a header (508) such as, for example, a slice header, GOB header, tile header, or tile group header. As an example, FIG. 6A illustrates the header (508) as a Tile Group header. Such a configuration can be adequate if the ARC information is small, such as a single variable length ue(v) or fixed length codeword of a few bits, for example as shown in TABLE 1. Having the ARC information directly in a tile group header has the additional advantage that the ARC information may be applicable to a sub picture represented by, for example, the tile group corresponding to the tile group header, rather than the whole picture. In addition, even if the video compression technology or standard uses only whole picture adaptive resolution changes (in contrast to, for example, tile group based adaptive resolution changes), putting the ARC information into a tile group header (e.g. into an H.263-style picture header) has certain advantages from an error resilience viewpoint. While the above description describes the ARC information (509) being present in a tile group header, it will be understood that the above description may also similarly apply in cases where the ARC information (509) is present in, for example, a slice header, GOB header, or tile header.

In the same or another embodiment with reference to FIG. 6B, ARC information (512) itself may be present in an appropriate parameter set (511) such as, for example, a picture parameter set, header parameter set, tile parameter set, adaptation parameter set, and so forth. As an example, FIG. 6B illustrates the parameter set (511) as an adaptation parameter set (APS). The scope of that parameter set can advantageously be no larger than a picture. For example, the scope of the parameter set may be a tile group. The use of the ARC information (512) may be implicit through the activation of the relevant parameter set. For example, when a video coding technology or standard contemplates only picture-based ARC, then a picture parameter set or equivalent may be appropriate as the relevant parameter set.

In the same or another embodiment with reference to FIG. 6C, ARC reference information (513) may be present in a Tile Group header (514) or a similar data structure. The ARC reference information (513) can refer to a subset of ARC information (515) available in a parameter set (516) with a scope beyond a single picture. For example, the parameter set (516) may be a sequence parameter set (SPS) or a decoder parameter set (DPS).

The additional level of indirection implied activation of a PPS from a tile group header, PPS, or SPS as used in JVET-M0135-v1 may be unnecessary, as picture parameter sets, just as sequence parameter sets, can be used for capability negotiation or announcements. However, if ARC information should be applicable to a sub picture that is also represented by, for example, a tile group(s), a parameter set (e.g. an adaptation parameter set or a header parameter set) with an activation scope limited to a tile group may be the better choice. Also, if the ARC information is of more than negligible size—for example contains filter control information such as numerous filter coefficients—then a parameter may be a better choice than using a header directly from a coding efficiency viewpoint, as those settings may be reusable by future pictures or sub-pictures by referencing the same parameter set.

When using the sequence parameter set or another higher parameter set with a scope spanning multiple pictures, certain considerations may apply:

(1) The parameter set (516) to store the ARC information (515) in a table can, in some cases, be a sequence parameter set, but in other cases can advantageously be a decoder parameter set. The decoder parameter set can have an activation scope of multiple CVSs, namely the coded video stream, i.e. all coded video bits from session start until session teardown. Such a scope may be more appropriate because possible ARC factors may be a decoder feature, possibly implemented in hardware, and hardware features tend not to change with any CVS (which in at least some entertainment systems is a Group of Pictures, one second or less in length). Nevertheless, some embodiments may include the ARC information table in the sequence parameter set as described herein, in particular in conjunction with point (2) below.

(2) The ARC reference information (513) may advantageously be placed directly into the header (514) (e.g. picture/slice tile/GOB/tile group header; tile group header henceforth) rather than into the picture parameter set as in JVCET-M0135-v1, The reason is as follows: when an encoder wants to change a single value in a picture parameter set, such as for example the ARC reference information, then the encoder may have to create a new PPS and reference that new PPS. In a case that only the ARC reference information changes, but other information such as, for example, the quantization matrix information in the PPS stays, such information can be of substantial size, and would need to be retransmitted to make the new PPS complete. As the ARC reference information may be a single codeword, such as the index into an ARC information table, which would be the only value that changes, it would be cumbersome and wasteful to retransmit, for example, all the quantization matrix information. Accordingly, placing ARC reference information directly into a header (e.g. header (514)) may be considerably better from a coding efficiency viewpoint because indirection through the PPS, as proposed in JVET-M0135-v1, can be avoided. Also, putting the ARC reference information into the PPS has the additional disadvantage that the ARC information referenced by ARC reference information necessarily needs to apply to the whole picture and not to a sub-picture, as the scope of a picture parameter set activation is a picture.

In the same or another embodiment, the signaling of ARC parameters can follow a detailed example as outlined in FIGS. 7A-B. FIGS. 7A-B depict syntax diagrams. The notation of such syntax diagrams roughly follows C-style programming. Lines in boldface indicate syntax elements present in the bitstream, and lines without boldface often indicate control flow or the setting of variables.

As an example syntax structure of a header applicable to a (possibly rectangular) part of a picture, a tile grouper header (600) can conditionally contain, a variable length, Exp-Golomb coded syntax element dec_pic_size_idx (602) (depicted in boldface). The presence of this syntax element in the tile group header (600) can be gated by the use of adaptive resolution (603). Here, the value of the adaptive resolution flag is not depicted in boldface, which means that the flag is present in the bitstream at the point where it occurs in the syntax diagram. Whether or not adaptive resolution is in use for this picture or parts thereof can be signaled in any high level syntax structure inside or outside the bitstream. In the example illustrated in FIGS. 7A-B, adaptive resolution is signaled in a sequence parameter set (610) as outlined below.

FIG. 7B illustrates an excerpt of the sequence parameter set (610). The first syntax element shown is adaptive_pic_resolution_change_flag (611). When true, such flag can indicate the use of adaptive resolution which, in turn, may require certain control information. In the example, such control information is conditionally present based on the value of the flag based on the if( ) statement (612) in the sequence parameter set (610) and the tile group header (600).

When adaptive resolution is in use, in this example, coded is an output resolution (613) in units of samples. The output resolution (613) in this example embodiment refers to both of syntax elements output_pic_width_in_luma_samples and output_pic_height_in_luma_samples, which together can define the resolution of the output picture. Elsewhere in a video coding technology or standard, certain restrictions to either value can be defined. For example, a level definition may limit the number of total output samples, which could be the product of the value of the above two syntax elements. Also, certain video coding technologies or standards, or external technologies or standards such as, for example, system standards, may limit the numbering range (for example, one or both dimensions must be divisible by a power of 2 number), or the aspect ratio (for example, the width and height must be in a relation such as 4:3 or 16:9). Such restrictions may be introduced to facilitate hardware implementations or for other reasons.

In certain applications, it can be advisable that the encoder instructs the decoder to use a certain reference picture size rather than implicitly assume a size to be the output picture size. In this example, the syntax element reference_pic_size_present_flag (614) gates the conditional presence of reference picture dimensions (615) (again, the numeral refers to both width and height in the example embodiment).

FIG. 7B further illustrates a table of possible decoding picture width and heights. Such a table can be expressed, for example, by a table indication (616) (e.g. syntax element num_dec_pic_size_in_luma_samples_minus1). The "minus1" of the syntax element can refer to the interpretation of the value of that syntax element. For example, if the coded value of the syntax element is zero, one table entry is present. If the coded value is five, six table entries are present. For each "line" in the table, decoded picture width and height are then included in syntaxes as table entries (617).

The table entries (617) presented can be indexed using the syntax element dec_pic_size_idx (602) in the tile group header (600), thereby allowing different decoded sizes—in effect, zoom factors—per tile group.

Certain video coding technologies or standards, for example VP9, support spatial scalability by implementing certain forms of reference picture resampling (which may be signaled quite differently from embodiments of the present disclosure) in conjunction with temporal scalability, so to enable spatial scalability. In particular, certain reference pictures may be upsampled using ARC-style technologies to a higher resolution to form the base of a spatial enhancement layer. Such upsampled pictures could be refined using normal prediction mechanisms at the high resolution so to add detail.

Embodiments of the disclosure can be used in such an environment. In certain cases, in the same or another embodiment, a value in the network abstraction layer (NAL) unit header, for example the Temporal ID field, can be used to indicate not only the temporal but also the spatial layer. Doing so has certain advantages for certain system designs; for example, existing Selected Forwarding Units (SFU) created and optimized for temporal layer selected forwarding based on the NAL unit header Temporal ID value can be used without modification for scalable environments. In order to enable that, embodiments of the present disclosure may include a mapping between the coded picture size and the temporal layer to be indicated by the temporal ID field in the NAL unit header.

In some video coding technologies, an Access Unit (AU) can refer to coded picture(s), slice(s), tile(s), NAL Unit(s), and so forth, that were captured and composed into a respective picture/slice/tile/NAL unit bitstream at a given instance in time. Such instance in time can be the composition time.

In High Efficiency Video Coding (HEVC), and certain other video coding technologies, a picture order count (POC) value can be used for indicating a selected reference picture among multiple reference picture stored in a decoded picture buffer (DPB). When an access unit (AU) comprises one or more pictures, slices, or tiles, each picture, slice, or tile belonging to the same AU may carry the same POC value, from which it can be derived that they were created from content of the same composition time. In other words, it can be determined that two picture/slice/tile belong to the same AU and have the same composition time in a scenario where the two pictures/slices/tiles carry the same given POC value. Conversely, two pictures/tiles/slices having different POC values can indicate those pictures/slices/tiles belong to different AUs and have different composition times.

In an embodiment of the disclosure, the aforementioned rigid relationship can be relaxed in that an access unit can comprise pictures, slices, or tiles with different POC values. By allowing different POC values within an AU, it becomes possible to use the POC value to identify potentially independently decodable pictures/slices/tiles with identical presentation time. Accordingly, the embodiment of the present disclosure can enable support of multiple scalable layers without a change of reference picture selection signaling (e.g. reference picture set signaling or reference picture list signaling), as described in more detail below.

In an embodiment, it is still desirable to be able to identify the AU in which a picture/slice/tile belongs to, with respect to other picture/slices/tiles having different POC values, from the POC value alone. This can be achieved in embodiments as described below.

In the same or other embodiments, an access unit count (AUC) may be signaled in a high-level syntax structure, such as NAL unit header, slice header, tile group header, SEI message, parameter set or AU delimiter. The value of AUC may be used to identify which NAL units, pictures, slices, or tiles belong to a given AU. The value of AUC may be corresponding to a distinct composition time instance. The AUC value may be equal to a multiple of the POC value. By dividing the POC value by an integer value, the AUC value may be calculated. In certain cases, division operations can place a certain burden on decoder implementations. In such cases, small restrictions in the numbering space of the AUC values may allow substitution of the division operation by shift operations performed by embodiments of the present disclosure. For example, the AUC value may be equal to a Most Significant Bit (MSB) value of the POC value range.

In the same embodiment, a value of POC cycle per AU (e.g. syntax element poc_cycle_au) may be signaled in a high-level syntax structure, such as NAL unit header, slice header, tile group header, SEI message, parameter set or AU delimiter. The poc_cycle_au syntax elements may indicate how many different and consecutive POC values can be associated with the same AU. For example, if the value of poc_cycle_au is equal to 4, the pictures, slices or tiles with the POC value equal to 0-3, inclusive, are associated with the AU with AUC value equal to 0, and the pictures, slices or tiles with POC value equal to 4-7, inclusive, are associated with the AU with AUC value equal to 1. Hence, the value of AUC may be inferred by embodiments of the present disclosure by dividing the POC value by the value of poc_cycle_au.

In the same or another embodiment, the value of poc_cycle_au may be derived from information, located for example in the video parameter set (VPS), that identifies the number of spatial or SNR layers in a coded video sequence. Such a possible relationship is briefly described below. While the derivation as described above may save a few bits in the VPS and hence may improves coding efficiency, it can be advantageous to explicitly code poc_cycle_au in an appropriate high level syntax structure hierarchically below the video parameter set, so to be able to minimize poc_cycle_au for a given small part of a bitstream such as a picture. This optimization may save more bits than can be saved through the derivation process above because POC values (and/or values of syntax elements indirectly referring to POC) may be coded in low level syntax structures.

In the same or another embodiment, FIG. 9A illustrates an example of a syntax table to signal the syntax element of vps_poc_cycle_au (632) in VPS (630) or SPS, which indicates the poc_cycle_au used for all picture/slices in a coded video sequence, and FIG. 9B illustrates an example of a syntax table to signal the syntax element of slice_poc_cycle_au (642), which indicates the poc_cycle_au of the current slice in slice header (640). If the POC value increases uniformly per AU, vps_contant_poc_cycle_per_au (634) in VPS (630) is set equal to 1 and vps_poc_cycle_au (632) is signaled in VPS (630). In this case, slice_poc_cycle_au (642) is not explicitly signaled, and the value of AUC for each AU is calculated by dividing the value of POC by vps_poc_cycle_au (632). If the POC value does not increase uniformly per AU, vps_contant_poc_cycle_per_au (634) in VPS (630) is set equal to 0. In this case, vps_access_unit_cnt is not signaled, while slice_access_unit_cnt is signaled in slice header for each slice or picture. Each slice or picture may have a different value of slice_access_unit_cnt. The value of AUC for each AU is calculated by dividing the value of POC by slice_poc_cycle_au (642).

Figure 10:
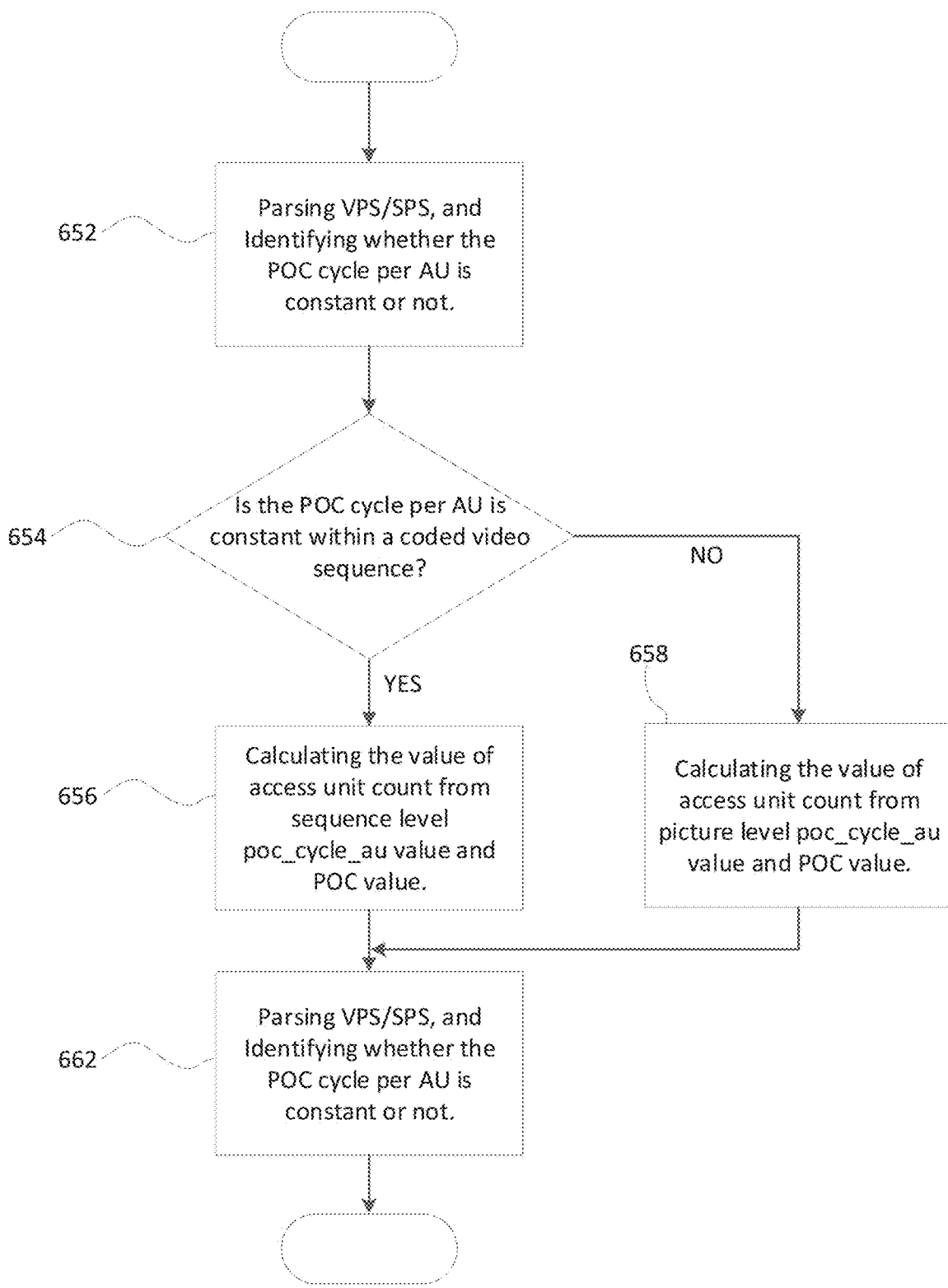
FIG. 10 is a schematic illustration of a simplified block diagram of parsing and decoding POC cycle per access unit and access unit count value in accordance with an embodiment.

FIG. 10 illustrates a block diagram for describing relevant work flow of the embodiment. For example, the decoder (or encoder) parses VPS/SPS an identifies whether the POC cycle per AU is constant or not (652). Following, the decoder (or encoder) makes a decision (654) based on whether the POC cycle per AU is constant within a coded video sequence. That is, if the POC cycle per AU is constant, the decoder (or encoder) calculates the value of the access unit count from the sequence level poc_cycle_au value and POC value (656). Alternatively, if the POC cycle per AU is not constant, the decoder (or encoder) calculates the value of access unit count from the picture level poc_cycle_au value and POC value (658). In either case, the decoder (or encoder) may then repeat the process by, for example, parsing a VPS/SPS, and identifying whether the POC cycle per AU is constant or not (662).

In the same or other embodiments, even though the value of POC of a picture, slice, or tile may be different, the picture, slice, or tile corresponding to an AU with the same AUC value may be associated with the same decoding or output time instance. Hence, without any inter-parsing/decoding dependency across pictures, slices, or tiles in the same AU, all or a subset of pictures, slices, or tiles associated with the same AU may be decoded in parallel, and may be outputted at the same time instance.

In the same or other embodiments, even though the value of POC of a picture, slice, or tile may be different, the picture, slice, or tile corresponding to an AU with the same AUC value may be associated with the same composition/display time instance. When the composition time is contained in a container format, even though pictures correspond to different AUs, if the pictures have the same composition time, the pictures can be displayed at the same time instance.

In the same or other embodiments, each picture, slice, or tile may have the same temporal identifier (e.g. syntax element temporal_id) in the same AU. All or subset of pictures, slices or tiles corresponding to a time instance may be associated with the same temporal sub-layer. In the same or other embodiments, each picture, slice, or tile may have the same or a different spatial layer id (e.g. sytax element layer_id) in the same AU. All or subset of pictures, slices or tiles corresponding to a time instance may be associated with the same or a different spatial layer.

FIG. 8 shows an example of a video sequence structure (680) with combination of temporal_id, layer_id, and POC and AUC values with adaptive resolution change. In this example, a picture, slice, or tile in the first AU with AUC=0 may have temporal_id=0 and layer_id=0 or 1, while a picture, slice, or tile in the second AU with AUC=1 may have temporal_id=1 and layer_id=0 or 1, respectively. The value of POC is increased by 1 per picture regardless of the values of temporal_id and layer_id. In this example, the value of poc_cycle_au can be equal to 2. In an embodiment, the value of poc_cycle_au may be set equal to the number of (spatial scalability) layers. In this example, the value of POC is increased by 2 while the value of AUC is increased by 1. As an example, FIG. 8 illustrates, within the first AU (AUC=0), an I-slice (681) having a POC 0, TID 0, and LID 0, and a B-slice (682) having a POC 1, TID 0, and LID 1. Within the second AU (AUC=1), FIG. 8 illustrates a B-slice (683) having a POC 2, TID 1, and LID 0, and a B-slice (684) having a POC 3, TID 1, and LID 1. Within the third AU (AUC=3), FIG. 8 illustrates a B-slice (685) having a POC 4, TID 0, and LID 0, and a B-slice (686) having a POC 5, TID 0, and LID 1.

In the above embodiments, all or sub-set of inter-picture or inter-layer prediction structure and reference picture indication may be supported by using the existing reference picture set (RPS) signaling in HEVC or the reference picture list (RPL) signaling. In RPS or RPL, the selected reference picture is indicated by signaling the value of POC or the delta value of POC between the current picture and the selected reference picture. In embodiments of the present disclosure, the RPS and RPL can be used to indicate the inter-picture or inter-layer prediction structure without change of signaling, but with the following restrictions. If the value of temporal_id of a reference picture is greater than the value of temporal_id of a current picture, the current picture may not use the reference picture for motion compensation or other predictions. If the value of layer_id of a reference picture is greater than the value of layer_id of the current picture, the current picture may not use the reference picture for motion compensation or other predictions.

In the same and other embodiments, the motion vector scaling based on POC difference for temporal motion vector prediction may be disabled across multiple pictures within an access unit. Hence, although each picture may have a different POC value within an access unit, the motion vector may not be scaled and used for temporal motion vector prediction within an access unit, because a reference picture with a different POC in the same AU may be considered a reference picture having the same time instance. Therefore, in the embodiment, the motion vector scaling function may return 1 when the reference picture belongs to the AU associated with the current picture.

In the same and other embodiments, the motion vector scaling based on POC difference for temporal motion vector prediction may be optionally disabled across multiple pictures, when the spatial resolution of the reference picture is different from the spatial resolution of the current picture. When the motion vector scaling is allowed, the motion vector may be scaled based on both POC difference and the spatial resolution ratio between the current picture and the reference picture.

In the same or another embodiment, the motion vector may be scaled based on AUC difference instead of POC difference for temporal motion vector prediction, especially when the poc_cycle_au has non-uniform value (when vps_contant_poc_cycle_per_au==0). Otherwise (when vps_contant_poc_cycle_per_au==1), the motion vector scaling based on AUC difference may be identical to the motion vector scaling based on POC difference.

In the same or another embodiment, when the motion vector is scaled based on AUC difference, the reference motion vector in the same AU (with the same AUC value) with the current picture is not scaled based on AUC difference and used for motion vector prediction without scaling or with scaling based on spatial resolution ratio between the current picture and the reference picture.

In the same and other embodiments, the AUC value is used for identifying the boundary of AU and used for hypothetical reference decoder (HRD) operation, which needs input and output timing with AU granularity. In most cases, the decoded picture with the highest layer in an AU may be outputted for display. The AUC value and the layer_id value can be used for identifying the output picture.

In an embodiment, a picture may comprise one or more sub-pictures. Each sub-picture may cover a local region or the entire region of the picture. The region supported by a sub-picture may or may not be overlapped with the region supported by another sub-picture. The region composed by one or more sub-pictures may or may not cover the entire region of a picture. If a picture consists of a sub-picture, the region supported by the sub-picture may be identical to the region supported by the picture.

In the same embodiment, a sub-picture may be coded by a coding method similar to the coding method used for the coded picture. A sub-picture may be independently coded or may be coded dependent on another sub-picture or a coded picture. A sub-picture may or may not have any parsing dependency from another sub-picture or a coded picture.

In the same embodiment, a coded sub-picture may be contained in one or more layers. A coded sub-picture in a layer may have a different spatial resolution. The original sub-picture may be spatially re-sampled (up-sampled or down-sampled), coded with different spatial resolution parameters, and contained in a bitstream corresponding to a layer.

In the same or another embodiment, a sub-picture with (W, H), where W indicates the width of the sub-picture and H indicates the height of the sub-picture, respectively, may be coded and contained in the coded bitstream corresponding to layer 0, while the up-sampled (or down-sampled) sub-picture from the sub-picture with the original spatial resolution, with $(W*S_{w,k}, H*S_{h,k})$, may be coded and contained in the coded bitstream corresponding to layer k, where $S_{w,k}$, $S_{h,k}$ indicate the resampling ratios, horizontally and vertically. If the values of $S_{w,k}$, $S_{h,k}$ are greater than 1, the resampling is equal to the up-sampling. Whereas, if the values of $S_{w,k}$, $S_{h,k}$ are smaller than 1, the resampling is equal to the down-sampling.

In the same or another embodiment, a coded sub-picture in a layer may have a different visual quality from that of the coded sub-picture in another layer in the same sub-picture or different sub-picture. For example, sub-picture i in a layer, n, is coded with the quantization parameter, $Q_{i,n}$, while a sub-picture j in a layer, m, is coded with the quantization parameter, $Q_{j,m}$.

In the same or another embodiment, a coded sub-picture in a layer may be independently decodable, without any parsing or decoding dependency from a coded sub-picture in another layer of the same local region. The sub-picture layer, which can be independently decodable without referencing another sub-picture layer of the same local region, is the independent sub-picture layer. A coded sub-picture in the independent sub-picture layer may or may not have a decoding or parsing dependency from a previously coded sub-picture in the same sub-picture layer, but the coded sub-picture may not have any dependency from a coded picture in another sub-picture layer.

In the same or another embodiment, a coded sub-picture in a layer may be dependently decodable, with any parsing or decoding dependency from a coded sub-picture in another layer of the same local region. The sub-picture layer, which can be dependently decodable with referencing another sub-picture layer of the same local region, is the dependent sub-picture layer. A coded sub-picture in the dependent sub-picture may reference a coded sub-picture belonging to the same sub-picture, a previously coded sub-picture in the same sub-picture layer, or both reference sub-pictures.

In the same or another embodiment, a coded sub-picture comprises one or more independent sub-picture layers and one or more dependent sub-picture layers. However, at least one independent sub-picture layer may be present for a coded sub-picture. The independent sub-picture layer may have the value of the layer identifier (e.g. syntax element layer_id), which may be present in NAL unit header or another high-level syntax structure, equal to 0. The sub-picture layer with the layer_id equal to 0 may be the base sub-picture layer.

In the same or another embodiment, a picture may comprise one or more foreground sub-pictures and one background sub-picture. The region supported by a background sub-picture may be equal to the region of the picture. The region supported by a foreground sub-picture may be overlapped with the region supported by a background sub-picture. The background sub-picture may be a base sub-picture layer, while the foreground sub-picture may be a non-base (enhancement) sub-picture layer. One or more non-base sub-picture layers may reference the same base layer for decoding. Each non-base sub-picture layer with layer_id equal to a may reference a non-base sub-picture layer with layer_id equal to b, where a is greater than b.

In the same or another embodiment, a picture may comprise one or more foreground sub-pictures with or without a background sub-picture. Each sub-picture may have its own base sub-picture layer and one or more non-base (enhancement) layers. Each base sub-picture layer may be referenced by one or more non-base sub-picture layers. Each non-base sub-picture layer with layer_id equal to a may reference a non-base sub-picture layer with layer_id equal to b, where a is greater than b.

In the same or another embodiment, a picture may comprise one or more foreground sub-pictures with or without a background sub-picture. Each coded sub-picture in a (base or non-base) sub-picture layer may be referenced by one or more non-base layer sub-pictures belonging to the same sub-picture and one or more non-base layer sub-pictures, which are not belonging to the same sub-picture.

In the same or another embodiment, a picture may comprise one or more foreground sub-pictures with or without a background sub-picture. A sub-picture in a layer a may be further partitioned into multiple sub-pictures in the same layer. One or more coded sub-pictures in a layer b may reference the partitioned sub-picture in a layer a.

In the same or another embodiment, a coded video sequence (CVS) may be a group of the coded pictures. The CVS may comprise of one or more coded sub-picture sequences (CSPS), where the CSPS may be a group of coded sub-pictures covering the same local region of the picture. A CSPS may have the same or a different temporal resolution than that of the coded video sequence.

In the same or another embodiment, a CSPS may be coded and contained in one or more layers. A CSPS may comprise or consist of one or more CSPS layers. Decoding one or more CSPS layers corresponding to a CSPS may reconstruct a sequence of sub-pictures corresponding to the same local region.

In the same or another embodiment, the number of CSPS layers corresponding to a CSPS may be identical to or different from the number of CSPS layers corresponding to another CSPS.

In the same or another embodiment, a CSPS layer may have a different temporal resolution (e.g. frame rate) from another CSPS layer. The original (uncompressed) sub-picture sequence may be temporally re-sampled (up-sampled or down-sampled), coded with different temporal resolution parameters, and contained in a bitstream corresponding to a layer.

In the same or another embodiment, a sub-picture sequence with the frame rate, F, may be coded and contained in the coded bitstream corresponding to layer 0, while the temporally up-sampled (or down-sampled) sub-picture sequence from the original sub-picture sequence, with $F*S_{t,k}$, may be coded and contained in the coded bitstream corresponding to layer k, where $S_{t,k}$ indicates the temporal sampling ratio for layer k. If the value of $S_{t,k}$ is greater than 1, the temporal resampling process is equal to the frame rate up conversion. Whereas, if the value of $S_{t,k}$ is smaller than 1, the temporal resampling process is equal to the frame rate down conversion.

In the same or another embodiment, when a sub-picture with a CSPS layer a is referenced by a sub-picture with a CSPS layer b for motion compensation or any inter-layer prediction, if the spatial resolution of the CSPS layer a is different from the spatial resolution of the CSPS layer b, decoded pixels in the CSPS layer a are resampled and used for reference. The resampling process may need an up-sampling filtering or a down-sampling filtering.

Figure 11:
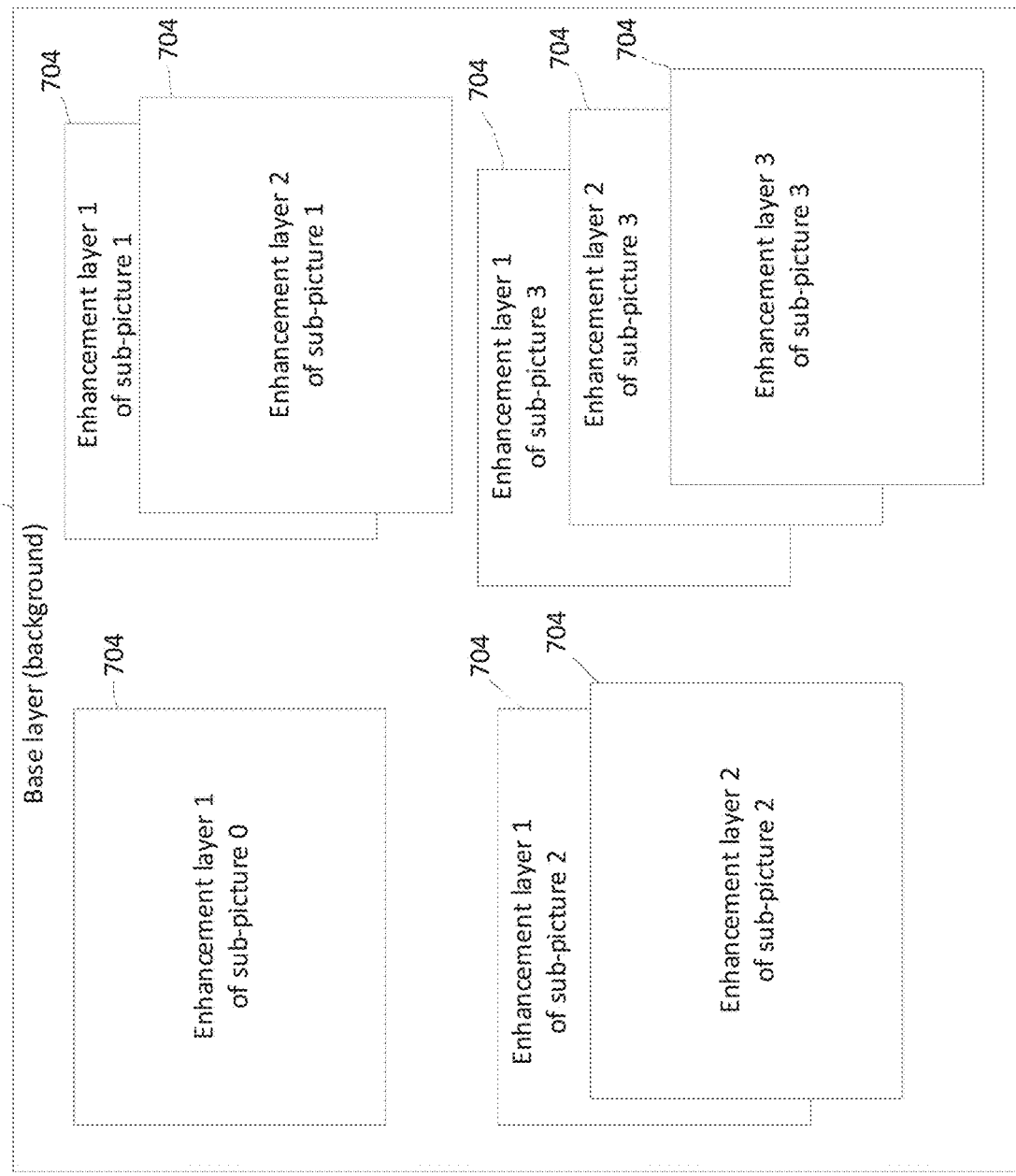
FIG. 11 is a schematic illustration of a video bitstream structure comprising multi-layered sub-pictures in accordance with an embodiment.

FIG. 11 shows an example video stream including a background video CSPS with layer_id equal to 0 and multiple foreground CSPS layers. While a coded sub-picture may comprise of one or more enhancement CSPS layers (704), a background region, which does not belong to any foreground CSPS layer, may comprise a base layer (702). The base layer (702) may contain a background region and foreground regions, while an enhancement CSPS layer (704) contains a foreground region. An enhancement CSPS layer (704) may have a better visual quality than the base layer (702), at the same region. The enhancement CSPS layer (704) may reference the reconstructed pixels and the motion vectors of the base layer (702), corresponding to the same region.

In the same or another embodiment, the video bitstream corresponding to a base layer (702) is contained in a track, while the CSPS layers (704) corresponding to each sub-picture are contained in a separated track, in a video file.

In the same or another embodiment, the video bitstream corresponding to a base layer (702) is contained in a track, while CSPS layers (704) with the same layer_id are contained in a separated track. In this example, a track corresponding to a layer k includes CSPS layers (704) corresponding to the layer k, only.

In the same or another embodiment, each CSPS layer (704) of each sub-picture is stored in a separate track. Each track may or may not have any parsing or decoding dependency from one or more other tracks.

In the same or another embodiment, each track may contain bitstreams corresponding to layer i to layer j of CSPS layers (704) of all or a subset of sub-pictures, where $0<i=<j=<k$, k being the highest layer of CSPS.

In the same or another embodiment, a picture comprises or consists of one or more associated media data including depth map, alpha map, 3D geometry data, occupancy map, etc. Such associated timed media data can be divided to one or multiple data sub-stream each of which corresponding to one sub-picture.

Figure 12:
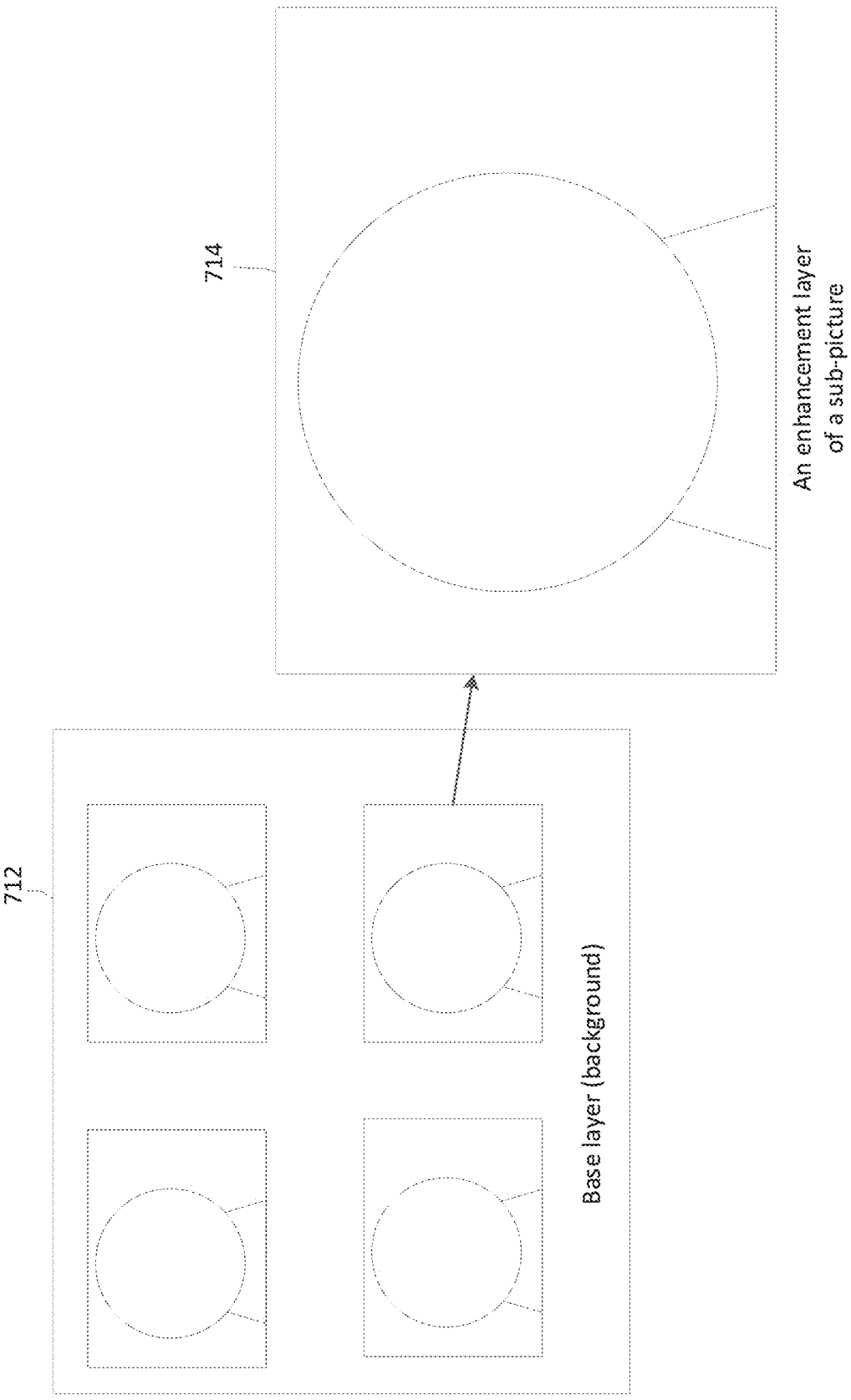
FIG. 12 is a schematic illustration of a display of a selected sub-picture with an enhanced resolution in accordance with an embodiment.

In the same or another embodiment, FIG. 12 shows an example of a video conference based on the multi-layered sub-picture method. In a video stream, one base layer video bitstream corresponding to the background picture and one or more enhancement layer video bitstreams corresponding to foreground sub-pictures are contained. Each enhancement layer video bitstream may correspond to a CSPS layer. In a display, the picture corresponding to the base layer (712) is displayed by default. The base layer (712) may contain one or more user's picture in a picture (PIP). When a specific user is selected by a client's control, the enhancement CSPS layer (714) corresponding to the selected user is decoded and displayed with the enhanced quality or spatial resolution.

Figure 13:
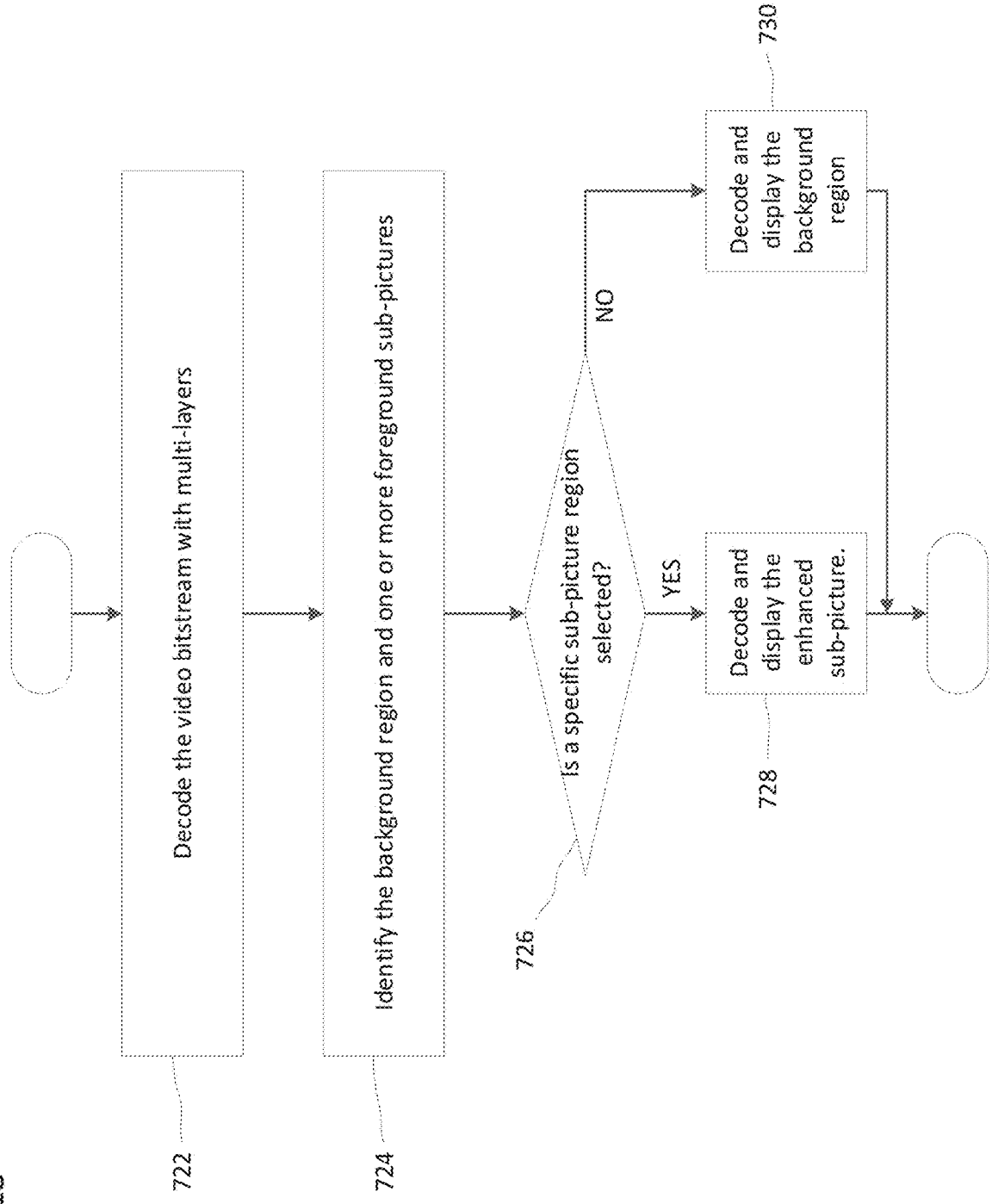
FIG. 13 is a block diagram of the decoding and display process for a video bitstream comprising multi-layered sub-pictures in accordance with an embodiment.

FIG. 13 illustrates a diagram for operation of the embodiment. In the embodiment, a decoder may decode the video bitstream that includes multiple layers such as, for example, one base layer and one or more enhancement CSPS layers (722). Following, the decoder may identify the background region and one or more foreground sub-pictures (724) and make a decision as to whether a specific sub-picture region is selected (726). If a specific sub-picture region corresponding to, for example, a user's PIP is selected (YES), the decoder may decode and display the enhanced sub-picture corresponding to the selected user (728). For example, the decoder may decode and display the image corresponding to the enhancement CSPS layer (714). If no specific sub-picture region is selected (NO), the decoder may decode and display the background region (730). For example, the decoder may decode and display the image corresponding to the base layer (712).

In the same or another embodiment, a network middle box (such as router) may select a subset of layers to send to a user depending on its bandwidth. The picture/sub-picture organization may be used for bandwidth adaptation. For instance, if the user does not have the bandwidth, the router strips of layers or selects some sub-pictures due to their importance or based on used setup. In an embodiment, such processes may be done dynamically to adapt to bandwidth.

Figure 14:
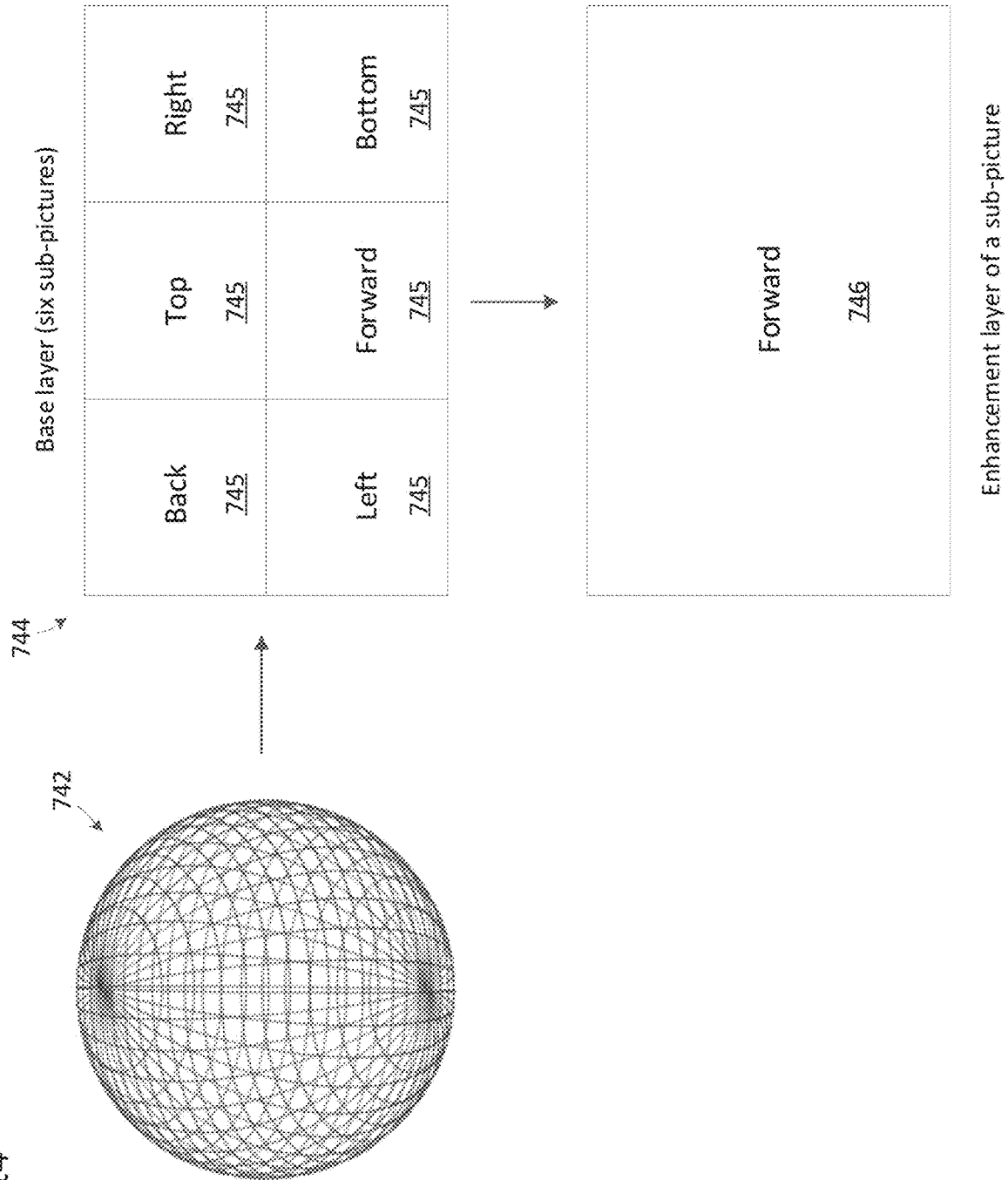
FIG. 14 is a schematic illustration of 360 video display with an enhancement layer of a sub-picture in accordance with an embodiment.

FIG. 14 illustrates an example use case of 360 video. When a spherical 360 picture (742) is projected onto a planar picture, the spherical 360 picture (742) that is projected may be partitioned into multiple sub-pictures (745) as a base layer (744). An enhancement layer (746) of a specific one of the sub-pictures (745) may be coded and transmitted to a client. A decoder may decode both the base layer (744) including all sub-pictures (745) and an enhancement layer (746) of a selected one of the sub-pictures (745). When the current viewport is identical to the selected one of the sub-pictures (745), the displayed picture may have a higher quality with the decoded sub-picture (745) with the enhancement layer (746). Otherwise, the decoded picture with the base layer (744) can be displayed with a lower quality.

In the same or another embodiment, any layout information for display may be present in a file as supplementary information (such as SEI message or metadata). One or more decoded sub-pictures may be relocated and displayed depending on the signaled layout information. The layout information may be signaled by a streaming server or a broadcaster, or may be regenerated by a network entity or a cloud server, or may be determined by a user's customized setting.

Figure 15A:
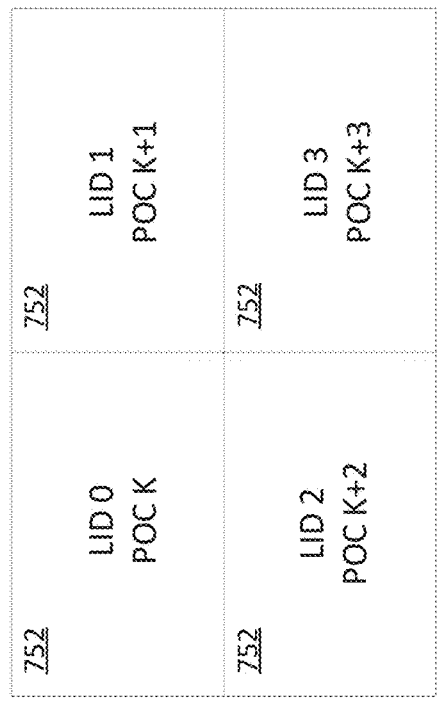
FIG. 15A illustrates an example of a layout of divided sub-pictures in accordance with an embodiment.
Figure 15B:
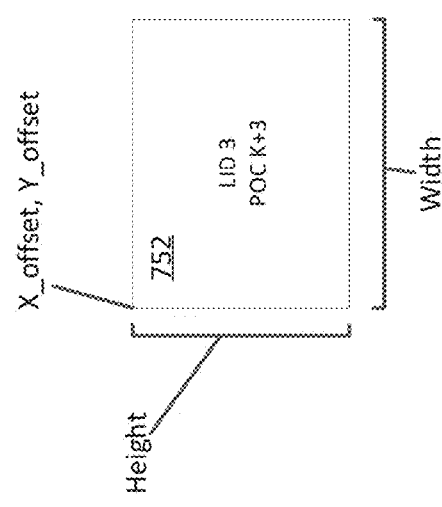
FIG. 15B illustrates an example of a corresponding sub-picture size and position information of one sub-picture in accordance with an embodiment.
Figure 16:
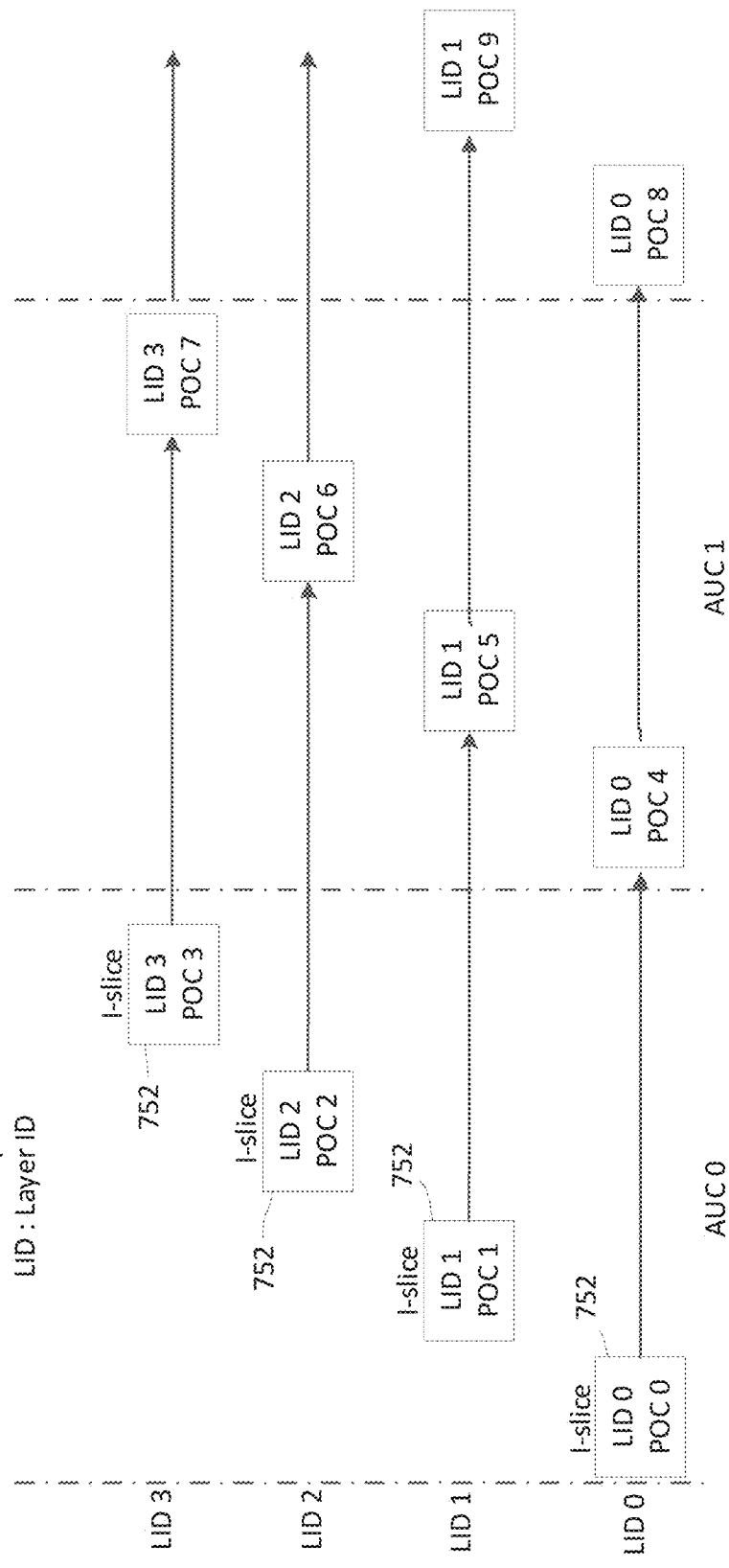
FIG. 16 illustrates a corresponding picture prediction structure of the sub-pictures illustrated in FIGS. 15A-B.

In an embodiment, when an input picture is divided into one or more (rectangular) sub-region(s), each sub-region may be coded as an independent layer. Each independent layer corresponding to a local region may have a unique layer_id value. For each independent layer, the sub-picture size and location information may be signaled. For example, picture size (width, height) and offset information of the left-top corner (x_offset, y_offset) may be signaled. FIG. 15A illustrates an example of the layout of divided sub-pictures (752), FIG. 15B illustrates an example of a corresponding sub-picture size and position information of one of the sub-pictures (752), and FIG. 16 illustrates the corresponding picture prediction structure. The layout information including the sub-picture size(s) and the sub-picture position(s) may be signaled in a high-level syntax structure, such as parameter set(s), header of slice or tile group, or SEI message.

In the same embodiment, each sub-picture corresponding to an independent layer may have its unique POC value within an AU. When a reference picture among pictures stored in DPB is indicated by using syntax element(s) in RPS or RPL structure, the POC value(s) of each sub-picture corresponding to a layer may be used.

In the same or another embodiment, in order to indicate the (inter-layer) prediction structure, the layer_id may not be used and the POC (delta) value may be used.

In the same embodiment, a sub-picture with a POC value equal to N corresponding to a layer (or a local region) may or may not be used as a reference picture of a sub-picture with a POC value equal to K+N, corresponding to the same layer (or the same local region) for motion compensated prediction. In most cases, the value of the number K may be equal to the maximum number of (independent) layers, which may be identical to the number of sub-regions.

Figure 17:
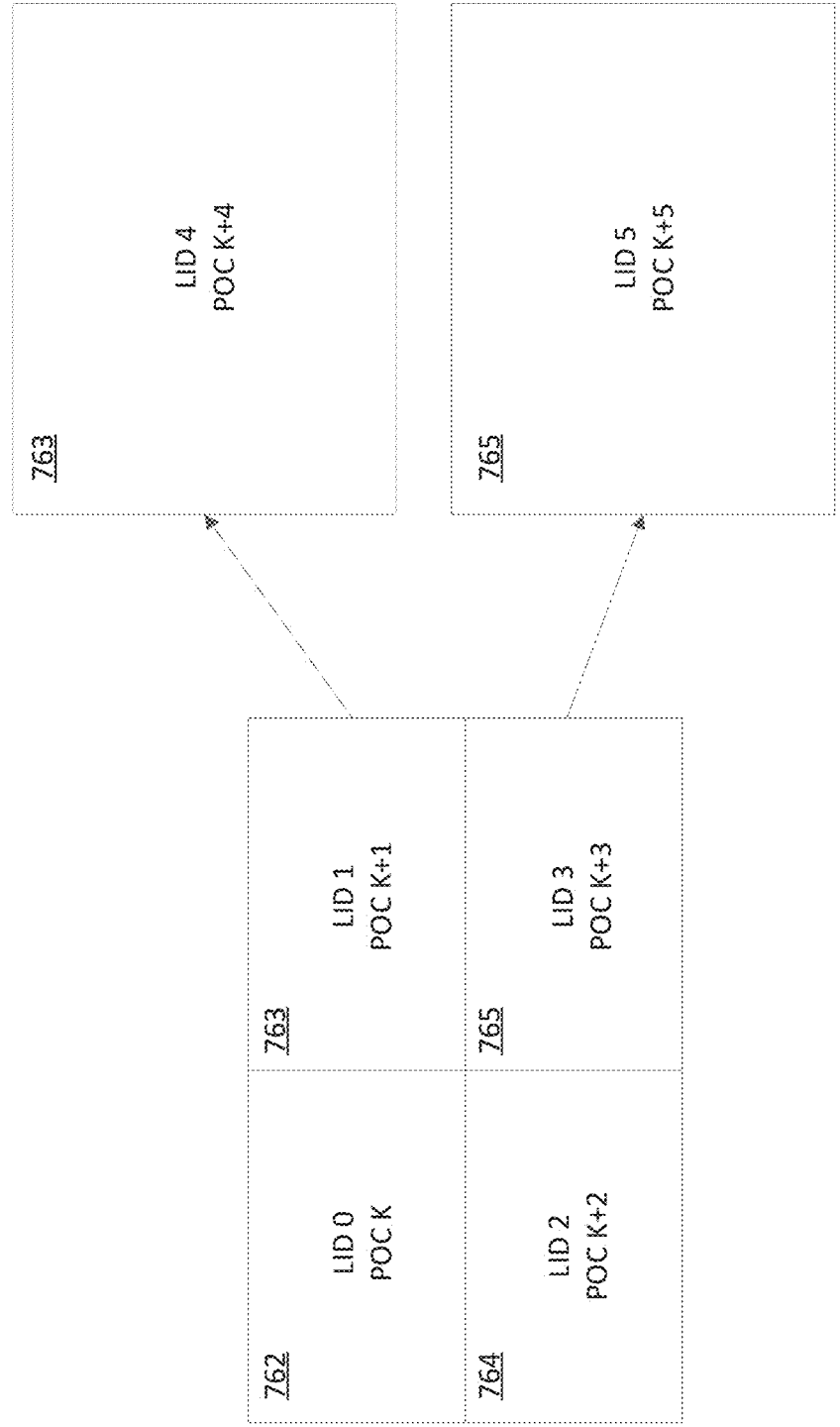
FIG. 17 illustrates an example of an input picture divided into multiple sub-regions that may be coded with one or more layers, in accordance with an embodiment.
Figure 18:
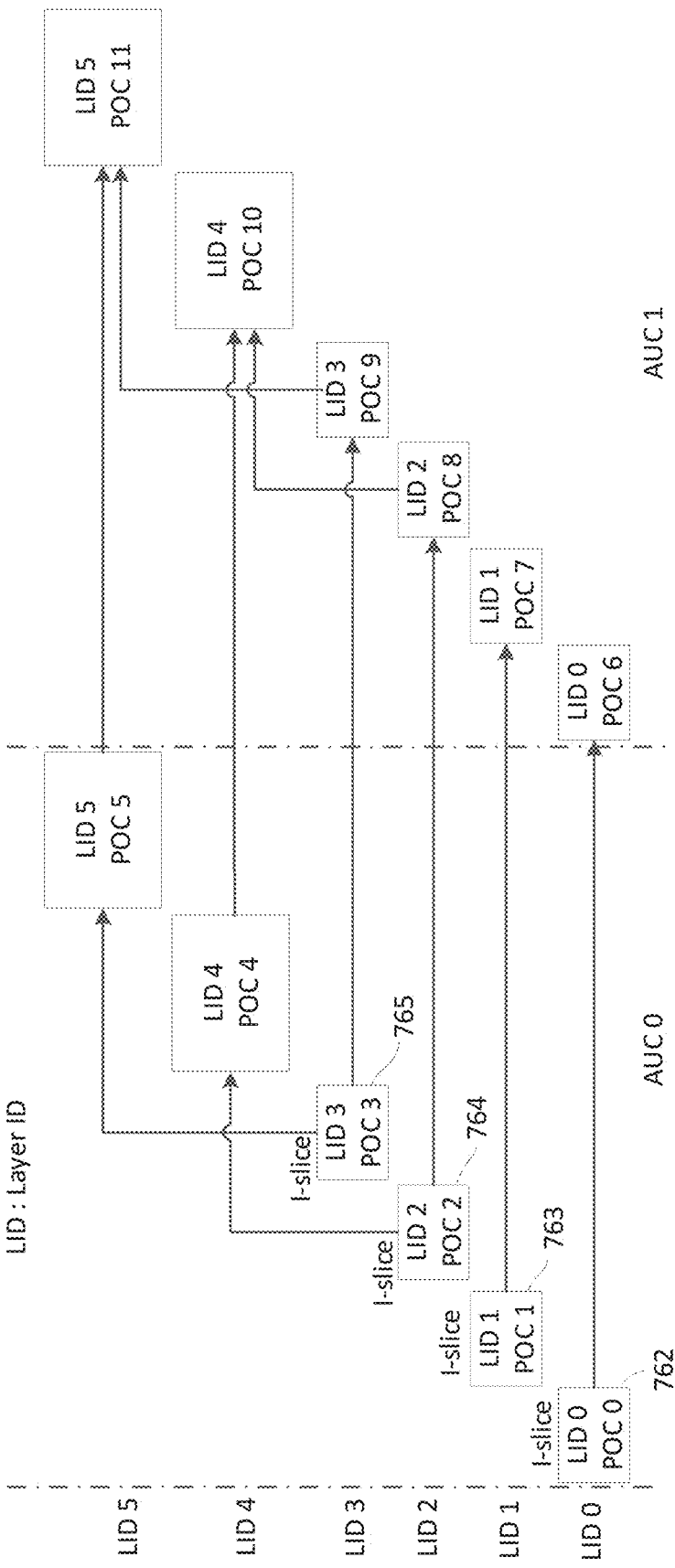
FIG. 18 illustrates a corresponding layer and picture prediction structure, with spatial scalability modality of local region, of the sub-regions illustrated in FIG. 17.

In the same or another embodiment, FIGS. 17-18 illustrate an extended case of FIGS. 15A-B and FIG. 16. When an input picture is divided into multiple (e.g. four) sub-regions, each local region may be coded with one or more layers. In the case, the number of independent layers may be equal to the number of sub-regions, and one or more layers may correspond to a sub-region. Thus, each sub-region may be coded with one or more independent layer(s) and zero or more dependent layer(s).

In the same embodiment, with reference to FIG. 17, the input picture may be divided into four sub-regions, including a top-left sub-region (762), a top-right sub-region (763), a bottom-left sub-region (764), and a bottom-right sub-region (765). The top-right sub-region (763) may be coded as two layers, which are layer 1 and layer 4, while the bottom-right sub-region (765) may be coded as two layers, which are layer 3 and layer 5. In this case, the layer 4 may reference the layer 1 for motion compensated prediction, while the layer 5 may reference the layer 3 for motion compensation.

In the same or another embodiment, in-loop filtering (such as deblocking filtering, adaptive in-loop filtering, reshaper, bilateral filtering or any deep-learning based filtering) across layer boundary may be (optionally) disabled.

In the same or another embodiment, motion compensated prediction or intra-block copy across layer boundary may be (optionally) disabled.

In the same or another embodiment, boundary padding for motion compensated prediction or in-loop filtering at the boundary of sub-picture may be processed optionally. A flag indicating whether the boundary padding is processed or not may be signaled in a high-level syntax structure, such as parameter set(s) (VPS, SPS, PPS, or APS), slice or tile group header, or SEI message.

In the same or another embodiment, the layout information of sub-region(s) (or sub-picture(s)) may be signaled in VPS or SPS. FIG. 19A shows an example of syntax elements in a VPS (770), and FIG. 19B shows an example of syntax elements of an SPS (780). In this example, vps_sub_picture_dividing_flag (772) is signaled in VPS (770). The flag may indicate whether input picture(s) are divided into multiple sub-regions or not. When the value of vps_sub_picture_dividing_flag (772) is equal to 0, the input picture(s) in the coded video sequence(s) corresponding to the current VPS may not be divided into multiple sub-regions. In this case, the input picture size may be equal to the coded picture size (pic_width_in_luma_samples (786), pic_height_in_luma_samples (788)), which is signaled in SPS (680). When the value of vps_sub_picture_dividing_flag (772) is equal to 1, the input picture(s) may be divided into multiple sub-regions. In this case, the syntax elements vps_full_pic_width_in_luma_samples (774) and vps_full_pic_height_in_luma_samples (776) are signaled in VPS (770). The values of vps_full_pic_width_in_luma_samples (774) and vps_full_pic_height_in_luma_samples (776) may be equal to the width and height of the input picture(s), respectively.

In the same embodiment, the values of vps_full_pic_width_in_luma_samples (774) and vps_full_pic_height_in_luma_samples (776) may not be used for decoding, but may be used for composition and display.

In the same embodiment, when the value of vps_sub_picture_dividing_flag (772) is equal to 1, the syntax elements pic_offset_x (782) and pic_offset_y (784)) may be signaled in SPS (780), which corresponds to a specific layer(s). In this case, the coded picture size (pic_width_in_luma_samples (786), pic_height_in_luma_samples (788)) signaled in SPS (780) may be equal to the width and height of the sub-region corresponding to a specific layer. Also, the position (pic_offset_x (782), pic_offset_y (784)) of the left-top corner of the sub-region may be signaled in SPS (780).

In the same embodiment, the position information (pic_offset_x (782), pic_offset_y (784)) of the left-top corner of the sub-region may not be used for decoding, but may be used for composition and display.

In the same or another embodiment, the layout information (size and position) of all or sub-set sub-region(s) of (an) input picture(s), and the dependency information between layer(s) may be signaled in a parameter set or an SEI message. FIG. 20 illustrates an example of syntax elements that indicate the information of the layout of sub-regions, the dependency between layers, and the relation between a sub-region and one or more layers. In this example, the syntax element num_sub_region (791) indicates the number of (rectangular) sub-regions in the current coded video sequence. The syntax element num_layers (792) indicates the number of layers in the current coded video sequence. The value of num_layers (792) may be equal to or greater than the value of num_sub_region (791). When any sub-region is coded as a single layer, the value of num_layers (792) may be equal to the value of num_sub_region (791). When one or more sub-regions are coded as multiple layers, the value of num_layers (792) may be greater than the value of num_sub_region (791). The syntax element direct_dependency_flag[i][j] (793) indicates the dependency from the j-th layer to the i-th layer. The syntax element num_layers_for_region[i] (794) indicates the number of layers associated with the i-th sub-region. The syntax element sub_region_layer_id[i][j] (795) indicates the layer_id of the j-th layer associated with the i-th sub-region. The syntax elements sub_region_offset_x[i] (796) and sub_region_offset_y[i] (797) indicate the horizontal and vertical location of the left-top corner of the i-th sub-region, respectively. The syntax elements sub_region_width [i] (798) and sub_region_height[i] (799) indicate the width and height of the i-th sub-region, respectively.

In one embodiment, one or more syntax elements that specify the output layer set to indicate one of more layers to be outputted with or without profile tier level information may be signaled in a high-level syntax structure (e.g. VPS, DPS, SPS, PPS, APS, or SEI message). Referring to FIG. 21, the syntax element num_output_layer_sets (804) indicating the number of output layer set (OLS) in a coded video sequence referring to a VPS may be signaled in the VPS. For each output layer set, the syntax element output_layer_flag (810) may be signaled as many times as the number of output layers.

In the same embodiment, the syntax element output_layer_flag (810) equal to 1 specifies that the i-th layer is output. The syntax element output_layer_flag (810) equal to 0 specifies that the i-th layer is not output.

In the same or another embodiment, one or more syntax elements that specify the profile tier level information for each output layer set may be signaled in a high-level syntax structure (e.g. VPS, DPS, SPS, PPS, APS, or SEI message). Still referring to FIG. 21, the syntax element num_profile_tier_level (806) indicating the number of profile tier level information per OLS in the coded vide sequence referring to the VPS may be signaled in the VPS. For each output layer set, a set of syntax elements for profile tier level information or an index indicating a specific profile tier level information among entries in the profile tier level information may be signaled as many times as the number of output layers.

In the same embodiment, the syntax element profile_tier_level_idx[i][j](812) specifies the index, into the list of profile_tier_level( ) (808) syntax structures in the VPS, of the profile_tier_level( ) (808) syntax structure that applies to the j-th layer of the i-th OLS.

Profiles, tiers, and levels (and corresponding information thereof) may specify restrictions on bitstreams and, thus, limits on capabilities needed for decoding the bitstreams. Profiles, tiers, and levels (and corresponding information thereof) may also be used to indicate interoperability points between individual decoder implementations. A profile may be a subset of the entire bitstream syntax of, for example, a standard. Each profile (and corresponding information thereof) may specify a subset of algorithmic features and limits that may be supported by all decoders conforming to the profile. Tiers and levels may be specified within each profile, and a level of a tier may be a specified set of constraints imposed on values of the syntax elements in the bitstream. Each level of a tier (and corresponding information thereof) may specify a set of limits on the values and/or limits on arithmetic combinations of values that may be taken by the syntax elements of the disclosure. The same set of tier and level definitions may be used with all profiles, but individual implementations may support a different tier and within a tier a different level for each supported profile. For any given profile, a level of a tier may correspond to a particular decoder processing load and memory capability. A level specified for a lower tier may be more constrained than a level specified for a higher tier.

In the same or another embodiment, referring to FIG. 22, the syntax elements num_profile_tier_level (806) and/or num_output_layer_sets (804) may be signaled when the number of maximum layers is greater than 1 (vps_max_layers_minus1>0).

In the same or another embodiment, referring to FIG. 22, the syntax element vps_output_layers_mode[i] (822) indicating the mode of output layer signaling for the i-th output layer set may be present in VPS.

In the same embodiment, the syntax element vps_output_layers_mode[i](822) equal to 0 specifies that only the highest layer is output with the i-th output layer set. The syntax element vps_output_layers_mode[i] (822) equal to 1 specifies that all layers are output with the i-th output layer set. The syntax element vps_output_layers_mode[i] (822) equal to 2 specifies that the layers that are output are the layers with vps_output_layer_flag[i][j] equal to 1 with the i-th output layer set. More values may be reserved.

In the same embodiment, the syntax element output_layer_flag[i][j] (810) may or may not be signaled depending on the value of the syntax element vps_output_layers_mode[i] (822) for the i-th output layer set.

In the same or another embodiment, referring to FIG. 22, the flag vps_ptl_signal_flag[i] (824) may be present for the i-th output layer set. Depending on the value of vps_ptl_signal_flag[i] (824), the profile tier level information for the i-th output layer set may or may not be signaled.

In the same or another embodiment, referring to FIG. 23, the number of sub-pictures, max_subpics_minus1, in the current CVS may be signalled in a high-level syntax structure (e.g. VPS, DPS, SPS, PPS, APS, or SEI message).

In the same embodiment, referring to FIG. 23, the sub-picture identifier, sub_pic_id[i] (821), for the i-th sub-picture may be signalled, when the number of sub-pictures is greater than 1 (max_subpics_minus1>0).

In the same or another embodiment, one or more syntax elements indicating the sub-picture identifier belonging to each layer of each output layer set may be signalled in VPS. Referring to FIG. 23, the identifier sub_pic_id_layer[i][j][k] (826) indicates the k-th sub-picture present in the j-th layer of the i-th output layer set. By using the information of the identifier sub_pic_id_layer[i][j][k] (826), a decoder may recognize which sub-picture may be decoded and outputtted for each layer of a specific output layer set.

In an embodiment, picture header (PH) is a syntax structure containing syntax elements that apply to all slices of a coded picture. A picture unit (PU) is a set of NAL units that are associated with each other according to a specified classification rule, are consecutive in decoding order, and contain exactly one coded picture. A PU may contain a picture header (PH) and one or more video coding layer (VCL) NAL units composing a coded picture.

In an embodiment, an SPS (RBSP) may be available to the decoding process prior to being referenced, by being included in at least one AU with TemporalId equal to 0 or provided through external means.

In an embodiment, an SPS (RBSP) may be available to the decoding process prior to being referenced, by being included in at least one AU with TemporalId equal to 0 in the CVS, which contains one or more PPS referring to the SPS, or provided through external means.

In an embodiment, an SPS (RBSP) may be available to the decoding process prior to being referenced by one or more PPS, by being included in at least one PU with nuh_layer_id equal to the lowest nuh_layer_id value of the PPS NAL units that refer to the SPS NAL unit in the CVS, which contains one or more PPS referring to the SPS, or provided through external means.

In an embodiment, an SPS (RBSP) may be available to the decoding process prior to being referenced by one or more PPS, by being included in at least one PU with TemporalId equal to 0 and nuh_layer_id equal to the lowest nuh_layer_id value of the PPS NAL units that refer to the SPS NAL unit or provided through external means.

In an embodiment, an SPS (RBSP) may be available to the decoding process prior to being referenced by one or more PPS, by being included in at least one PU with TemporalId equal to 0 and nuh_layer_id equal to the lowest nuh_layer_id value of the PPS NAL units that refer to the SPS NAL unit in the CVS, which contains one or more PPS referring to the SPS, or provided through external means or provided through external means.

In the same or another embodiment, an identifier pps_seq_parameter_set_id specifies the value of an identifier sps_seq_parameter_set_id for the referenced SPS. The value of the identifier pps_seq_parameter_set_id may be the same in all PPSs that are referred to by coded pictures in a coded layer video sequence (CLVS).

In the same or another embodiment, all SPS NAL units with a particular value of the identifier sps_seq_parameter_set_id in a CVS may have the same content.

In the same or another embodiment, regardless of the nuh_layer_id values, SPS NAL units may share the same value space of the identifier sps_seq_parameter_set_id.

In the same or another embodiment, the nuh_layer_id value of an SPS NAL unit may be equal to the lowest nuh_layer_id value of the PPS NAL units that refer to the SPS NAL unit.

In an embodiment, when an SPS with nuh_layer_id equal to m is referred to by one or more PPS with nuh_layer_id equal to n, the layer with nuh_layer_id equal to m may be the same as the layer with nuh_layer_id equal to n or a (direct or indirect) reference layer of the layer with nuh_layer_id equal to m.

In an embodiment, a PPS (RBSP) may be available to the decoding process prior to being referenced, by being included in at least one AU with TemporalId equal to the TemporalId of the PPS NAL unit or provided through external means.

In an embodiment, a PPS (RBSP) may be available to the decoding process prior to being referenced, by being included in at least one AU with TemporalId equal to the TemporalId of the PPS NAL unit in the CVS, which contains one or more PHs (or coded slice NAL units) referring to the PPS, or provided through external means.

In an embodiment, a PPS (RBSP) may be available to the decoding process prior to being referenced by one or more PHs (or coded slice NAL units), by being included in at least one PU with nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In an embodiment, a PPS (RBSP) may be available to the decoding process prior to it being referenced by one or more PHs (or coded slice NAL units), by being included in at least one PU with TemporalId equal to the TemporalId of the PPS NAL unit and nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In the same or another embodiment, an identifier ph_pic_parameter_set_id in PH specifies the value of an identifier pps_pic_parameter_set_id for the referenced PPS in use. The value of pps_seq_parameter_set_id may be the same in all PPSs that are referred to by coded pictures in a CLVS.

In the same or another embodiment, all PPS NAL units with a particular value of the identifier pps_pic_parameter_set_id within a PU may have the same content.

In the same or another embodiment, regardless of the nuh_layer_id values, PPS NAL units may share the same value space of the identifier pps_pic_parameter_set_id.

In the same or another embodiment, the nuh_layer_id value of a PPS NAL unit may be equal to the lowest nuh_layer_id value of the coded slice NAL units that refer to the NAL unit that refers to the PPS NAL unit.

In an embodiment, when a PPS with nuh_layer_id equal to m is referred to by one or more coded slice NAL units with nuh_layer_id equal to n, the layer with nuh_layer_id equal to m may be the same as the layer with nuh_layer_id equal to n or a (direct or indirect) reference layer of the layer with nuh_layer_id equal to m.

In an embodiment, a PPS (RBSP) may be available to the decoding process prior to it being referenced, by being included in at least one AU with TemporalId equal to the TemporalId of the PPS NAL unit or provided through external means.

In an embodiment, a PPS (RBSP) may be available to the decoding process prior to being referenced, by being included in at least one AU with TemporalId equal to the TemporalId of the PPS NAL unit in the CVS, which contains one or more PHs (or coded slice NAL units) referring to the PPS, or provided through external means.

In an embodiment, a PPS (RBSP) may be available to the decoding process prior to being referenced by one or more PHs (or coded slice NAL units), by being included in at least one PU with nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In an embodiment, a PPS (RBSP) may be available to the decoding process prior to being referenced by one or more PHs (or coded slice NAL units), by being included in at least one PU with TemporalId equal to the TemporalId of the PPS NAL unit and nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In the same or another embodiment, an identifier ph_pic_parameter_set_id in PH specifies the value of an identifier pps_pic_parameter_set_id for the referenced PPS in use. The value of the identifier pps_seq_parameter_set_id may be the same in all PPSs that are referred to by coded pictures in a CLVS.

In the same or another embodiment, all PPS NAL units with a particular value of pps_pic_parameter_set_id within a PU may have the same content.

In the same or another embodiment, regardless of the nuh_layer_id values, PPS NAL units may share the same value space of the identifier pps_pic_parameter_set_id.

In the same or another embodiment, the nuh_layer_id value of a PPS NAL unit may be equal to the lowest nuh_layer_id value of the coded slice NAL units that refer to the NAL unit that refer to the PPS NAL unit.

In an embodiment, when a PPS with nuh_layer_id equal to m is referred to by one or more coded slice NAL units with nuh_layer_id equal to n, the layer with nuh_layer_id equal to m may be the same as the layer with nuh_layer_id equal to n or a (direct or indirect) reference layer of the layer with nuh_layer_id equal to m.

An output layer may be a layer of an output layer set that is output. An output layer set (OLS) may be a set of layers that is specified, where one or more layers in the set of layers are specified to be output layers. An output layer set (OLS) layer index is an index, of a layer in an OLS, to the list of layers in the OLS.

A sublayer may be a temporal scalable layer of a temporal scalable bitstream, of the sublayer including VCL NAL units with a particular value of the TemporalId variable and the associated non-VCL NAL units. A sublayer representation may be a subset of the bitstream that includes NAL units of a particular sublayer and the lower sublayers.

A VPS RBSP may be available to the decoding process prior to being referenced, by being included in at least one AU with TemporalId equal to 0 or provided through external means. All VPS NAL units with a particular value of vps_video_parameter_set_id in a CVS may have the same content.

With reference to FIGS. 24-25, syntax elements of example VPS RBSPs are described below.

The syntax element vps_video_parameter_set_id (842) provides an identifier for the VPS for reference by other syntax elements. The value of the syntax element vps_video_parameter_set_id (842) may be greater than 0.

The syntax element vps_max_layers_minus1 (802) plus 1 specifies the maximum allowed number of layers in each CVS referring to the VPS.

The syntax element vps_max_sublayers_minus1 (846) plus 1 specifies the maximum number of temporal sublayers that may be present in a layer in each CVS referring to the VPS. The value of the syntax element vps_max_sublayers_minus1 (846) may be in the range of 0 to 6, inclusive.

The syntax element vps_all_layers_same_num_sublayers_flag (848) equal to 1 specifies that the number of temporal sublayers is the same for all the layers in each CVS referring to the VPS. The syntax element vps_all_layers_same_num_sublayers_flag (848) equal to 0 specifies that the layers in each CVS referring to the VPS may or may not have the same number of temporal sublayers. When not present, the value of vps_all_layers_same_num_sublayers_flag (848) may be inferred to be equal to 1.

layer with index i. When the syntax element vps_direct_ref_layer_flag[i][j] (856) is not present for i and j in the range of 0 to vps_max_layers_minus1, inclusive, is the syntax element may be inferred to be equal to 0. When the syntax element vps_independent_layer_flag[i] (854) is equal to 0, there may be at least one value of j in the range of 0 to i−1, inclusive, such that the value of the syntax element vps_direct_ref_layer_flag[i][j] (856) is equal to 1.

The variables NumDirectRefLayers[i], DirectRefLayerIdx[i][d], NumRefLayers[i], RefLayerIdx[i][r], and LayerUsedAsRefLayerFlag[j] may be derived as follows:

```
for( i = 0; i <= vps_max_layers_minus1; i++ ) {
  for( j = 0; j <= vps_max_layers_minus1; j++ ) {
    dependencyFlag[ i ][ j ] = vps_direct_ref_layer_flag[ i ][ j ]
    for( k = 0; k < i; k++ )
      if( vps_direct_ref_layer_flag[ i ][ k ]
      && dependencyFlag[ k ][ j ] )
        dependencyFlag[ i ][ j ] = 1
  }
  LayerUsedAsRefLayerFlag[ i ] = 0
}
for( i = 0; i <= vps_max_layers_minus1; i++ ) {
  for( j = 0, d = 0, r = 0; j <=
  vps_max_layers_minus1; j++ ) {     (37)
    if( vps_direct_ref_layer_flag[ i ][ j ] ) {
      DirectRefLayerIdx[ i ][ d++ ] = j
      LayerUsedAsRefLayerFlag[ j ] = 1
    }
    if( dependencyFlag[ i ][ j ] )
      RefLayerIdx[ i ][ r++ ] = j
  }
  NumDirectRefLayers[ i ] = d
  NumRefLayers[ i ] = r
}
```

The syntax element vps_all_independent_layers_flag (850) equal to 1 specifies that all layers in the CVS are independently coded without using inter-layer prediction.

The variable GeneralLayerIdx[i], specifying the layer index of the layer with nuh_layer_id equal to vps_layer_id[i] (852), may be derived as follows:

```
for( i = 0; i <= vps_max_layers_minus1; i++ )    (38)
  GeneralLayerIdx[ vps_layer_id[ i ] ] = i
```

The syntax element vps_all_independent_layers_flag (850) equal to 0 specifies that one or more of the layers in the CVS may use inter-layer prediction. When not present, the value of vps_all_independent_layers_flag (850) may be inferred to be equal to 1.

The syntax element vps_layer_id[i] (852) specifies the nuh_layer_id value of the i-th layer. For any two non-negative integer values of m and n, when m is less than n, the value of vps_layer_id[m] may be less than vps_layer_id[n].

The syntax element vps_independent_layer_flag[i] (854) equal to 1 specifies that the layer with index i does not use inter-layer prediction. The syntax element vps_independent_layer_flag[i] (854) equal to 0 specifies that the layer with index i may use inter-layer prediction and the syntax elements vps_direct_ref_layer_flag[i][j] for j in the range of 0 to i−1, inclusive, are present in VPS. When not present, the value of the syntax element vps_independent_layer_flag[i] (854) may be inferred to be equal to 1.

The syntax element vps_direct_ref_layer_flag[i][j] (856) equal to 0 specifies that the layer with index j is not a direct reference layer for the layer with index i. The syntax element vps_direct_ref_layer_flag [i][j] (856) equal to 1 specifies that the layer with index j is a direct reference layer for the For any two different values of i and j, both in the range of 0 to vps_max_layers_minus1 (846), inclusive, when dependencyFlag[i][j] equal to 1, it may be a requirement of bitstream conformance that the values of chroma_format_idc and bit_depth_minus8 that apply to the i-th layer may be equal to the values of chroma_format_idc and bit depth_minus8, respectively, that apply to the j-th layer.

The syntax element max_tid_ref_present_flag[i] (858) equal to 1 specifies that the syntax element max tid_il_ref_pics_plus1[i] (860) is present. The syntax element max_tid_ref_present_flag[i] (858) equal to 0 specifies that the syntax element max_tid_il_ref_pics_plus1[i] (860) is not present.

The syntax element max tid_il_ref_pics_plus1[i] (860) equal to 0 specifies that inter-layer prediction is not used by non-IRAP pictures of the i-th layer. The syntax element max_tid_il_ref_pics_plus1[i] (860) greater than 0 specifies that, for decoding pictures of the i-th layer, no picture with TemporalId greater than max_tid_il_ref_pics_plus1[i]−1 is used as inter-layer reference picture (ILRP). When not present, the value of the syntax element max tid_il_ref_pics_plus1[i] (860) may be inferred to be equal to 7.

The syntax element each_layer_is_an_ols_flag (862) equal to 1 specifies that each OLS contains only one layer and each layer itself in a CVS referring to the VPS is an OLS with the single included layer being the only output layer. The syntax element each_layer_is_an_ols_flag (862) equal to 0 specifies that an OLS may contain more than one layer. If the syntax element vps_max_layers_minus1 is equal to 0, the value of the syntax element each_layer_is_an_ols_flag (862) may be inferred to be equal to 1. Otherwise, when the syntax element vps_all_independent_layers_flag (854) is equal to 0, the value of the syntax element each_layer_is_an_ols_flag (862) may be inferred to be equal to 0.

The syntax element ols_mode_ide (864) equal to 0 specifies that the total number of OLSs specified by the VPS is equal to vps_max_layers_minus1+1, the i-th OLS includes the layers with layer indices from 0 to i, inclusive, and for each OLS only the highest layer in the OLS is output.

The syntax element ols_mode_idc (864) equal to 1 specifies that the total number of OLSs specified by the VPS is equal to vps_max_layers_minus1+1, the i-th OLS includes the layers with layer indices from 0 to i, inclusive, and for each OLS all layers in the OLS are output.

The syntax element ols_mode_idc (864) equal to 2 specifies that the total number of OLSs specified by the VPS is explicitly signalled and for each OLS the output layers are explicitly signalled and other layers are the layers that are direct or indirect reference layers of the output layers of the OLS.

The value of the syntax element ols_mode_idc (864) may be in the range of 0 to 2, inclusive. The value 3 of the syntax element ols_mode_idc (864) may be reserved for future use by ITU-T ISO/IEC.

When the syntax element vps_all_independent_layers_flag (850) is equal to 1 and each_layer_is_an_ols_flag (862) is equal to 0, the value of the syntax element ols_mode_idc (864) may be inferred to be equal to 2.

The syntax element num_output_layer_sets_minus1 (866) plus 1 specifies the total number of OLSs specified by the VPS when the syntax element ols_mode_idc (864) is equal to 2.

The variable TotalNumOlss, specifying the total number of OLSs specified by the VPS, may be derived as follows:

```
if( vps_max_layers_minus1 = = 0 )
 TotalNumOlss = 1
else if( each_layer_is_an_ols_flag | |
ols_mode_idc = = 0 | | ols_mode_idc = = 1 )
 TotalNumOlss = vps_max_layers_minus1 + 1
else if( ols_mode_idc = = 2 )
 TotalNumOlss = num_output_layer_sets_minus1 + 1
```

The syntax element ols_output_layer_flag[i][j](868) equal to 1 specifies that the layer with nuh_layer_id equal to vps_layer_id[j] is an output layer of the i-th OLS when ols_mode_ide (864) is equal to 2. The syntax element ols_output_layer_flag[i][j] (868) equal to 0 specifies that the layer with nuh_layer_id equal to vps_layer_id[j] is not an output layer of the i-th OLS when the syntax element ols_mode_idc (864) is equal to 2.

The variable NumOutputLayersInOls[i], specifying the number of output layers in the i-th OLS, the variable NumSubLayersInLayerInOLS[i][j], specifying the number of sublayers in the j-th layer in the i-th OLS, the variable OutputLayerIdInOls[i][j], specifying the nuh_layer_id value of the j-th output layer in the i-th OLS, and the variable LayerUsedAsOutputLayerFlag[k], specifying whether the k-th layer is used as an output layer in at least one OLS, may be derived as follows:

```
NumOutputLayersInOls[ 0 ] = 1
OutputLayerIdInOls[ 0 ][ 0 ] = vps_layer_id[ 0 ]
NumSubLayersInLayerInOLS[ 0 ][ 0 ] =
vps_max_sub_layers_minus1 + 1
LayerUsedAsOutputLayerFlag[ 0 ] = 1
for( i = 1, i <= vps_max_layers_minus1; i++ ) {
 if( each_layer_is_an_ols_flag | | ols_mode_idc < 2 )
  LayerUsedAsOutputLayerFlag[ i ] = 1
 else /*( !each_layer_is_an_ols_flag && ols_mode_idc = = 2 ) */
  LayerUsedAsOutputLayerFlag[ i ] = 0
}
for( i = 1; i < TotalNumOlss; i++ )
 if( each_layer_is_an_ols_flag | | ols_mode_idc = = 0 ) {
  NumOutputLayersInOls[ i ] = 1
  OutputLayerIdInOls[ i ][ 0 ] = vps_layer_id[ i ]
  for( j = 0; j < i && ( ols_mode_idc = = 0 ); j++ )
   NumSubLayersInLayerInOLS[ i ][ j ] =
   max_tid_il_ref_pics_plus1[ i ]
  NumSubLayersInLayerInOLS[ i ][ i ] =
  vps_max_sub_layers_minus1 + 1
 } else if( ols_mode_idc = = 1 ) {
  NumOutputLayersInOls[ i ] = i + 1
  for( j = 0; j < NumOutputLayersInOls[ i ]; j++ ) {
```

```
      OutputLayerIdInOls[ i ][ j ] = vps_layer_id[ j ]
      NumSubLayersInLayerInOLS[ i ][ j ] =
      vps_max_sub_layers_minus1 + 1
     }
   } else if( ols_mode_idc = = 2 ) {
    for( j = 0; j <= vps_max_layers_minus1; j++ ) {
     layerIncludedInOlsFlag[ i ][ j ] = 0
     NumSubLayersInLayerInOLS[ i ][ j ] = 0
    }
    for( k = 0, j = 0; k <= vps_max_layers_minus1; k++ )   (40)
     if( ols_output_layer_flag[ i ][ k ] ) {
      layerIncludedInOlsFlag[ i ][ k ] = 1
      LayerUsedAsOutputLayerFlag[ k ] = 1
      OutputLayerIdx[ i ][ j ] = k
      OutputLayerIdInOls[ i ][ j++ ] = vps_layer_id[ k ]
      NumSubLayersInLayerInOLS[ i ][ j ] =
   vps_max_sub_layers_minus1 + 1
     }
    NumOutputLayersInOls[ i ] = j
    for( j = 0; j < NumOutputLayersInOls[ i ]; j++ ) {
     idx = OutputLayerIdx[ i ][ j ]
     for( k = 0; k < NumRefLayers[ idx ]; k++ ) {
      layerIncludedInOlsFlag[ i ][ RefLayerIdx[ idx ][ k ] ] = 1
      if( NumSubLayersInLayerInOLS
      [ i ][ RefLayerIdx[ idx ][ k ] ] <
       max_tid_il_ref_pics_plus1
       [ OutputLayerIdInOls[ i ][ j ] ] )
      NumSubLayersInLayerInOLS[ i ]
      [ RefLayerIdx[ idx ][ k ] ] =
       max_tid_il_ref_pics_plus1
       [ OutputLayerIdInOls[ i ][ j ] ]
     }
    }
   }
```

For each value of i in the range of 0 to vps_max_layers_minus1, inclusive, the values of LayerUsedAsRefLayerFlag[i] and LayerUsedAsOutputLayerFlag[i] may not be both equal to 0. In other words, there may be no layer that is neither an output layer of at least one OLS nor a direct reference layer of any other layer.

For each OLS, there may be at least one layer that is an output layer. In other words, for any value of i in the range of 0 to TotalNumOlss−1, inclusive, the value of NumOutputLayersInOls[i] may be greater than or equal to 1.

The variable NumLayersInOls[i], specifying the number of layers in the i-th OLS, and the variable LayerIdInOls[i][j], specifying the nuh_layer_id value of the j-th layer in the i-th OLS, may be derived as follows:

```
   NumLayersInOls[ 0 ] = 1
   LayerIdInOls[ 0 ][ 0 ] = vps_layer_id[ 0 ]
   for( i = 1; i < TotalNumOlss; i++ ) {
    if( each_layer_is_an_ols_flag ) {
     NumLayersInOls[ i ] = 1
     LayerIdInOls[ i ][ 0 ] = vps_layer_id[ i ]
    } else if( ols_mode_idc = = 0 | | ols_mode_idc = = 1 ) {
     NumLayersInOls[ i ] = i + 1
     for( j = 0; j < NumLayersInOls[ i ]; j++ )
      LayerIdInOls[ i ][ j ] = vps_layer_id[ j ]
    } else if( ols_mode_idc = = 2 ) {
     for( k = 0, j = 0; k <= vps_max_layers_minus1; k++ )
      if( layerIncludedInOlsFlag[ i ][ k ] )
       LayerIdInOls[ i ][ j++ ] = vps_layer_id[ k ]
     NumLayersInOls[ i ] = j
    }
   }
```

The variable OlsLayerIdx[i][j], specifying the OLS layer index of the layer with nuh_layer_id equal to LayerIdInOls[i][j], is derived as follows:

```
for( i = 0; i < TotalNumOlss; i++ )
  for j = 0; j < NumLayersInOls[ i ]; j++ )
    OlsLayerIdx[ i ][ LayerIdInOls[ i ][ j ] ] = j
```

The lowest layer in each OLS may be an independent layer. In other words, for each i in the range of 0 to TotalNumOlss−1, inclusive, the value of vps_independent_layer_flag[GeneralLayerIdx[LayerIdInOls[i][0]]] may be equal to 1. Each layer may be included in at least one OLS specified by the VPS. In other words, for each layer with a particular value of nuh_layer_id, nuhLayerId equal to one of vps_layer_id[k] for k in the range of 0 to vps_max_layers_minus1, inclusive, there may be at least one pair of values of i and j, where i is in the range of 0 to TotalNumOlss−1, inclusive, and j is in the range of NumLayersInOls[i]−1, inclusive, such that the value of LayerIdInOls[i][j] is equal to nuhLayerId.

In an embodiment, a decoding process may operate as follows for a current picture (e.g. sytax element CurrPic) to set the syntax element PictureOutputFlag:

PictureOutputFlag is set equal to 0 if one of the following conditions is true:
(1) the current picture is a RASL picture and NoOutputBeforeRecoveryFlag of the associated IRAP picture is equal to 1;
(2) gdr_enabled_flag is equal to 1 and the current picture is a GDR picture with NoOutputBeforeRecoveryFlag equal to 1;
(3) gdr_enabled_flag is equal to 1, the current picture is associated with a GDR picture with NoOutputBeforeRecoveryFlag equal to 1, and PicOrderCntVal of the current picture is less than RpPicOrderCntVal of the associated GDR picture;
(4) sps_video_parameter_set id is greater than 0, ols_mode_idc is equal to 0 and the current AU contains a picture (e.g. syntax element picA) that satisfies all of the following conditions: (a) PicA has PictureOutputFlag equal to 1, (b) PicA has nuh_layer_id nuhLid greater than that of the current picture, (c) PicA belongs to the output layer of the OLS (i.e. OutputLayerIdInOls[TargetOlsIdx][0] is equal to nuhLid);
(5) sps_video_parameter_set_id is greater than 0, ols_mode_idc is equal to 2, andols_output_layer_flag[TargetOlsIdx][GeneralLayerIdx[nuh_layer_id]] is equal to 0.

If none of the above conditions are true, the syntax element PictureOutputFlag may be set equal to the syntax element pic_output_flag.

After all slices of the current picture have been decoded, the current decoded picture may be marked as "used for short-term reference", and each ILRP entry in RefPicList[0] or RefPicList[1] may be marked as "used for short-term reference".

In the same or another embodiment, when each layer is an output layer set, the syntax element PictureOutputFlag is set equal to pic_output_flag, regardless of the value of the syntax element ols_mode_idc (864).

In the same or another embodiment, the syntax element PictureOutputFlag is set equal to 0 when sps_video_parameter_set id is greater than 0, each_layer_is_an_ols_flag (862) is equal to 0, ols_mode_idc (864) is equal to 0, and the current AU contains a picture picA that satisfies all of the following conditions: PicA has PictureOutputFlag equal to 1, PicA has nuh_layer_id nuhLid greater than that of the current picture, and PicA belongs to the output layer of the OLS (i.e. OutputLayerIdInOls[TargetOlsIdx][0] is equal to nuhLid).

In the same or another embodiment, the syntax element PictureOutputFlag is set equal to 0 when sps_video_parameter_set id is greater than 0, each_layer_is_an_ols_flag is equal to 0, ols_mode_ide is equal to 2, and ols_output_layer_flag[TargetOlsIdx][GeneralLayerIdx[nuh_layer_id]] is equal to 0.

An intra random access point (IRAP) picture may be a coded picture for random access, which may be an instantaneous decoding refresh (IDR) picture that supports closed group of picture structures or a clean random access (CRA) picture that supports open group of picture structure. A gradual decoding refresh (GDR) picture may be a picture for gradual random access with partial refresh of the picture.

Embodiments of the present disclosure may include syntax elements that indicate an IRAP or GDR picture. For example, with reference to FIG. 26, a picture header (1) may be provided. In the picture header (1), a flag ph_gdr_or_irap_pic_flag (2) may be signaled. The flag indicates the presence of an IRAP or GDR picture in the current PU associated with the picture header (1).

In the same or another embodiment, a flag ph_no_output_of_prior_pics_flag (3) may be conditionally signaled, only when ph_gdr_or_irap_pic_flag (2) is equal to 1, as shown in FIG. 26. The value of ph_no_output_of_prior_pics_flag (3) may be used for the output and removal process of pictures from the DPB. The value of the flag may affect the output of previously-decoded pictures in the DPB after the decoding of a picture in a CVSS AU that is not the first AU in the bitstream.

There is a potential issue that an IRAP picture may have ph_gdr_or_irap_pic_flag equal to 0, because the constraint specified by the semantics of ph_gdr_or_irap_pic_flag may be "one way", as follows: The flag ph_gdr_or_irap_pic_flag equal to 1 specifies that the current picture is a GDR or IRAP picture. The flag ph_gdr_or_irap_pic_flag equal to 0 specifies that the current picture is not a GDR picture and may or may not be an IRAP picture. When the value of ph_gdr_or_irap_pic_flag of an IRAP picture is equal to 0, the value of ph_no_output_of_prior_pics_flag may be used for DPB operations, without signaling or any inference rule.

In order to address the potential issue, in an embodiment, the constraints of the semantics of ph_gdr_or_irap_pic_flag (2) may be specified as "two way", so that ph_no_output_of_prior_pics_flag (3) may be required to be signaled when the current picture is an IRAP picture, as follows: The flag ph_gdr_or_irap_pic_flag (2) equal to 1 specifies that the current picture is a GDR or IRAP picture. The flag ph_gdr_or_irap_pic_flag (2) equal to 0 specifies that the current picture is neither a GDR or IRAP picture.

In the same or another embodiment, the inference rule of the ph_no_output_of_prior_pics_flag (3) value, when not present, may be specified as follows: The flag ph_no_output_of_prior_pics_flag (3) affects the output of previously-decoded pictures in the DPB after the decoding of a picture in a CVSS AU that is not the first AU in the bitstream. It may be a requirement of bitstream conformance that, when present, the value of ph_no_output_of_prior_pics_flag (3) shall be the same for all pictures in an AU.

When ph_no_output_of_prior_pics_flag (3) is present in the picture headers (1) of the pictures in an AU, the ph_no_output_of_prior_pics_flag (3) value of the AU is the ph_no_output_of_prior_pics_flag (3) value of the pictures in the AU. When not present, the value of ph_no_output_of_prior_pics_flag (3) may be inferred to be equal to 0.

With reference to FIG. 27, an AU delimiter (10) may be used to indicate the start of an AU, whether the AU is an IRAP or GDR AU, and the type of slices present in the coded pictures in the AU containing the AU delimiter NAL unit. When the bitstream contains only one layer, there may not be a normative decoding process associated with the AU delimiter (10).

In the AU delimiter (10), aud_irap_or_gdr_au_flag (12) may indicate the presence of an IRAP or GDR AU, and may be signaled as shown in FIG. 27. The flag aud_irap_or_gdr_au_flag (12) equal to 1 may specify that the AU containing the AU delimiter is an IRAP or GDR AU. The flag aud_irap_or_gdr_au_flag (12) equal to 0 may specify that the AU containing the AU delimiter (10) is neither an IRAP or GDR AU.

In the same or another embodiment, the flag aud_irap_or_gdr_au_flag (12) of an IRAP or GDR AU may be present, when the bitstream has multiple layers, with sps_video_parameter_set id is greater than 0. A video coding technology or standard may mandate the presence of an AU delimiter for a multiple layered bitstream.

In the same or another embodiment, referring to FIGS. 26-27, when aud_irap_or_gdr_au_flag (12) is present and the value of aud_irap_or_gdr_au_flag (12) is equal to 1, the value of ph_gdr_or_irap_pic_flag (2) may be required to be equal to 1. It is because each PU may have a GDR or IRAP picture, when aud_irap_or_gdr_au_flag (12) in AU delimiter (10) is equal to 1.

In the same or another embodiment, when pps_mixed_nalu_types_in_pic_flag is equal to 1, the value of ph_no_output_of_prior_pics_flag may not be present, When pps_mixed_nalu_types_in_pic_flag is determined (e.g. by a decoder) to be present, the value of ph_no_output_of_prior_pics_flag (3) may be ignored.

In the same or another embodiment, ph_no_output_of_prior_pics_flag (3) may affect the output of previously-decoded pictures in the DPB after the decoding of a picture in a CVSS AU that is not the first AU in the bitstream. When not present, the value of ph_no_output_of_prior_pics_flag (3) may be inferred to be equal 1.

In the same or another embodiment, in order to resolve an issue that the value of ph_no_output_of_prior_pics_flag (3) is used without an inferrence rule, when ph_no_output_of_prior_pics_flag (3) is not present and ph_gdr_or_irap_pic_flag (2) is equal to 1, ph_gdr_or_irap_pic_flag (2) may be replaced in picture header (1) with ph_irap_pic_flag (6), as shown in FIG. 28. The flag ph_irap_pic_flag (6) equal to 1 may specify that the current picture is an IRAP picture. The flag ph_irap_pic_flag (6) equal to 0 may specify that the current picture is not an IRAP picture.

In the same or another embodiment, in order to resolve the issue that the value of ph_no_output_of_prior_pics_flag (3) is used without an inferrence rule, when ph_no_output_of_prior_pics_flag (3) is not present and ph_gdr_or_irap_pic_flag (2) is equal to 1, ph_no_output_of_prior_pics_flag (3) in picture header (1) may be replaced by sh_no_output_of_prior_pics_flag (23) in slice header (20), as shown in FIG. 29.

In the same embodiment, sh_no_output_of_prior_pics_flag (23) may be conditionally present in slice header (20) only when the NAL unit type of the current VCL NAL is equal to IDR_W_RADL, IDR_N_LP, or CRA_NUT. IDR_W_RADL is an NAL unit type that contains a coded slice segment of an IDR picture that does not have associated RASL pictures present in the bitstream, but may have associated RADL pictures in the bitstream. IDR_N_LP may be an NAL unit type that contains a coded slice segment of an IDR picture that does not have associated leading pictures present in the bitstream. CRA_NUT is an NAL unit type that contains a coded slice segment of a CRA picture.

In the same or another embodiment, sh_no_output_of_prior_pics_flag (23) may affect the output of previously-decoded pictures in the DPB after the decoding of a picture in a CVSS AU that is not the first AU in the bitstream.

In the same or another embodiment, it may be a requirement of bitstream conformance that, when present, the value of sh_no_output_of_prior_pics_flag (23) shall be the same for all pictures in an AU. When sh_no_output_of_prior_pics_flag (23) is present in the slice headers (20) of the pictures in an AU, the sh_no_output_of_prior_pics_flag (23) value of the AU may be the sh_no_output_of_prior_pics_flag (23) value of the pictures in the AU.

In the same or another embodiment, when pps_mixed_nalu_types_in_pic_flag in picture parameter set is equal to 1, the value of sh_no_output_of_prior_pics_flag (23) may not be present. When present, the value of sh_no_output_of_prior_pics_flag (23) may be ignored.

In the same or another embodiment, aud_irap_au_flag (16) may be present in AU delimiter (10), as shown in FIG. 30. The flag aud_irap_au_flag (16) equal to 1 may specify that the AU containing the AU delimiter (10) is an IRAP AU. The flag aud_irap_au_flag (16) equal to 0 may specify that the AU containing the AU delimiter (10) is not an IRAP AU.

In the same embodiment, when aud_irap_au_flag (16) is present, the value of ph_irap_pic_flag (6) in picture header (1) may be equal to aud_irap_au_flag (16) in AU delimiter (10). The flag ph_irap_pic_flag (7) equal to 1 may specify that picture associated with PH (1) is an IRAP picture. The flag ph_irap_pic_flag (6) equal to 0 may specify that picture associated with PH (1) is not an IRAP picture.

In the same or another embodiment, aud_gdr_au_flag (17) may be present in AU delimiter (10), as shown in FIG. 30. The flag aud_gdr_au_flag (17) equal to 1 may specify that the AU containing the AU delimiter (10) is a GDR AU. The flag aud_irap_au_flag (17) equal to 0 may specify that the AU containing the AU delimiter (10) is not a GDR AU.

In the same embodiment, when aud_gdr_au_flag (17) in AU delimiter (10) is present, the value of ph_gdr_pic_flag (7) in picture header (1) may be equal to aud_gdr_au_flag (17) in AU delimiter (10). The flag ph_gdr_pic_flag (7) equal to 1 may specify that the picture associated with PH (1) is a GDR picture. The flag ph_gdr_pic flag (7) equal to 0 may specify that the picture associated with PH (1) is not a GDR picture.

Gradual decoding refresh (GDR) may be specified by the following definitions:
  GDR AU: An AU in which there is a PU for each layer specified by the VPS and the coded picture in each present PU is a GDR picture.
  GDR PU: A PU in which the coded picture is a GDR picture.

GDR picture: A picture for which each VCL NAL unit has nal_unit_type equal to GDR_NUT.

GDR sub-picture: A sub-picture for which each VCL NAL unit has nal_unit_type equal to GDR_NUT.

GDR_NUT: A NAL unit type that includes a coded tile group of a GDR picture.

According to embodiments, the first picture in the bitstream in decoding order may be an IRAP or GDR picture. Trailing pictures associated with an IRAP or GDR picture may also follow the IRAP or GDR picture in decoding order. Pictures that follow the associated IRAP picture in output order and precede the associated IRAP picture in decoding order may not be allowed.

In an embodiment, with reference to FIG. 31, syntax elements indicating GDR are signaled in PH (1) such as ph_gdr_pic_flag (7). When not present, the value of ph_gdr_pic_flag (7) may be inferred to be equal to 0. When sps_gdr_enabled_flag is equal to 0, the value of ph_gdr_pic_flag (7) may be inferred to be equal to 0. The syntax element ph_recovery_poc_cnt (32) may specify the recovery point of decoded pictures in output order.

When the current picture is a GDR picture, the variable recoveryPointPocVal may be derived as follows:

$$recoveryPointPocVal = PicOrderCntVal + ph\_recovery\_poc\_cnt$$

In the same or another embodiment, as shown in FIG. 31, ph_recovery_poc_cnt (34) is signaled after signaling picture order count (POC) syntax elements (e.g. ph_pic_order_cnt_lsb (32) and ph_poc_msb_cycle_val (36)) because PicOrderCntVal that is used for deriving recoveryPointPocVal is derived from the values of ph_pic_order_cnt_lsb (32) and ph_poc_msb_cycle_val (36).

If the current picture is a GDR picture, and there is a picture picA that follows the current GDR picture in decoding order in the CLVS that has PicOrderCntVal equal to recoveryPointPocVal, the picture picA may be referred to as the recovery point picture. Otherwise, the first picture in output order that has PicOrderCntVal greater than recoveryPointPocVal in the CLVS may be referred to as the recovery point picture. The recovery point picture may not precede the current GDR picture in decoding order. The pictures that are associated with the current GDR picture and have PicOrderCntVal less than recoveryPointPocVal may be referred to as the recovering pictures of the GDR picture. The value of ph_recovery_poc_cnt (34) may be in the range of 0 to MaxPicOrderCntLsb−1, inclusive.

In the same or another embodiment, the recovery point picture may not precede the current GDR picture in both decoding and output order.

In the same or another embodiment, the recovering picture may not precede the current GDR picture in both decoding and output order.

In the same or another embodiment, the recovering picture may precede the associated recovery point picture in both decoding and output order.

In the same or another embodiment, when the current picture is a GDR picture or a recovering picture of a GDR picture, and the current picture contains a non-CTU-aligned boundary between a "refreshed area" (i.e. an area that has an exact match of decoded sample values when starting the decoding process from the GDR picture compared to starting the decoding process from the previous IRAP picture in decoding order, when present) and a "dirty area" (i.e. an area that might not have an exact match of decoded sample values when starting the decoding process from the GDR picture compared to starting the decoding process from the previous IRAP picture in decoding order, when present), chroma residual scaling of luma mapping with chroma scaling (LMCS) may have to be disabled in the current picture to avoid the "dirty area" to affect decoded sample values of the "refreshed area".

In the same or another embodiment, the value of recoveryPointPocVal of a layer A may be equal to or greater than recoveryPointPocVal of the reference layer of the layer A.

In the same or another embodiment, the value of recoveryPointPocVal of a layer A with layerId equal to m may be equal to or greater than recoveryPointPocVal of another layer B with layerId equal to n, where m is greater than n.

In the same or another embodiment, the value of recoveryPointPocVal of a layer A with layerId equal to m may be equal to or greater than recoveryPointPocVal of another layer B with layerId equal to n, where m is greater than n and the layers A and B belong the same output layer set.

In the same or another embodiment, the value of recoveryPointPocVal of a layer A may be equal to recoveryPointPocVal of the reference layer of the layer A.

In the same or another embodiment, the value of recoveryPointPocVal of a layer A with layerId equal to m may be equal to recoveryPointPocVal of another layer B with layerId equal to n, where m is greater than n.

In the same or another embodiment, the value of recoveryPointPocVal of a layer A with layerId equal to m may be equal to recoveryPointPocVal of another layer B with layerId equal to n, where m is greater than n and the layers A and B belong the same output layer set.

In the same or another embodiment, when pps_mixed_nalu_types_inpic_flag is equal to 1, the following may apply:

(1) The picture shall have at least two sub-pictures.
(2) VCL NAL units of the picture shall have two or more different nal_unit_type values.
(3) There shall be no VCL NAL unit of the picture that has nal_unit_type equal to GDR_NUT.
(4) The picture shall not be the recovering or recovery picture associated with a GDR picture.
(5) When the VCL NAL units of at least one sub-picture of the picture have a particular value of nal_unit_type equal to IDR_W_RADL, IDR_N_LP, or CRA_NUT, the VCL NAL units of other sub-pictures in the picture shall all have nal_unit_type equal to TRAIL_NUT.

TRAIL_NUT is an NAL unit type that contains a coded tile group of VCL non-STSA trailing picture.

At the beginning of the decoding process for each slice of a picture, the decoding process for reference picture lists construction may be invoked for derivation of reference picture list 0 (RefPicList[0]) and reference picture list 1 (RefPicList[1]). After constructing one or more reference picture lists, the decoding process for reference picture marking may be invoked, wherein reference pictures may be marked as "unused for reference", "used for short-term reference", or "used for long-term reference".

Figure 32:
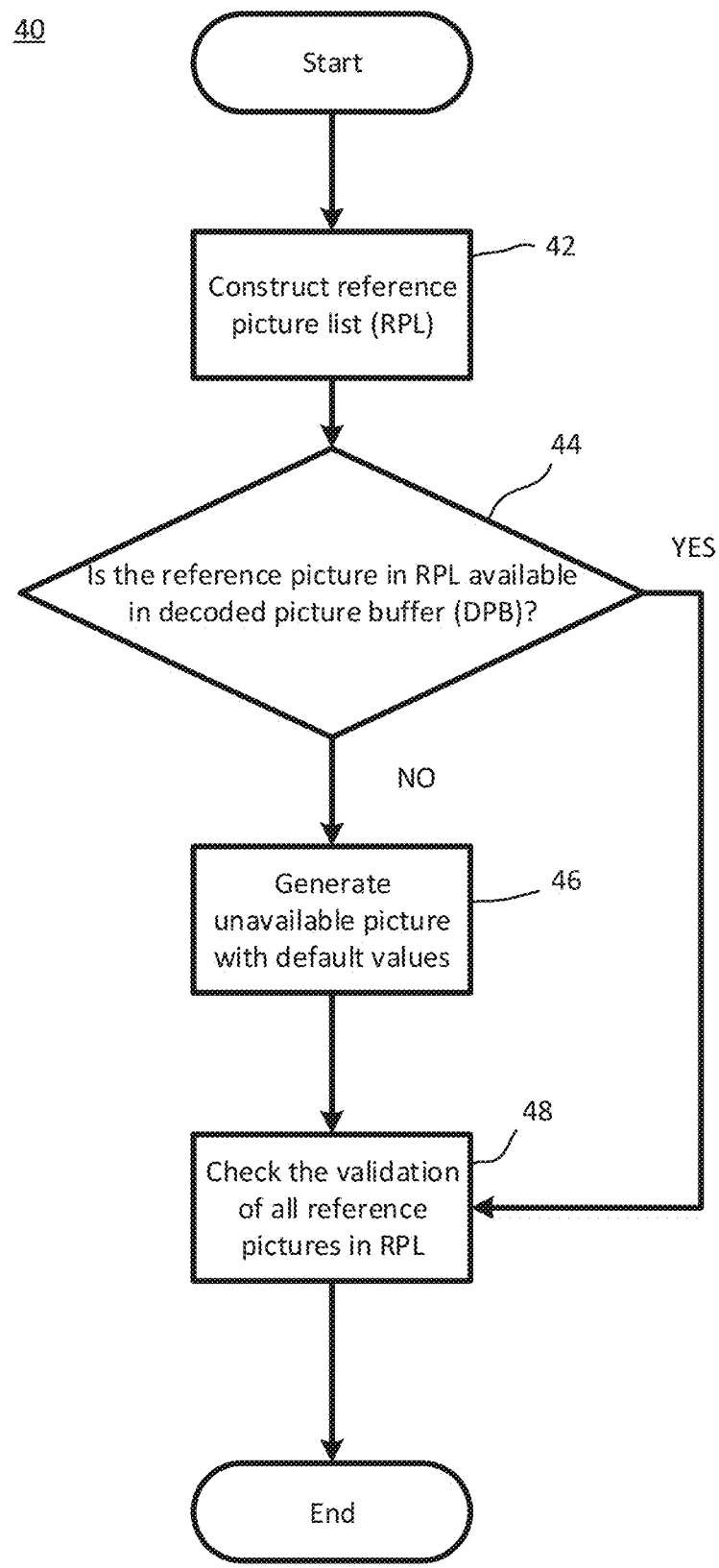
FIG. 32 is a schematic illustration of a simplified block diagram of reference picture list construction and generation of an unavailable picture.

With reference to FIG. 32, according to embodiments, a decoding process (40) may be performed by a decoder. In the decoding process (40), one or more reference picture lists (RPLs) may be constructed (42). When one or more reference picture lists are constructed, one or more pictures may be unavailable due to random access or unintended picture loss. The decoder may determine whether a reference picture in the RPL is available in the DPB (44). If the reference picture is determined to be unavailable, the unavailable reference pictures may be marked as "no reference picture". To avoid any decoder crash or unintended behavior, the unavailable reference pictures may be instantly generated with defaults values of pixels and parameters (46). After generating the unavailable reference pictures (and/or the reference pictures are determined to be available), the decoder may check the validation of all reference pictures, including the generated pictures, in the reference picture list (48).

In the same or another embodiment, the one or more reference picture lists are constructed (42) by parsing the RPL syntax elements in SPS, PH, and/or SH. After the constructing (42), one or more reference pictures in RPL list may not be available because the random access skipped leading pictures (RASL) associated with a CRA picture may be discarded by a decoder or a system or cannot be successfully decoded when random access happens at the CRA picture. The unavailable reference pictures may be generated with defaults values of pixels and parameters (46).

In the same or another embodiment, when the current picture is an IDR picture with sps_idr_rplpresent_flag equal to 1 or pps_rpl_info_in_ph_flag equal to 1, a CRA picture with NoOutputBeforeRecoveryFlag equal to 1, or a GDR picture with NoOutputBeforeRecoveryFlag equal to 1, at least one of the following decoding processes for generating unavailable reference pictures (46) is invoked, which may need to be invoked only for the first slice of a picture.

A. General Decoding Process for Generating Unavailable Reference Pictures

This process may be invoked once per coded picture when the current picture is an IDR picture with sps_idr_rpl_present_flag equal to 1 or pps_rpl_info_in_ph_flag equal to 1, a CRA picture with NoOutputBeforeRecoveryFlag equal to 1, or a GDR picture with NoOutputBeforeRecoveryFlag equal to 1. When this process is invoked, the following may apply: For each RefPicList[i][j], with i in the range of 0 to 1, inclusive, and j in the range of 0 to num_ref_entries[i][RplsIdx[i]]−1, inclusive, that is equal to "no reference picture", a picture is generated as described below in the "Generation of one unavailable picture" and the following applies:

(1) The value of nuh_layer_id for the generated picture is set equal to nuh_layer_id of the current picture.
(2) If st_ref_pic_flag[i][RplsIdx[i]][j] is equal to 1 and inter_layer_ref_pic_flag[i][RplsIdx[i]][j] is equal to 0, the value of PicOrderCntVal for the generated picture is set equal to RefPicPocList[i][j] and the generated picture is marked as "used for short-term reference".
(3) Otherwise, when st_ref_pic_flag[i][RplsIdx[i]][j] is equal to 0 and inter_layer_ref_pic_flag[i][RplsIdx[i]][j] is equal to 0, the value of PicOrderCntVal for the generated picture is set equal to RefPicLtPocList[i][j], the value of ph_pic_order_cnt_lsb for the generated picture is inferred to be equal to (RefPicLtPocList[i][j] & (MaxPicOrderCntLsb−1)), and the generated picture is marked as "used for long-term reference".
(4) The value of PictureOutputFlag for the generated reference picture is set equal to 0.
(5) RefPicList[i][j] is set to be the generated reference picture.
(6) The value of TemporalId for the generated picture is set equal to TemporalId of the current picture.
(7) The value of ph_non_ref_pic_flag for the generated picture is set equal to 0.
(8) The value of ph_pic_parameter_set_id for the generated picture is set equal to ph_pic_parameter_set_id of the current picture.

The flag ph_non_ref_pic_flag equal to 1 may specify that the picture associated with the PH is never used as a reference picture. The flag ph_non_ref_pic_flag equal to 0 may specify the picture associated with the PH may or may not be used as a reference picture.

B. Generation of One Unavailable Picture

When this process is invoked, an unavailable picture is generated as follows:
(1) The value of each element in the sample array $S_L$ for the picture is set equal to 1<<(BitDepth−1).
(2) When sps_chroma_format_idc is not equal to 0, the value of each element in the sample arrays $S_{Cb}$ and $S_{Cr}$ for the picture is set equal to 1<<(BitDepth−1).
(3) The prediction mode CuPredMode[0][x][y] is set equal to MODE_INTRA for x ranging from 0 to pps_pic_width_in_luma_samples−1, inclusive, and y ranging from 0 to pps_pic_height_in_luma_samples−1, inclusive.

In the same or another embodiment, after generating the unavailable reference picture in RPL list, a bitstream conformances check for all or active reference pictures in RPL list may be invoked by, for example, the decoder. For example, the decoder may check that the following constraints apply for bitstream conformance:

(1) For each i equal to 0 or 1, num_ref_entries[i][RplsIdx[i]] shall not be less than NumRefIdxActive[i].
(2) The picture referred to by each active entry in RefPicList[0] or RefPicList[1] shall be present in the DPB and shall have TemporalId less than or equal to that of the current picture.
(3) The picture referred to by each entry in RefPicList[0] or RefPicList[1] shall not be the current picture and shall have ph_non_ref_pic_flag equal to 0.
(4) A short term reference picture (STRP) entry in RefPicList[0] or RefPicList[1] of a slice of a picture and a longer term reference picture (LTRP) entry in RefPicList[0] or RefPicList[1] of the same slice or a different slice of the same picture shall not refer to the same picture.
(5) There shall be no LTRP entry in RefPicList[0] or RefPicList[1] for which the difference between the PicOrderCntVal of the current picture and the PicOrderCntVal of the picture referred to by the entry is greater than or equal to $2^{24}$.
(6) Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics shall be less than or equal to MaxDpbSize−1, inclusive, where MaxDpbSize is, and setOfRefPics shall be the same for all slices of a picture.
(7) When the current slice has nal_unit_type equal to STSA_NUT, there shall be no active entry in RefPicList[0] or RefPicList[1] that has TemporalId equal to that of the current picture and nuh_layer_id equal to that of the current picture.
(8) When the current picture is a picture that follows, in decoding order, a step-wise temporal sub-layer access (STSA) picture that has TemporalId equal to that of the current picture and nuh_layer_id equal to that of the current picture, there shall be no picture that precedes the STSA picture in decoding order, has TemporalId equal to that of the current picture, and has nuh_layer_id equal to that of the current picture included as an active entry in RefPicList[0] or RefPicList[1].
(9) When the current sub-picture, with TemporalId equal to a particular value tId, nuh_layer_id equal to a particular value layerId, and sub-picture index equal to a particular value subpicIdx, is a sub-picture that follows, in decoding order, an STSA sub-picture with TemporalId equal to tId, nuh_layer_id equal to layerId, and sub-picture index equal to subpicIdx, there shall be no picture with TemporalId equal to tId and nuh_layer_id equal to layerId that precedes the picture containing the STSA sub-picture in decoding order included as an active entry in RefPicList[0] or RefPicList[1].

(10) When the current picture, with nuh_layer_id equal to a particular value layerId, is an IRAP picture, there shall be no picture referred to by an entry in RefPicList[0] or RefPicList[1] that precedes, in output order or decoding order, any preceding IRAP picture with nuh_layer_id equal to layerId in decoding order (when present).

(11) When the current sub-picture, with nuh_layer_id equal to a particular value layerId and sub-picture index equal to a particular value subpicIdx, is an IRAP sub-picture, there shall be no picture referred to by an entry in RefPicList[0] or RefPicList[1] that precedes, in output order or decoding order, any preceding picture, in decoding order (when present), containing an IRAP sub-picture with nuh_layer_id equal to layerId and sub-picture index equal to subpicIdx.

(12) When the current picture is not a RASL picture associated with a CRA picture with NoOutputBeforeRecoveryFlag equal to 1, there shall be no picture referred to by an active entry in RefPicList[0] or RefPicList[1] that was generated by the decoding process for generating unavailable reference pictures for the CRA picture associated with the current picture.

(13) When the current sub-picture is not a RASL sub-picture associated with a CRA sub-picture in a CRA picture with NoOutputBeforeRecoveryFlag equal to 1, there shall be no picture referred to by an active entry in RefPicList[0] or RefPicList[1] that was generated by the decoding process for generating unavailable reference pictures for the CRA picture containing the CRA sub-picture associated with the current sub-picture.

(14) When the current picture, with nuh_layer_id equal to a particular value layerId, is not any of the following, there shall be no picture referred to by an entry in RefPicList[0] or RefPicList[1] that was generated by the decoding process for generating unavailable reference pictures for the IRAP or GDR picture associated with the current picture:
   (a) An IDR picture with sps_idr_rpl_present_flag equal to 1 or pps_rpl_info_in_ph_flag equal to 1.
   (b) A CRA picture with NoOutputBeforeRecoveryFlag equal to 1.
   (c) A picture, associated with a CRA picture with NoOutputBeforeRecoveryFlag equal to 1, that precedes, in decoding order, the leading pictures associated with the same CRA picture.
   (d) A leading picture associated with a CRA picture with NoOutputBeforeRecoveryFlag equal to 1
   (e) A GDR picture with NoOutputBeforeRecov.eryFlag equal to 1.
   (f) A recovering picture of a GDR picture with NoOutputBeforeRecoveryFlag equal to 1 and nuh_layer_id equal to layerId.

(15) When the current sub-picture, with nuh_layer_id equal to a particular value layerId and sub-picture index equal to a particular value subpicIdx, is not any of the following, there shall be no picture referred to by an entry in RefPicList[0] or RefPicList[1] that was generated by the decoding process for generating unavailable reference pictures for the IRAP or GDR picture containing the IRAP or GDR sub-picture associated with the current sub-picture:
   (a) An IDR sub-picture in an IDR picture with sps_idr_rpl_present_flag equal to 1 or pps_rpl_info_in_ph_flag equal to 1.
   (b) A CRA sub-picture in a CRA picture with NoOutputBeforeRecoveryFlag equal to 1.
   (c) A sub-picture, associated with a CRA sub-picture in a CRA picture with NoOutputBeforeRecoveryFlag equal to 1, that precedes, in decoding order, the leading pictures associated with the same CRA picture.
   (d) A leading sub-picture associated with a CRA sub-picture in a CRA picture with NoOutputBeforeRecoveryFlag equal to 1.
   (e) A GDR sub-picture in a GDR picture with NoOutputBeforeRecoveryFlag equal to 1.
   (f) A sub-picture in a recovering picture of a GDR picture with NoOutputBeforeRecoveryFlag equal to 1 and nuh_layer_id equal to layerId.

(16) When the current picture follows an IRAP picture having the same value of nuh_layer_id in both decoding order and output order, there shall be no picture referred to by an active entry in RefPicList[0] or RefPicList[1] that precedes that IRAP picture in output order or decoding order.

(17) When the current sub-picture follows an IRAP sub-picture having the same value of nuh_layer_id and the same value of sub-picture index in both decoding and output order, there shall be no picture referred to by an active entry in RefPicList[0] or RefPicList[1] that precedes the picture containing that IRAP sub-picture in output order or decoding order.

(18) When the current picture follows an IRAP picture having the same value of nuh_layer_id and the leading pictures, if any, associated with that IRAP picture in both decoding order and output order, there shall be no picture referred to by an entry in RefPicList[0] or RefPicList[1] that precedes that IRAP picture in output order or decoding order.

(19) When the current sub-picture follows an IRAP sub-picture having the same value of nuh_layer_id and the same value of sub-picture index and the leading sub-pictures, if any, associated with that IRAP sub-picture in both decoding and output order, there shall be no picture referred to by an entry in RefPicList[0] or RefPicList[1] that precedes the picture containing that IRAP sub-picture in output order or decoding order.

(20) When the current picture is a random access decodable leading (RADL) picture, there shall be no active entry in RefPicList[0] or RefPicList[1] that is any of the following:
   (a) A RASL picture with pps_mixed_nalu_types_in_pic_flag is equal to 0. This means that an active entry of the RPLs of a RADL picture can refer to a RASL picture with pps_mixed_nalu_types_in_pic_flag equal to 1. However, when decoding starts from the associated CRA picture, such a RADL picture can still be correctly decoded, because the RADL sub-picture(s) in that referenced RASL picture would be correctly decoded, as the RADL picture would only refer to the RADL sub-pictures in the referenced RASL picture, as imposed by the next constraint that disallows RADL sub-pictures referring to a RASL sub-picture.

(b) A picture that precedes the associated IRAP picture in decoding order.

(21) When the current sub-picture, with nuh_layer_id equal to a particular value layerId and sub-picture index equal to a particular value subpicIdx, is a RADL sub-picture, there shall be no active entry in RefPicList[0] or RefPicList[1] that is any of the following:
(a) A picture with nuh_layer_id equal to layerId containing a RASL sub-picture with sub-picture index equal to subpicIdx.
(b) A picture that precedes the picture containing the associated IRAP sub-picture in decoding order.

(22) The following constraints apply for the picture referred to by each ILRP entry, when present, in RefPicList[0] or RefPicList[1] of a slice of the current picture:
(a) The picture shall be in the same AU as the current picture.
(b) The picture shall be present in the DPB.
(c) The picture shall have nuh_layer_id refPicLayerId less than the nuh_layer_id of the current picture.
(d) Either of the following constraints applies: The picture shall be an IRAP picture; or the picture shall have TemporalId less than or equal to Max(0, vps_max_tid_il_ref_pics_plus1[currLayerIdx][refLayerIdx]−1), where currLayerIdx and refLayerIdx are equal to GeneralLayerIdx[nuh_layer_id] and GeneralLayerIdx[refpicLayerId], respectively.

(23) Each ILRP entry, when present, in RefPicList[0] or RefPicList[1] of a slice shall be an active entry.

(24) When vps_independent_layer_flag[GeneralLayerIdx[nuh_layer_id]] is equal to 0 and sps_num_subpics_minus1 is greater than 0, either of the following two conditions (but not both) shall be true:
(a) The picture referred to by each active entry in RefPicList[0] or RefPicList[1] has the same sub-picture layout as the current picture (i.e. the SPSs referred to by that picture and the current picture have the same value of sps_num_subpics_minus1 and the same values of sps_subpic_ctu_top_left_x[j], sps_subpic_ctu_top_left_y[j], sps_subpic_width_minus1[j], and sps_subpic_height_minus1[j], respectively, for each value of j in the range of 0 to sps_num_subpics_minus1, inclusive).
(b) The picture referred to by each active entry in RefPicList[0] or RefPicList[1] is an ILRP for which the value of sps_num_subpics_minus1 is equal to 0.

C. Decoding Process for Reference Picture Marking

In the same or another embodiment, when the reference pictures are marked, the following decoding process may be invoked.

The process may be invoked once per picture, after decoding of a slice header and the decoding process for reference picture list construction for the slice, but prior to the decoding of the slice data. This process may result in one or more reference pictures in the DPB being marked as "unused for reference" or "used for long-term reference".

A decoded picture in the DPB can be marked as "unused for reference", "used for short-term reference" or "used for long-term reference", but only one among these three at any given moment during the operation of the decoding process. Assigning one of these markings to a picture may implicitly remove another of these markings when applicable. When a picture is referred to as being marked as "used for reference", this collectively refers to the picture being marked as "used for short-term reference" or "used for long-term reference" (but not both).

STRPs and ILRPs may be identified by their nuh_layer_id and PicOrderCntVal values. LTRPs may be identified by their nuh_layer_id values and the Log 2(MaxLtPicOrderCntLsb) LSBs of their PicOrderCntVal values.

If the current picture is a CLVSS picture, all reference pictures currently in the DPB (if any) with the same nuh_layer_id as the current picture may be marked as "unused for reference".

Otherwise, the following may apply:
(1) For each LTRP entry in RefPicList[0] or RefPicList[1], when the picture is an LTRP with the same nuh_layer_id as the current picture, the picture is marked as "used for long-term reference".
(2) Each reference picture with the same nuh_layer_id as the current picture in the DPB that is not referred to by any entry in RefPicList[0] or RefPicList[1] is marked as "unused for reference".
(3) For each ILRP entry in RefPicList[0] or RefPicList[1], the picture is marked as "used for long-term reference".

In the same or another embodiment, for each LTRP entry in RefPicList[0] or RefPicList[1], when the picture with the same nuh_layer_id as the current picture is marked as "used for short-term reference", the picture is marked as "used for long-term reference".

In the same or another embodiment, when one or more RPL lists are constructed, the following may apply:
For each RefPicList[i][j], with i in the range of 0 to 1, inclusive, and j in the range of 0 to num_ref_entries[i][RplsIdx[i]]−1, inclusive, that is equal to "no reference picture", a picture is generated.

In the same or another embodiment, when one or more RPL lists are constructed, the following may apply:
For each RefPicList[i][j], with i in the range of 0 to 1, inclusive, and j in the range of 0 to NumRefIdxActive[i]−1, inclusive, that is equal to "no reference picture", a picture is generated.

In the decoding process for reference picture list construction, missing reference pictures in DPB may be set equal to "no reference picture". The unavailable pictures equal to "no reference picture" are generated through the decoding process for generating unavailable reference pictures for conformance check purposes. An issue is that not only unavailable reference pictures in the same layer but also unavailable interlayer reference pictures in the reference layer are set equal to "no reference picture", as below:

```
if( !inter_layer_ref_pic_flag[ i ][ RplsIdx[ i ] ][ j ] ) {
  if( st_ref_pic_flag[ i ][ RplsIdx[ i ] ][ j ] ) {
    RefPicPocList[ i ][ j ] =
  pocBase + DeltaPocValSt[ i ][ RplsIdx[ i ] ][ j ]
    if( there is a reference picture picA in the DPB with
  the same nuh_layer_id as the current picture
      and PicOrderCntVal equal to RefPicPocList[ i ][ j ] )
    RefPicList[ i ][ j ] = picA
    else
    RefPicList[ i ][ j ] = "no reference picture"
```

```
    pocBase = RefPicPocList[ i ][ j ]
  } else {
  if( !delta_poc_msb_cycle_present_flag[ i ][ k ] ) {
    if( there is a reference picA in the DPB with the
same nuh_layer_id as the current picture and
 PicOrderCntVal & ( MaxPicOrderCntLsb - 1 )
equal to PocLsbLt[ i ][ k ] )
     RefPicList[ i ][ j ] = picA
    else
     RefPicList[ i ][ j ] = "no reference picture"
    RefPicLtPocList[ i ][ j ] = PocLsbLt[ i ][ k ]
  } else {
    if( there is a reference picA in the DPB with
the same nuh_layer_id as the current picture and
       PicOrderCntVal equal to FullPocLt[ i ][ k ] )
    RefPicList[ i ][ j ] = picA
    else
     RefPicList[ i ][ j ] = "no reference picture"
    RefPicLtPocList[ i ][ j ] = FullPocLt[ i ][ k ]
  }
  k++
  }
} else {
 layerIdx =
DirectRefLayerIdx[ GeneralLayerIdx[ nuh_layer_id ] ]
[ ilrp_idx[ i ][ RplsIdx ][ j ] ]
 refPicLayerId = vps_layer_id[ layerIdx ]
 if( there is a reference picture picA in the DPB with
nuh_layer_id equal to refPicLayerId and
    the same PicOrderCntVal as the current picture )
  RefPicList[ i ][ j ] = picA
  else
  RefPicList[ i ][ j ] = "no reference picture"
 }
```

However, a decoding process for generating unavailable reference pictures, all unavailable pictures equal to "no reference picture" may be handled as the reference pictures in the same layer, so that the nuh_layer_id and PicOrderCntVal values of the unavailable interlayer reference pictures are set to incorrect values. Also, the unavailable interlayer reference pictures are not correctly marked as "used for long-term reference". These wrong values result in errors in decoding process of the following pictures and bitstream conformance check. Therefore, according to embodiments, the unavailable interlayer reference pictures equal to "no reference picture" should be correctly generated as follows:

D. Improved Decoding Process for Generating Unavailable Reference Pictures

This process is invoked once per coded picture when the current picture is an IDR picture with sps_idr_rplpresent_flag equal to 1 or pps_rpl_info_inph_flag equal to 1, a CRA picture with NoOutputBeforeRecoveryFlag equal to 1, or a GDR picture with NoOutputBeforeRecoveryFlag equal to 1.

When this process is invoked, for each RefPicList[i][j], with i in the range of 0 to 1, inclusive, and j in the range of 0 to num_ref_entries[i][RplsIdx[i]]−1, inclusive, that is equal to "no reference picture", a picture may be generated as previously described in the present disclosure and the following may apply:

(1) If inter_layer_ref_pic_flag[i][RplsIdx[i]][j] is equal to 0, the value of nuh_layer_id for the generated picture is set equal to nuh_layer_id of the current picture.

(2) Otherwise (inter_layer_ref_pic_flag[i][RplsIdx[i]][j] is equal to 1), value of nuh_layer_id for the generated picture is set equal to vps_layer_id[DirectRefLayerIdx[GeneralLayerIdx[nuh_layer_id]][ilrp_idx[i][R plsIdx][j]]]

(3) If st_ref_pic_flag[i][RplsIdx[i]][j] is equal to 1 and inter_layer_ref_pic_flag[i][RplsIdx[i]][j] is equal to 0, the value of PicOrderCntVal for the generated picture is set equal to RefPicPocList[i][j] and the generated picture is marked as "used for short-term reference".

(4) If st_ref_pic_flag[i][RplsIdx[i]][j] is equal to 0 and inter_layer_ref_pic_flag[i][RplsIdx[i]][j] is equal to 0, the value of PicOrderCntVal for the generated picture is set equal to RefPicLtPocList[i][j], the value of ph_pic_order_cnt_lsb for the generated picture is inferred to be equal to (RefPicLtPocList[i][j] & (MaxPicOrderCntLsb−1)), and the generated picture is marked as "used for long-term reference".

(5) Otherwise, if inter_layer_ref_pic_flag[i][RplsIdx[i]][j] is equal to 1, the value of PicOrderCntVal for the generated picture is set equal to PicOrderCntVal of the current picture, the value of ph_pic_order_cnt_lsb for the generated picture is inferred to be equal to ph_pic_order_cnt_lsb of the current picture and the generated picture is marked as "used for long-term reference".

(6) The value of PictureOutputFlag for the generated reference picture is set equal to 0.

(7) RefPicList[i][j] is set to be the generated reference picture.

(8) The value of TemporalId for the generated picture is set equal to TemporalId of the current picture.

(9) The value of ph_non_ref_pic_flag for the generated picture is set equal to 0.

(10) The value of ph_pic_parameter_set_id for the generated picture is set equal to ph_pic_parameter_set_id of the current picture.

In decoding process for reference picture marking described above, to clarify the marking process, the following sentence is modified: For each LTRP entry in RefPicList[0] or RefPicList[1], when the picture is an STRP with the same nuh_layer_id as the current picture, the picture is marked as "used for long-term reference".

As a first option, the original sentence is modified as follows: For each LTRP entry in RefPicList[0] or RefPicList[1], when the picture is currently marked as "used for short-term reference" with the same nuh_layer_id as the current picture, the picture is marked as "used for long-term reference".

As a second option, the original sentence is modified as follows: For each LTRP entry in RefPicList[0] or RefPicList[1], when the picture is is an LTRP with the same nuh_layer_id as the current picture, the picture is marked as "used for long-term reference".

The meaning of the original sentence is somewhat confused, because it says that an STRP is marked as "used for long-term reference". If the original intention of the sentence is to mark the LTRP picture of the current picture in RefPicList[0] or RefPicList[1] as "used for long-term reference", when the LTRP is currently marked as "used for short-term reference", option 1 may be used. Otherwise, the option 2 may be used.

E. Improved Decoding Process for Reference Picture Lists Construction

In HEVC, the reference picture lists are constructed after generating unavailable reference pictures in RPS. In VVC (current draft), the reference picture lists are constructed before generating unavailable reference pictures in RPS. If the bitstream conformance check is performed before generating unavailable reference pictures as previously specified, the bitstream cannot obey the constraints specified. To clarify the order, the decoding process may be modified as follows to have the following constraints for bitstream conformance:

(1) For each i equal to 0 or 1, num_ref_entries[i][RplsIdx[i]] shall not be less than NumRefIdxActive[i].

(2) The picture referred to by each active entry in RefPicList[0] or RefPicList[1] shall be present in the DPB and shall have TemporalId less than or equal to that of the current picture.

(3) The picture referred to by each entry in RefPicList[0] or RefPicList[1] shall not be the current picture and shall have ph_non_ref_pic_flag equal to 0.

(4) An STRP entry in RefPicList[0] or RefPicList[1] of a slice of a picture and an LTRP entry in RefPicList[0] or RefPicList[1] of the same slice or a different slice of the same picture shall not refer to the same picture.

(5) There shall be no LTRP entry in RefPicList[0] or RefPicList[1] for which the difference between the PicOrderCntVal of the current picture and the PicOrderCntVal of the picture referred to by the entry is greater than or equal to $2^{24}$.

(6) Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics shall be less than or equal to MaxDpbSize−1, inclusive, where MaxDpbSize, and setOfRefPics shall be the same for all slices of a picture.

(7) When the current slice has nal_unit_type equal to STSA_NUT, there shall be no active entry in RefPicList[0] or RefPicList[1] that has TemporalId equal to that of the current picture and nuh_layer_id equal to that of the current picture.

(8) When the current picture is a picture that follows, in decoding order, an STSA picture that has TemporalId equal to that of the current picture and nuh_layer_id equal to that of the current picture, there shall be no picture that precedes the STSA picture in decoding order, has TemporalId equal to that of the current picture, and has nuh_layer_id equal to that of the current picture included as an active entry in RefPicList[0] or RefPicList[1].

(9) When the current sub-picture, with TemporalId equal to a particular value tId, nuh_layer_id equal to a particular value layerId, and sub-picture index equal to a particular value subpicIdx, is a sub-picture that follows, in decoding order, an STSA sub-picture with TemporalId equal to tId, nuh_layer_id equal to layerId, and sub-picture index equal to subpicIdx, there shall be no picture with TemporalId equal to tId and nuh_layer_id equal to layerId that precedes the picture containing the STSA sub-picture in decoding order included as an active entry in RefPicList[0] or RefPicList[1].

(10) When the current picture, with nuh_layer_id equal to a particular value layerId, is an IRAP picture, there shall be no picture referred to by an entry in RefPicList[0] or RefPicList[1] that precedes, in output order or decoding order, any preceding IRAP picture with nuh_layer_id equal to layerId in decoding order (when present).

(11) When the current sub-picture, with nuh_layer_id equal to a particular value layerId and sub-picture index equal to a particular value subpicIdx, is an IRAP sub-picture, there shall be no picture referred to by an entry in RefPicList[0] or RefPicList[1] that precedes, in output order or decoding order, any preceding picture, in decoding order (when present), containing an IRAP sub-picture with nuh_layer_id equal to layerId and sub-picture index equal to subpicIdx.

(12) When the current picture is not a RASL picture associated with a CRA picture with NoOutputBeforeRecoveryFlag equal to 1, there shall be no picture referred to by an active entry in RefPicList[0] or RefPicList[1] that was generated by the decoding process for generating unavailable reference pictures for the CRA picture associated with the current picture.

(13) When the current sub-picture is not a RASL sub-picture associated with a CRA sub-picture in a CRA picture with NoOutputBeforeRecoveryFlag equal to 1, there shall be no picture referred to by an active entry in RefPicList[0] or RefPicList[1] that was generated by the decoding process for generating unavailable reference pictures for the CRA picture containing the CRA sub-picture associated with the current sub-picture.

(14) When the current picture, with nuh_layer_id equal to a particular value layerId, is not any of the following, there shall be no picture referred to by an entry in RefPicList[0] or RefPicList[1] that was generated by the decoding process for generating unavailable reference pictures for the IRAP or GDR picture associated with the current picture:

(a) An IDR picture with sps_idr_rpl_present_flag equal to 1 or pps_rpl_info_in_ph_flag equal to 1.

(b) A CRA picture with NoOutputBeforeRecoveryFlag equal to 1.

(c) A picture, associated with a CRA picture with NoOutputBeforeRecoveryFlag equal to 1, that precedes, in decoding order, the leading pictures associated with the same CRA picture.

(d) A leading picture associated with a CRA picture with NoOutputBeforeRecoveryFlag equal to 1.

(e) A GDR picture with NoOutputBeforeRecoveryFlag equal to 1.
(f) A recovering picture of a GDR picture with NoOutputBeforeRecoveryFlag equal to 1 and nuh_layer_id equal to layerId.

(15) When the current sub-picture, with nuh_layer_id equal to a particular value layerId and sub-picture index equal to a particular value subpicIdx, is not any of the following, there shall be no picture referred to by an entry in RefPicList[0] or RefPicList[1] that was generated by the decoding process for generating unavailable reference pictures for the IRAP or GDR picture containing the IRAP or GDR sub-picture associated with the current sub-picture:
(a) An IDR sub-picture in an IDR picture with sps_idr_rpl_present_flag equal to 1 or pps_rpl_info_in_ph_flag equal to 1.
(b) A CRA sub-picture in a CRA picture with NoOutputBeforeRecoveryFlag equal to 1.
(c) A sub-picture, associated with a CRA sub-picture in a CRA picture with NoOutputBeforeRecoveryFlag equal to 1, that precedes, in decoding order, the leading pictures associated with the same CRA picture.
(d) A leading sub-picture associated with a CRA sub-picture in a CRA picture with NoOutputBeforeRecoveryFlag equal to 1.
(e) A GDR sub-picture in a GDR picture with NoOutputBeforeRecoveryFlag equal to 1.
(f) A subpicture in a recovering picture of a GDR picture with NoOutputBeforeRecoveryFlag equal to 1 and nuh_layer_id equal to layerId.

(16) When the current picture follows an IRAP picture having the same value of nuh_layer_id in both decoding order and output order, there shall be no picture referred to by an active entry in RefPicList[0] or RefPicList[1] that precedes that IRAP picture in output order or decoding order.

(17) When the current sub-picture follows an IRAP sub-picture having the same value of nuh_layer_id and the same value of sub-picture index in both decoding and output order, there shall be no picture referred to by an active entry in RefPicList[0] or RefPicList[1] that precedes the picture containing that IRAP sub-picture in output order or decoding order.

(18) When the current picture follows an IRAP picture having the same value of nuh_layer_id and the leading pictures, if any, associated with that IRAP picture in both decoding order and output order, there shall be no picture referred to by an entry in RefPicList[0] or RefPicList[1] that precedes that IRAP picture in output order or decoding order.

(19) When the current sub-picture follows an IRAP sub-picture having the same value of nuh_layer_id and the same value of sub-picture index and the leading sub-pictures, if any, associated with that IRAP sub-picture in both decoding and output order, there shall be no picture referred to by an entry in RefPicList[0] or RefPicList[1] that precedes the picture containing that IRAP sub-picture in output order or decoding order.

(20) When the current picture is a RADL picture, there shall be no active entry in RefPicList[0] or RefPicList[1] that is any of the following:
(a) A RASL picture with pps_mixed_nalu_types_in_pic_flag is equal to 0. This means that an active entry of the RPLs of a RADL picture can refer to a RASL picture with pps_mixed_nalu_types_in_pic_flag equal to 1. However, when decoding starts from the associated CRA picture, such a RADL picture can still be correctly decoded, because the RADL sub-picture(s) in that referenced RASL picture would be correctly decoded, as the RADL picture would only refer to the RADL sub-pictures in the referenced RASL picture, as imposed by the next constraint that disallows RADL sub-pictures referring to a RASL sub-picture.
(b) A picture that precedes the associated IRAP picture in decoding order.

(21) When the current sub-picture, with nuh_layer_id equal to a particular value layerId and sub-picture index equal to a particular value subpicIdx, is a RADL sub-picture, there shall be no active entry in RefPicList[0] or RefPicList[1] that is any of the following:
(a) A picture with nuh_layer_id equal to layerId containing a RASL sub-picture with sub-picture index equal to subpicIdx.
(b) A picture that precedes the picture containing the associated IRAP sub-picture in decoding order.

(22) The following constraints apply for the picture referred to by each ILRP entry, when present, in RefPicList[0] or RefPicList[1] of a slice of the current picture:
(a) The picture shall be in the same AU as the current picture.
(b) The picture shall be present in the DPB.
(c) The picture shall have nuh_layer_id refPicLayerId less than the nuh_layer_id of the current picture.
(d) Either of the following constraints applies: The picture shall be an IRAP picture; and the picture shall have TemporalId less than or equal to
Max(0, vps_max_tid_il_ref_pics_plus1[currLayerIdx][refLayerIdx]−1), where currLayerIdx and refLayerIdx are equal to
GeneralLayerIdx[nuh_layer_id] and
GeneralLayerIdx[refpicLayerId], respectively.

(23) Each ILRP entry, when present, in RefPicList[0] or RefPicList[1] of a slice shall be an active entry.

(24) When vps_independent_layer_flag[GeneralLayerIdx[nuh_layer_id]] is equal to 0 and sps_num_subpics_minus1 is greater than 0, either of the following two conditions (but not both) shall be true:
(a) The picture referred to by each active entry in RefPicList[0] or RefPicList[1] has the same sub-picture layout as the current picture (i.e. the SPSs referred to by that picture and the current picture have the same value of sps_num_subpics_minus1 and the same values of sps_subpic_ctu_top_left_x[j], sps_subpic_ctu_top_left_y[j], sps_subpic_width_minus1[j], and sps_subpic_height_minus1[j], respectively, for each value of j in the range of 0 to sps_num_subpics_minus1, inclusive).
(b) The picture referred to by each active entry in RefPicList[0] or RefPicList[1] is an ILRP for which the value of sps_num_subpics_minus1 is equal to 0.

According to embodiments, the decoder may check whether the above constraints are met for bitstream conformance. The conformance check may be done after invoking decoding process for generating unavailable reference pictures as described above.

Embodiments of the present disclosure may comprise at least one processor and memory storing computer code. The computer code, when executed by the at least one processor, may be configured to cause the at least one processor to perform the functions of the embodiments of the present disclosure.

Figure 33:
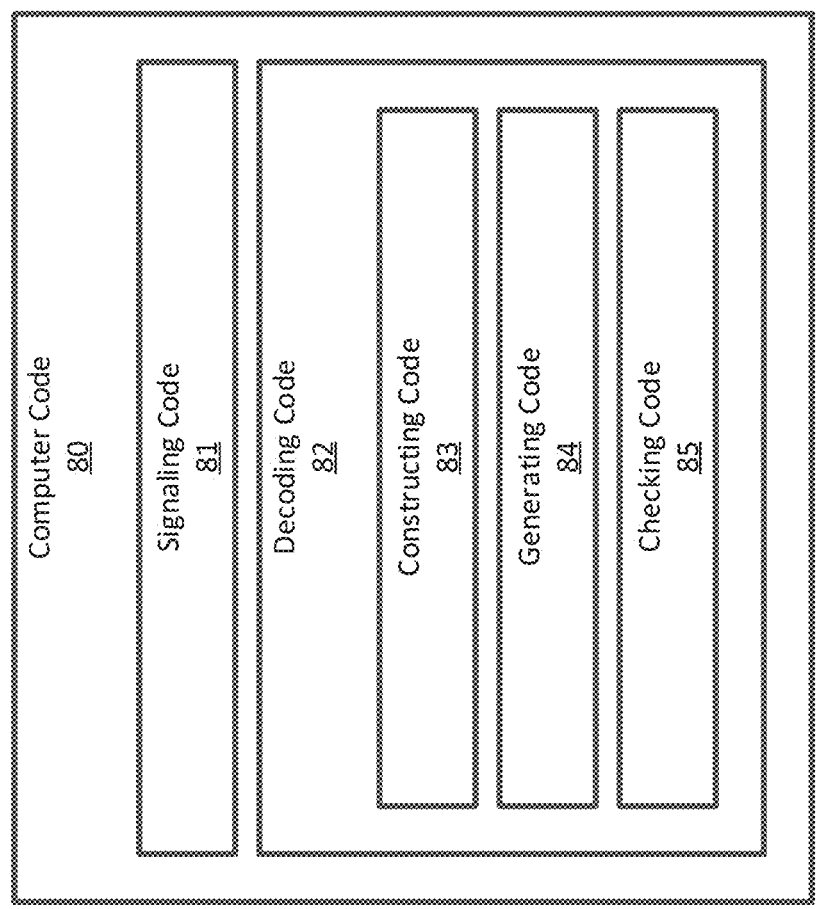
FIG. 33 is a block diagram of computer code according to embodiments.

For example, with reference to FIG. 33, a decoder of the present disclosure may comprise at least one processor and memory storing computer code (80). The decoder may be configured to receive a bitstream including at least one coded picture and parameter sets (e.g., SPS and VPS), headers (e.g. picture headers and slice headers), and AU delimiters. The computer code may be configured to cause the at least one processor to perform any number of the decoding processes (e.g. constructing a reference picture list, generating an unavailable reference picture, and checking bitstream conformance) and aspects related to decoding (e.g. signaling of flags and other syntax elements in picture header, slice header, and access unit delimiter) as described in the present disclosure. For example, the computer code (80) may include a plurality of signaling code (81) and decoding code (82).

The plurality of signaling code (81) may include various signaling code that is configured to cause the at least one processor to signal (and/or infer) flags and other syntax elements in picture header, slice header, and access unit delimiter.

The decoding code (82) may be configured to cause the at least one processor to decode one or more pictures. According to embodiments, the decoding code (82) may include constructing code (83), generating code (84), and checking code (85). The constructing code (83) may be configured to cause the at least one processor to construct a reference picture list(s). The generating code (84) may be configured to cause the at least one processor to generate an unavailable reference picture in the reference picture list(s). The checking code (85) may be configured to to cause the at least one processor to check bitstream conformance, for references pictures in the reference picture list(s), that the following constraints apply: (a) a number of entries that are indicated to be in the reference picture list is not less than a number of active entries that are indicated to be in the reference picture list, (b) each picture referred to by an active entry in the reference picture list is present in a decoded picture buffer (DPB) and has a temporal identifier value less than or equal to a temporal identifier value of the current picture, and (c) each picture referred to by an entry in the reference picture list is not the current picture and is indicated by a picture header flag to potentially be a reference picture.

The techniques described above, can be implemented as computer software using computer-readable instructions and physically stored in one or more computer-readable media. For example, FIG. 34 shows a computer system (900) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 34:
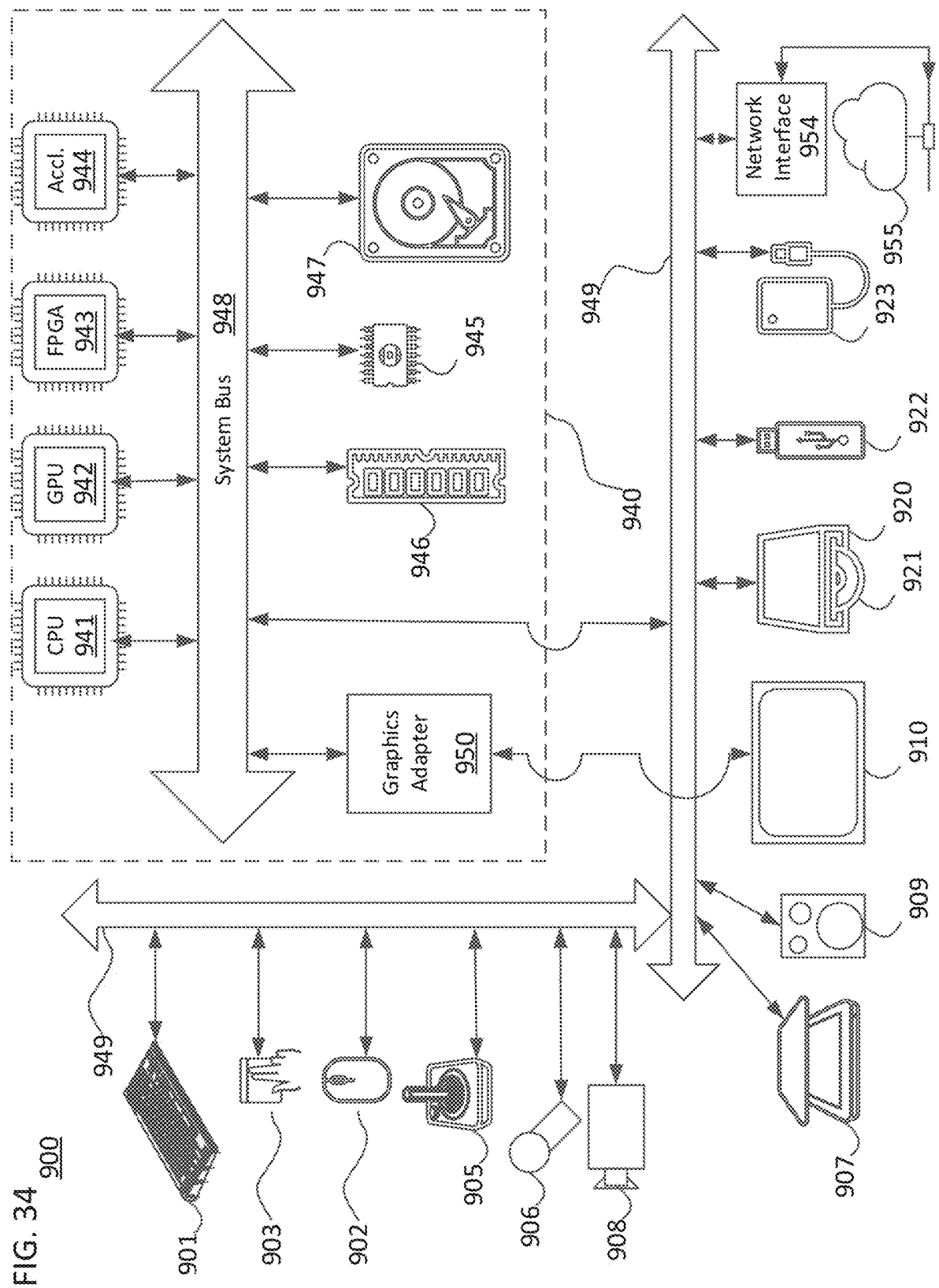
FIG. 34 is a diagram of a computer system suitable for implementing embodiments.

The components shown in FIG. 34 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices). For example, such devices may be audio output devices (such as: speakers (909), headphones (not depicted)), visual output devices (such as screens (910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system 900 by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter 950 may be included in the core 940.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor, the method comprising:
   receiving video data;
   encoding the video data into a coded video stream that includes an access unit and a picture;
   signaling a first flag, in an access unit delimiter of the coded video stream, that indicates whether the access unit includes either or neither one from among an intra random access point (IRAP) picture and a gradual decoding refresh (GDR) picture; and
   signaling a second flag, in a picture header of the coded video stream, that indicates whether the picture is the IRAP picture,
   wherein a value of the first flag and a value of the second flag are aligned, and
   wherein encoding the video data is based on:
   a reference picture list,
   an unavailable reference picture in the reference picture list, and
   bitstream conformance, for references pictures in the reference picture list, based on whether the following constraints apply:
   a number of entries that are indicated to be in the reference picture list is not less than a number of active entries that are indicated to be in the reference picture list,
   each picture referred to by an active entry in the reference picture list is present in a decoded picture buffer (DPB) and has a temporal identifier value less than or equal to a temporal identifier value of the current picture, and
   each picture referred to by an entry in the reference picture list is not the current picture and is indicated by a picture header flag to potentially be a reference picture.

2. The method of claim 1, further comprising:
   signaling a third flag, in the picture header of the coded video stream, that indicates whether the picture is the GDR picture,
   wherein the value of the first flag and a value of the third flag are aligned.

3. The method of claim 2, wherein the third flag is signaled based on the second flag indicating that the picture is not the IRAP picture.

4. The method of claim 1, wherein
the first flag has a value that indicates that the picture is either one from among the IRAP picture and the GDR picture,
the second flag has a value that indicates that the picture is the IRAP picture, and
the method further comprises signaling a third flag, in a slice header of a slice of the picture of the coded video stream, that indicates whether any pictures prior to the IRAP picture are outputted.

5. The method of claim 4, further comprising:
determining a network abstraction layer (NAL) unit type of the slice,
wherein the third flag is signalled based on the NAL unit type that is determined.

6. The method of claim 5, wherein the third flag is signalled based on the NAL unit type being determined to be equal to IDR_W_RADL, IDR_N_LP, or CRA_NUT.

7. The method of claim 5, further comprising:
signaling a fourth flag, in the picture header of the coded video stream, that indicates whether the picture is the GDR picture.

8. The method of claim 7, wherein the fourth flag is signaled based on the second flag indicating that the picture is not the IRAP picture.

9. The method of claim 7, wherein a value of the first flag and a value of the fourth flag are aligned.

10. The method of claim 1, wherein the checking bistream conformance is performed based on determining the current picture is an independent decoder refresh (IDR) picture, a clean random access (CRA) picture, or a gradual decoding refresh (GDR) picture.

11. A system comprising:
at least one processor that is configured to receive a coded video stream that includes an access unit, including a picture
memory storing computer code, the computer code comprising:
receiving code configured to cause the at least one processor to receive video data;
encoding code configured to cause the at least one processor to encode the video data into a coded video stream that includes an access unit and a picture;
first signaling code configured to cause the at least one processor to signal a first flag, in an access unit delimiter of the coded video stream, that indicates whether the access unit includes either or neither one from among an intra random access point (IRAP) picture and a gradual decoding refresh (GDR) picture; and
second signaling code configured to cause the at least one processor to signal a second flag, in a picture header of the coded video stream, that indicates whether the picture is the IRAP picture, wherein a value of the first flag and a value of the second flag are aligned, and
wherein encoding the video data is based on:
a reference picture list,
an unavailable reference picture in the reference picture list, and
bitstream conformance, for references pictures in the reference picture list, based on whether the following constraints apply:
a number of entries that are indicated to be in the reference picture list is not less than a number of active entries that are indicated to be in the reference picture list,
each picture referred to by an active entry in the reference picture list is present in a decoded picture buffer (DPB) and has a temporal identifier value less than or equal to a temporal identifier value of the current picture, and
each picture referred to by an entry in the reference picture list is not the current picture and is indicated by a picture header flag to potentially be a reference picture.

12. The system of claim 11, the computer code further comprises:
third signaling code configured to cause the at least one processor to signal a third flag, in the picture header of the coded video stream, that indicates whether the picture is the GDR picture,
wherein the value of the first flag and a value of the third flag are aligned.

13. The system of claim 12, wherein the third flag is signaled based on the second flag indicating that the picture is not the IRAP picture.

14. The system of claim 11, wherein
the first flag has a value that indicates that the picture is either one from among the IRAP picture and the GDR picture,
the second flag has a value that indicates that the picture is the IRAP picture, and
the computer code further comprises third signaling code configured to cause the at least one processor to signal a third flag, in a slice header of a slice of the picture of the coded video stream, that indicates whether any pictures prior to the IRAP picture are outputted.

15. The system of claim 14, the computer code further comprises:
determining code configured to cause the at least one processor to determine a network abstraction layer (NAL) unit type of the slice,
wherein the third flag is signalled based on the NAL unit type that is determined.

16. The system of claim 15, wherein the third flag is signalled based on the NAL unit type being determined to be equal to IDR_W_RADL, IDR_N_LP, or CRA_NUT.

17. The system of claim 15, the computer code further comprises:
fourth signaling code configured to cause the at least one processor to signal a fourth flag, in the picture header of the coded video stream, that indicates whether the picture is the GDR picture.

18. The system of claim 17, wherein the fourth flag is signaled based on the second flag indicating that the picture is not the IRAP picture.

19. The system of claim 17, wherein the value of the first flag and a value of the fourth flag are aligned.

20. A method for determining bitstream conformance:
receiving an encoded bitstream, wherein the bitstream includes:
a first flag, in an access unit delimiter of the encoded bitstream, that indicates whether an access unit of video data of the encoded bitstream includes either or neither one from among an intra random access point (IRAP) picture and a gradual decoding refresh (GDR) picture, a second flag, in a picture header of video data of the encoded bitstream, that indicates whether the picture is the IRAP picture, and a value of the first flag and a value of the second flag are aligned; and checking bitstream conformance, for references pictures in a reference picture list having an unavailable reference picture, that the following constraints apply:

a number of entries that are indicated to be in the reference picture list is not less than a number of active entries that are indicated to be in the reference picture list, each picture referred to by an active entry in the reference picture list is present in a decoded picture buffer (DPB) and has a temporal identifier value less than or equal to a temporal identifier value of the current picture, and each picture referred to by an entry in the reference picture list is not the current picture and is indicated by a picture header flag to potentially be a reference picture.

* * * * *